United States Patent
Piao et al.

(10) Patent No.: US 12,348,790 B2
(45) Date of Patent: Jul. 1, 2025

(54) ENTROPY ENCODING AND DECODING APPARATUS AND METHOD FOR USING THE SAME

(71) Applicant: SAMSUNG ELECTRONICS CO., LTD., Suwon-si (KR)

(72) Inventors: Yinji Piao, Suwon-si (KR); Kyungah Kim, Suwon-si (KR); Minsoo Park, Suwon-si (KR); Minwoo Park, Suwon-si (KR); Kwangpyo Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 131 days.

(21) Appl. No.: 18/123,623

(22) Filed: Mar. 20, 2023

(65) Prior Publication Data
US 2023/0319319 A1    Oct. 5, 2023

Related U.S. Application Data

(63) Continuation of application No. PCT/KR2023/003261, filed on Mar. 9, 2023.

(30) Foreign Application Priority Data

Apr. 5, 2022  (KR) .................. 10-2022-0042526
Sep. 8, 2022  (KR) .................. 10-2022-0114368

(51) Int. Cl.
*H04N 19/70*   (2014.01)
*H04N 19/174*  (2014.01)
*H04N 19/91*   (2014.01)

(52) U.S. Cl.
CPC ........... *H04N 19/91* (2014.11); *H04N 19/174* (2014.11); *H04N 19/70* (2014.11)

(58) Field of Classification Search
CPC ...... H04N 19/13; H04N 19/91; H04N 19/159; H04N 19/174; H04N 19/70
See application file for complete search history.

(56) References Cited

U.S. PATENT DOCUMENTS 9,172,976 B2   10/2015  Chien et al.
9,661,326 B2 *  5/2017  Alshin .................. H04N 19/96
(Continued)

FOREIGN PATENT DOCUMENTS

KR   10-2019-0140862 A   12/2019
KR   10-2021-0133976 A   11/2021
KR      10-2365164 B1     2/2022

OTHER PUBLICATIONS

International Search Report & Written Opinion (PCT/ISA/210 & 237) issued Jun. 8, 2023 by the International Searching Authority in International Application No. PCT/KR2023/003261.
(Continued)

*Primary Examiner* — Tsion B Owens
(74) *Attorney, Agent, or Firm* — Sughrue Mion, PLLC

(57) ABSTRACT

An entropy decoding method may include obtaining, from a bitstream, information about a slice type, based on an occurrence probability of a symbol, performing arithmetic decoding on a current symbol corresponding to a syntax element, when the information about the slice type indicates an I slice, determining a first scaling factor for updating the occurrence probability of the symbol by using a first function, wherein a value of the first function is determined based on a first threshold value, when the information about the slice type indicates a B or P slice, determining the first scaling factor by using a second function, wherein a value of the second function is determined based on a second threshold value, and by using the first scaling factor, updating the occurrence probability of the symbol.

15 Claims, 34 Drawing Sheets

(56) References Cited

U.S. PATENT DOCUMENTS

| | | | | |
|---|---|---|---|---|
| 10,869,062 | B2* | 12/2020 | Egilmez | H04N 19/157 |
| 10,911,756 | B2 | 2/2021 | Lee et al. | |
| 10,939,104 | B2 | 3/2021 | Alshina et al. | |
| 10,999,579 | B2 | 5/2021 | Misra et al. | |
| 11,178,399 | B2 | 11/2021 | Dong et al. | |
| 11,277,614 | B2 | 3/2022 | George et al. | |
| 11,457,230 | B2 | 9/2022 | Stegemann et al. | |
| 11,638,006 | B2 | 4/2023 | Alshina et al. | |
| 11,924,438 | B2 | 3/2024 | Zhao et al. | |
| 2013/0028334 | A1* | 1/2013 | Bossen | H03M 7/4018 |
| | | | | 341/107 |
| 2017/0339413 | A1* | 11/2017 | Alshin | H04N 19/13 |
| 2018/0338144 | A1* | 11/2018 | Nam | H04N 19/149 |
| 2019/0200043 | A1* | 6/2019 | Egilmez | H04N 19/172 |
| 2021/0227222 | A1* | 7/2021 | Lee | H04N 19/136 |
| 2021/0289222 | A1 | 9/2021 | Wang et al. | |
| 2021/0392330 | A1* | 12/2021 | Piao | H04N 19/91 |
| 2022/0109850 | A1 | 4/2022 | Jang et al. | |
| 2022/0377340 | A1* | 11/2022 | Misra | H04N 19/15 |
| 2022/0408091 | A1* | 12/2022 | Lee | H04N 19/136 |
| 2023/0024560 | A1* | 1/2023 | Bossen | H04N 19/91 |
| 2023/0134365 | A1* | 5/2023 | Kirchhoffer | H04N 19/13 |
| | | | | 341/107 |
| 2024/0007636 | A1* | 1/2024 | Jeon | H04N 19/13 |

OTHER PUBLICATIONS

Alshin et al., "High Precision Probability Estimation for Cabac," Visual Communication and Image Processing, 2013, Total 6 pages.

Han, "Probability Model Estimation for M-ary Random Variables," Alliance for Open Media Codec Working Group, Document: CWG-C018_v1, Feb. 17, 2022, Total 6 pages.

Akula et al., "Description of SDR, HDR and 360° video coding technology proposal considering mobile application scenario by Samsung, Huawei, GoPro, and HiSilicon," Document: JVET-J0024, Joint Video Exploration Team (JVET) of ITU-T SG 16 WP 3 and ISO/IEC JTC 1/SC 29/WG 11, Apr. 2018, Total 119 pages.

Choi et al., "CE5: Counter-based probability estimation (Test 2.4)," Document: JVET-K0170-v1, Joint Video Experts Team (JVET) of ITU-T SG 16 WP 3 and ISO/IEC JTC 1/SC 29/WG 11, Jul. 2018, Total 4 pages.

Xiu et al., "AHG12: Improved probability estimation for CABAC," Document: JVET-Y0157 v2, Joint Video Experts Team (JVET) of ITU-T SG 16 WP 3 and ISO/IEC JTC 1/SC 29, Jan. 2022, Total 4 pages.

* cited by examiner

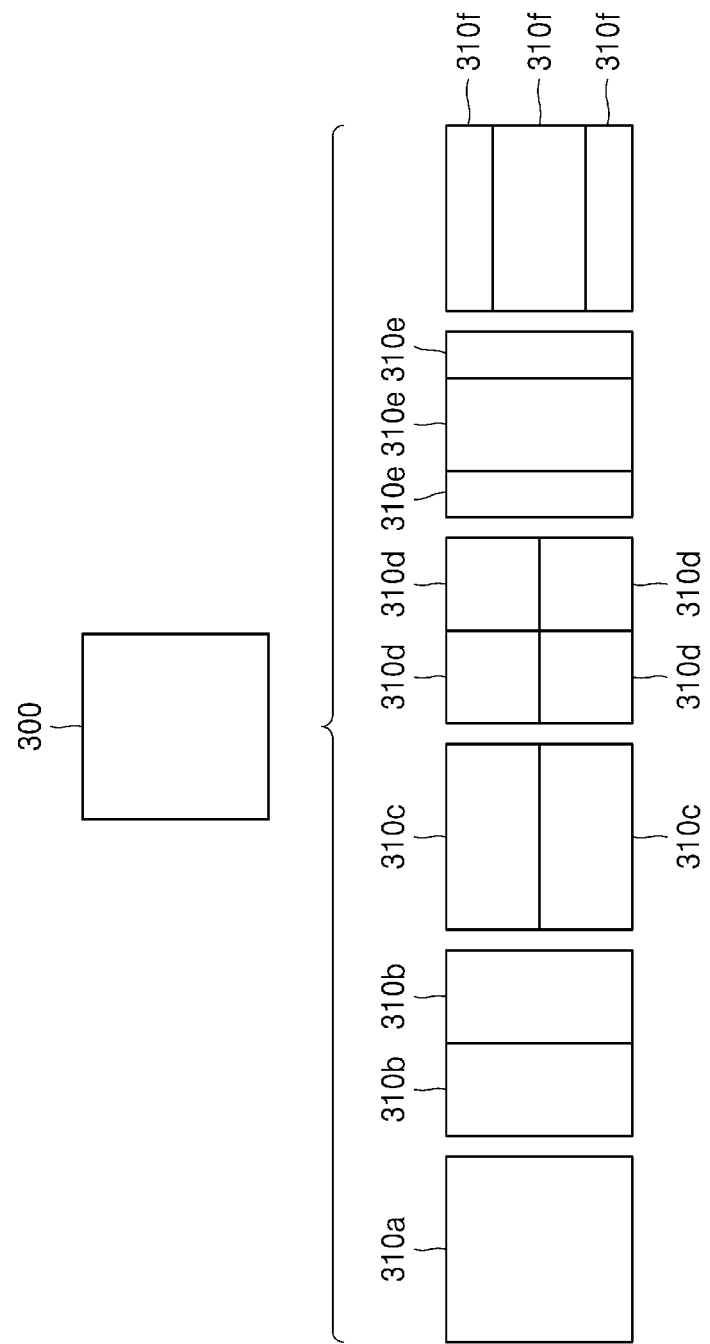

FIG. 4
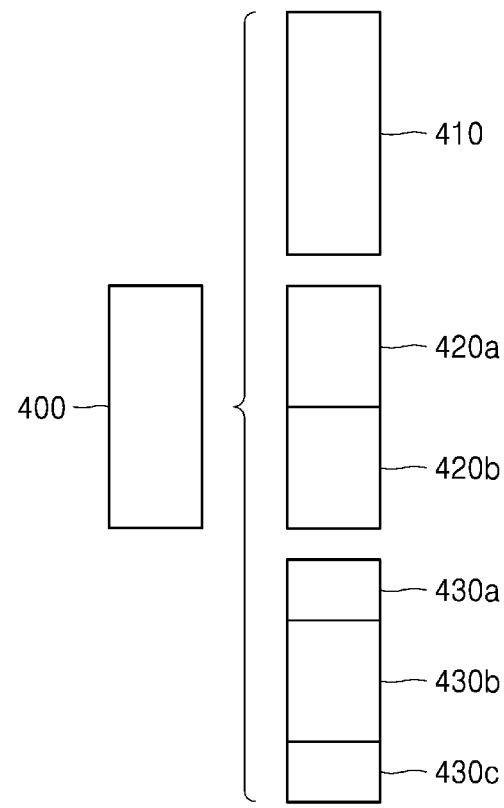
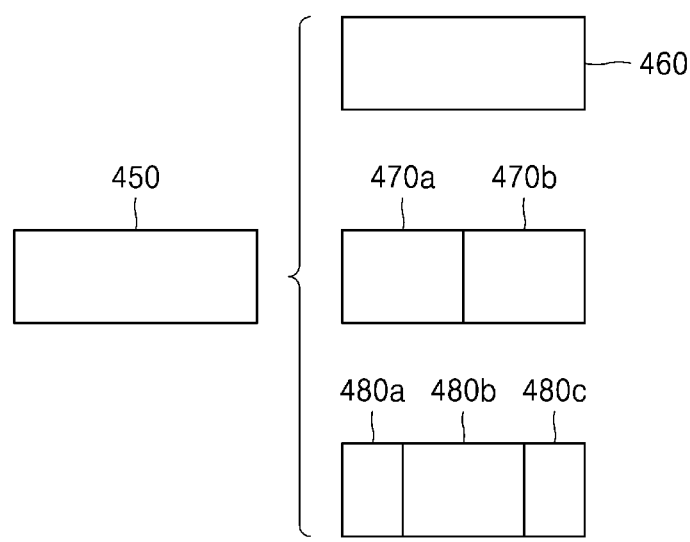

FIG. 13

| BLOCK SHAPE / DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

ENTROPY ENCODING AND DECODING APPARATUS AND METHOD FOR USING THE SAME

CROSS-REFERENCE TO RELATED APPLICATION

This application is a bypass continuation application of International Patent Application No. PCT/KR2023/003261, filed on Mar. 9, 2023, which claims priority from Korean Patent Application No. 10-2022-0042526, filed on Apr. 5, 2022, and Korean Patent Application No. 10-2022-0114368, filed on Sep. 8, 2022, in the Korean Intellectual Property Office, the disclosures of which are incorporated herein by reference in their entireties.

BACKGROUND

1. Field

The disclosure relates to entropy encoding and decoding, and more particularly, to a method and apparatus for updating a probability model in context-based binary arithmetic encoding/decoding.

2. Description of the Related Art

In H.264, MPEG-4, etc., video signals are hierarchically split into sequences, frames, slices, macro blocks, and blocks, wherein a block is a minimum processing unit. In view of encoding, residual data of a block is obtained through intra-frame or inter-frame prediction. Also, the residual data is compressed through transformation, quantization, scanning, run length coding, and entropy coding. As an entropy coding method, there is context-based adaptive M-ary arithmetic coding (CAMAC). CAMAC is an entropy coding scheme and may be referred to as context-based adaptive multi-symbol arithmetic coding. According to the CAMAC, arithmetic encoding is performed based on a plurality of probabilities of occurrence of a symbol.

SUMMARY

According to an embodiment of the disclosure, an entropy decoding method is provided. The entropy decoding method may include obtaining, from a bitstream, information about a slice type. The entropy decoding method may include, based on an occurrence probability of a symbol, performing arithmetic decoding on a current symbol corresponding to a syntax element. The entropy decoding method may include when the information about the slice type indicates an I slice, determining a first scaling factor for updating the occurrence probability of the symbol by using a first function, wherein a value of the first function is determined based on a first threshold value. The entropy decoding method may include, when the information about the slice type indicates a B or P slice, determining the first scaling factor by using a second function, wherein a value of the second function is determined based on a second threshold value. The entropy decoding method may include, by using the first scaling factor, updating the occurrence probability of the symbol. The first threshold value may be greater than or equal to the second threshold value.

According to an embodiment of the disclosure, an entropy decoding apparatus is provided. The entropy decoding apparatus may include at least one processor. The at least one processor may be configured to obtain, from a bitstream, information about a slice type. The at least one processor may be configured to, based on an occurrence probability of a symbol, perform arithmetic decoding on a current symbol corresponding to a syntax element. The at least one processor may be configured to, when the information about the slice type indicates an I slice, determine a first scaling factor for updating the occurrence probability of the symbol by using a first function, wherein a value of the first function is determined based on a first threshold value. The at least one processor may be configured to, when the information about the slice type indicates a B or P slice, determine the first scaling factor by using a second function, wherein a value of the second function is determined based on a second threshold value. The at least one processor may be configured to, by using the first scaling factor, update the occurrence probability of the symbol. The first threshold value may be greater than or equal to the second threshold value.

According to an embodiment of the disclosure, an entropy encoding method is provided. The entropy encoding method may include obtaining, from a bitstream, information about a slice type. The entropy encoding method may include, based on an occurrence probability of a symbol, performing arithmetic encoding on a current symbol corresponding to a syntax element. The entropy encoding method may include when the information about the slice type indicates an I slice, determining a first scaling factor for updating the occurrence probability of the symbol by using a first function, wherein a value of the first function is determined based on a first threshold value. The entropy encoding method may include, when the information about the slice type indicates a B or P slice, determining the first scaling factor by using a second function, wherein a value of the second function is determined based on a second threshold value. The entropy encoding method may include, by using the first scaling factor, updating the occurrence probability of the symbol. The first threshold value may be greater than or equal to the second threshold value.

According to an embodiment of the disclosure, an entropy encoding apparatus is provided. The entropy encoding apparatus may include at least one processor. The at least one processor may be configured to obtain, from a bitstream, information about a slice type. The at least one processor may be configured to, based on an occurrence probability of a symbol, perform arithmetic encoding on a current symbol corresponding to a syntax element. The at least one processor may be configured to, when the information about the slice type indicates an I slice, determine a first scaling factor for updating the occurrence probability of the symbol by using a first function, wherein a value of the first function is determined based on a first threshold value. The at least one processor may be configured to, when the information about the slice type indicates a B or P slice, determine the first scaling factor by using a second function, wherein a value of the second function is determined based on a second threshold value. The at least one processor may be configured to, by using the first scaling factor, update the occurrence probability of the symbol. The first threshold value may be greater than or equal to the second threshold value.

BRIEF DESCRIPTION OF THE DRAWINGS

FIG. 3 illustrates a process, performed by an image decoding apparatus, of determining at least one coding unit by splitting a current coding unit, according to an embodiment of the disclosure.

FIG. 4 illustrates a process, performed by an image decoding apparatus, of determining at least one coding unit by splitting a non-square coding unit, according to an embodiment of the disclosure.

FIG. 13 illustrates a process of determining a depth of a coding unit when a shape and size of the coding unit change, when the coding unit is recursively split such that a plurality of coding units are determined, according to an embodiment of the disclosure.

DETAILED DESCRIPTION

Figure 1A:
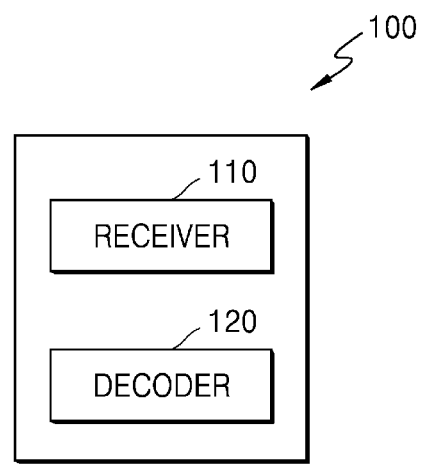
FIG. 1A is a block diagram of an image decoding apparatus according to an embodiment of the disclosure.

Throughout the disclosure, the expression "at least one of a, b or c" indicates only a, only b, only c, both a and b, both a and c, both b and c, all of a, b, and c, or variations thereof.

Advantages and features of the disclosure and a method for achieving them will be clear with reference to the accompanying drawings, in which one or more embodiments of the disclosure are shown. The disclosure may, however, be embodied in many different forms and should not be construed as being limited to the one or more embodiments set forth herein; rather, these one or more embodiments of the disclosure are provided so that this disclosure will be thorough and complete, and will fully convey the concept of the disclosure to those of ordinary skill in the art, and the disclosure is only defined by the scope of the claims.

Terms used herein will be briefly described, and the one or more embodiments of the disclosure will be described in detail.

The terms used herein are those general terms currently widely used in the art in consideration of functions in regard to the disclosure, but the terms may vary according to the intention of those of ordinary skill in the art, precedents, or new technology in the art. Terms arbitrarily selected by the applicant of the disclosure may also be used in a specific case. In this case, their meanings will be described in detail in the detailed description of the disclosure. Thus, the terms must be defined based on the meanings of the terms and the overall description of the disclosure, not by simply stating the terms themselves.

It is to be understood that the singular forms "a," "an," and "the" include plural referents unless the context clearly dictates otherwise.

It will be understood that when a certain part "includes" a certain component, the part does not exclude another component but can further include another component, unless the context clearly dictates otherwise.

As used herein, the term " . . . or/er" refers to a software or hardware component that performs certain functions. However, the term " . . . or/er" is not limited to software or hardware. The " . . . or/er" may be configured in an addressable storage medium, or may be configured to run on at least one processor. Therefore, as an example, the " . . . or/er" includes components, such as software components, object-oriented software components, class components, and task components, processes, functions, attributes, procedures, sub-routines, segments of program codes, drivers, firmware, microcode, circuits, data, databases, data structures, tables, arrays, and variables. Functions provided in the components and " . . . ors/ers" may be combined into a smaller number of components and " . . . ors/ers", or sub-divided into additional components and " . . . ors/ers".

In an embodiment of the disclosure, the " . . . or/er" may be implemented as a processor and a memory. The term "processor" should be interpreted in a broad sense to include a general-purpose processor, a central processing unit (CPU), a microprocessor, a digital signal processor (DSP), a controller, a microcontroller, a state machine, etc. In some environments, the "processor" may indicate an application-specific integrated circuit (ASIC), a programmable logic device (PLD), a field programmable gate array (FPGA), etc. The term "processor" may indicate a combination of processing devices, such as, for example, a combination of a DSP and a microprocessor, a combination of a plurality of microprocessors, a combination of one or more microprocessors coupled to a DSP core, or a combination of arbitrary other similar components.

The term "memory" should be interpreted in a broad sense to include an arbitrary electronic component capable of storing electronic information. The term "memory" may indicate various types of processor-readable media, such as random access memory (RAM), read only memory (ROM), non-volatile RAM (NVRAM), programmable ROM (PROM), erasable programmable ROM (EPROM), electrically erasable PROM (EEPROM), flash memory, a magnetic or optical data storage device, registers, etc. When a processor may read information from a memory and/or write information to the memory, the memory may be considered to be in electronic communication with the processor. A memory integrated into a processor electronically communicates with the processor.

Hereinafter, an "image" may represent a static image such as a still image of video, or a moving image, that is, a dynamic image such as video itself.

Hereinafter, a "sample", which is data assigned to a sampling location of an image, means data that is to be processed. For example, pixel values in an image of a spatial domain and transform coefficients on a transform region may be samples. A unit including at least one of such samples may be defined as a block.

Hereinafter, one or more embodiments of the disclosure will be described in detail with reference to the accompanying drawings so that the disclosure may be readily implemented by one of ordinary skill in the technical field to which the disclosure pertains. Also, in the drawings, parts irrelevant to the description will be omitted for the simplicity of explanation.

Hereinafter, one or more embodiments of the disclosure will be described in detail with reference to FIGS. 1 to 28.

FIG. 1A is a block diagram of an image decoding apparatus 100 according to an embodiment of the disclosure.

The image decoding apparatus 100 may include a receiver 110 and a decoder 120. The receiver 110 and the decoder 120 may include at least one processor. Also, the receiver 110 and the decoder 120 may include a memory storing instructions to be performed by the at least one processor.

The receiver 110 may receive a bitstream. The bitstream includes information obtained by encoding an image by an image encoding apparatus 150 (see FIG. 2A). Also, the bitstream may be transmitted from the image encoding apparatus 150. The image encoding apparatus 150 and the image decoding apparatus 100 may be connected by wire or wirelessly, and the receiver 110 may receive the bitstream by wire or wirelessly. The receiver 110 may receive the bitstream from a storage medium, such as an optical medium or a hard disk.

The decoder 120 may reconstruct an image based on information obtained from the received bitstream. The decoder 120 may obtain, from the bitstream, a syntax element for reconstructing the image. The decoder 120 may reconstruct the image based on the syntax element.

The decoder 120 may perform entropy decoding on syntax elements obtained from a bitstream, and as an entropy encoding method, context-based adaptive M-ary arithmetic coding (CAMAC) may be used. The CAMAC may be referred to as context-based adaptive multi-symbol arithmetic coding. In an embodiment of the disclosure, the decoder 120 may determine at least one scaling factor for updating an occurrence probability of a symbol. The decoder 120 may obtain information about a slice type from the bitstream. The decoder 120 may perform, based on the occurrence probability of the symbol, arithmetic decoding on a current symbol corresponding to the syntax element. When the information about the slice type indicates an I slice, the decoder 120 may determine a first scaling factor for updating the occurrence probability of the symbol by using a first function, wherein a value of the first function is determined based on a first threshold value. When the information about the slice type indicates a B or P slice, the decoder 120 may determine the first scaling factor for updating the occurrence probability of the symbol by using a second function, wherein a value of the second function is determined based on a second threshold value. The decoder 120 may update the occurrence probability of the symbol by using the first scaling factor.

The operation of the image decoding apparatus 100 will be described in more detail with reference to FIG. 1B.

Figure 1B:
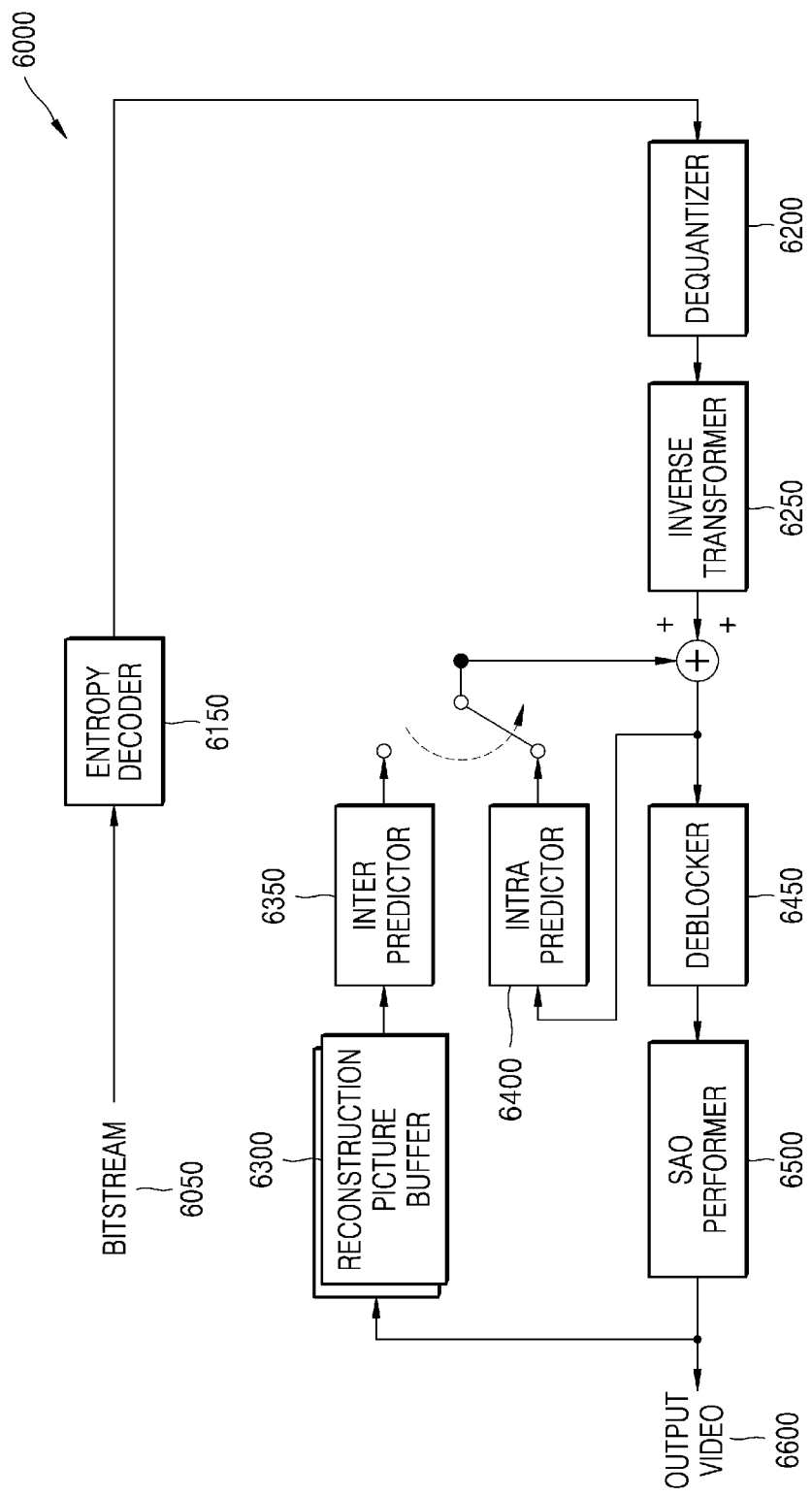
FIG. 1B is a block diagram of an image decoder according to an embodiment of the disclosure.
Figure 1C:
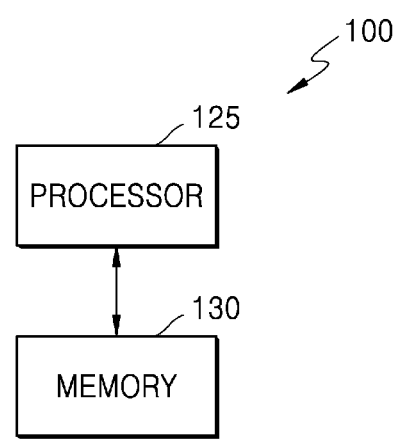
FIG. 1C is a block diagram of an image decoding apparatus according to an embodiment of the disclosure.

FIG. 1B is a block diagram of an image decoder 6000 according to an embodiment of the disclosure.

The image decoder 6000 according to an embodiment of the disclosure may perform operations that are performed by the decoder 120 of the image decoding apparatus 100 to decode image data.

Referring to FIG. 1B, an entropy decoder 6150 receives a bitstream 6050 that includes encoded image data to be decoded, and encoding information required for decoding, and parses the encoded image data and the encoding information. The encoded image data may include a quantized transform coefficient. A dequantizer 6200 and an inverse transformer 6250 may reconstruct residual data from the quantized transform coefficient.

As described below, in an embodiment of the disclosure, the entropy decoder 6150 may determine at least one scaling factor for updating an occurrence probability of a symbol. The entropy decoder 6150 may obtain information about a slice type from the bitstream 6050. The entropy decoder 6150 may perform, based on the occurrence probability of the symbol, arithmetic decoding on a current symbol corresponding to a syntax element. When the information about the slice type indicates an I slice, the entropy decoder 6150 may determine a first scaling factor for updating the occurrence probability of the symbol by using a first function, wherein a value of the first function is determined based on a first threshold value. When the information about the slice type indicates a B or P slice, the entropy decoder 6150 may determine the first scaling factor for updating the occurrence probability of the symbol by using a second function, wherein a value of the second function is determined based on a second threshold value. The entropy decoder 6150 may update the occurrence probability of the symbol by using the first scaling factor.

An intra predictor 6400 may perform intra prediction on each block. An inter predictor 6350 may perform inter prediction on each block by using a reference image obtained by a reconstruction picture buffer 6300. Prediction data for each block, generated by the intra predictor 6400 or the inter predictor 6350, may be added to residue data to reconstruct data of a spatial domain for a block of a current image, and a deblocker 6450 and a sample adaptive offset (SAO) performer 6500 may perform loop filtering on the reconstructed data of the spatial domain to output a filtered, reconstructed image 6600. Also, reconstructed images stored in the reconstruction picture buffer 6300 may be output as reference images.

For the decoder 120 of the image decoding apparatus 100 to decode image data, phased operations of the image decoder 6000 according to an embodiment of the disclosure may be performed on each block.

Figure 10:
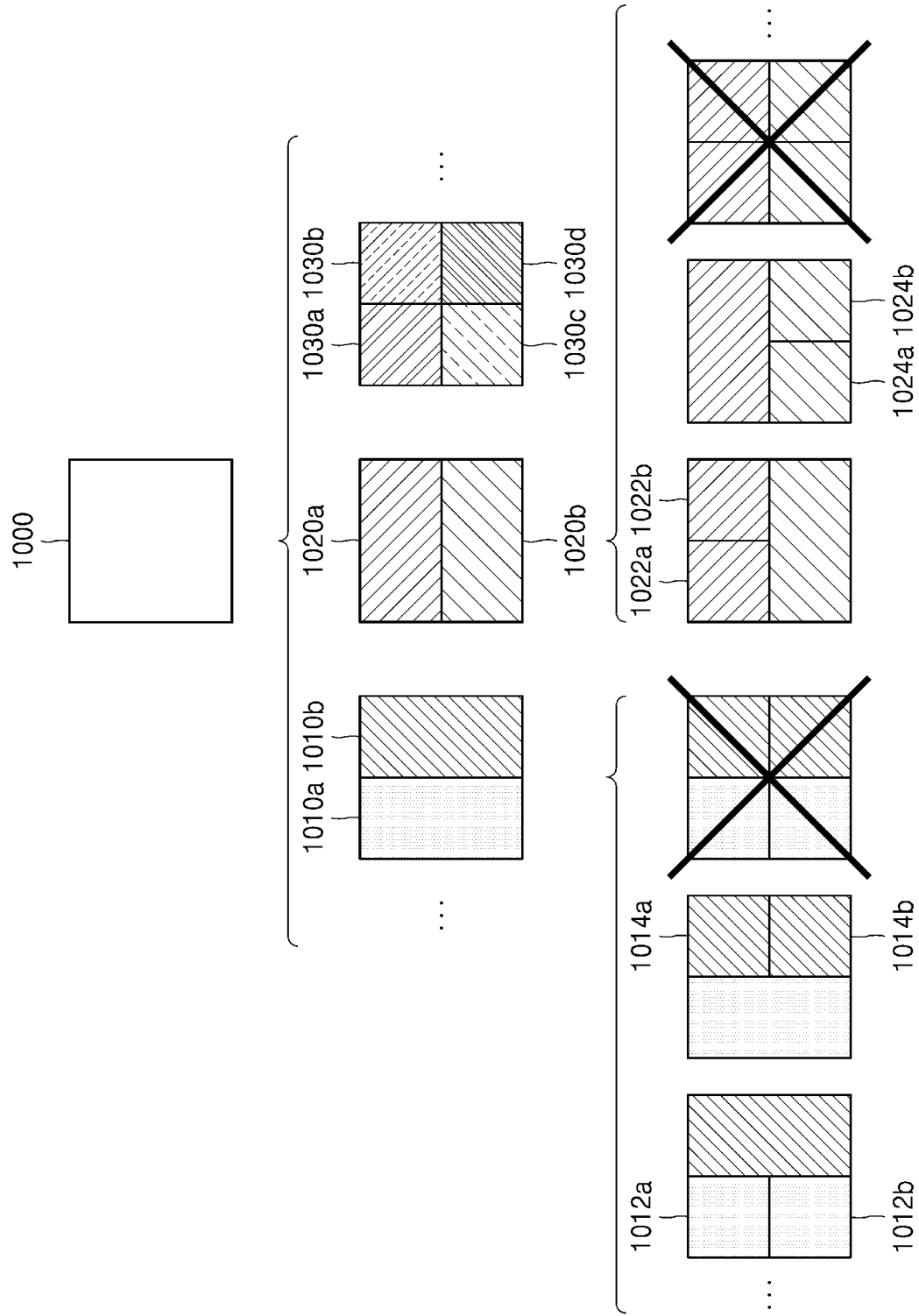
FIG. 10 illustrates that a shape into which a second coding unit is splittable is restricted when the second coding unit having a non-square shape, which is determined when an image decoding apparatus splits a first coding unit, satisfies a certain condition, according to an embodiment of the disclosure.

FIG. 10 is a block diagram of the image decoding apparatus 100 according to an embodiment of the disclosure.

The image decoding apparatus 100 according to an embodiment of the disclosure may include a memory 130, and at least one processor 125 connected to the memory 130. Operations of the image decoding apparatus 100 according to an embodiment of the disclosure may operate as individual processors or may operate under control by a central processor. Also, the memory 130 of the image decoding apparatus 100 may store data received from an external source, and data generated by the processor.

The memory 130 of the image decoding apparatus 100 according to an embodiment of the disclosure may store at least one instruction configured to be executable by the at least one processor 125. The at least one instruction, when executed, may be configured to cause the at least one processor 125 to obtain information about a slice type from a bitstream. The at least one instruction, when executed, may be configured to cause the processor 125 to perform, based on an occurrence probability of a symbol, arithmetic decoding on a current symbol corresponding to a syntax element. The at least one instruction, when executed, may be configured to cause the processor 125 to determine, when the information about the slice type indicates an I slice, a first scaling factor for updating the occurrence probability of the symbol by using a first function, wherein a value of the first function is determined based on a first threshold value. The at least one instruction, when executed, may be configured to cause the processor 125 to determine, when the information about the slice type indicates a B or P slice, the first scaling factor by using a second function, wherein a value of the second function is determined based on a second threshold value. The at least one instruction, when executed, may be configured to cause the at least one processor 125 to update the occurrence probability of the symbol by using the first scaling factor.

Figure 2A:
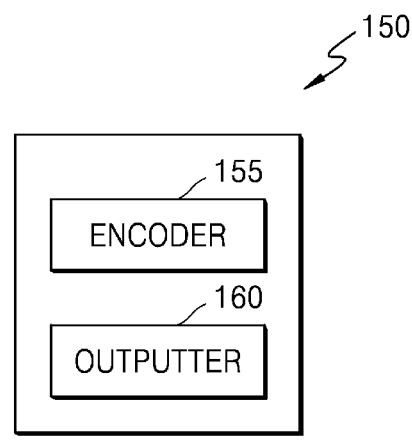
FIG. 2A is a block diagram of an image encoding apparatus according to an embodiment of the disclosure.

FIG. 2A is a block diagram of the image encoding apparatus 150 according to an embodiment of the disclosure.

The image encoding apparatus 150 according to an embodiment of the disclosure may include an encoder 155 and an outputter 160.

The encoder 155 and the outputter 160 may include at least one processor. Also, the encoder 155 and the outputter 160 may include a memory storing instructions to be executed by the at least one processor. The encoder 155 and the outputter 160 may be implemented as separate hardware components, or included in one hardware component.

The encoder 155 may obtain a prediction block of a current block based on a prediction mode of the current block, and transform and quantize a residual that is a difference value between the current block and the prediction block to thereby encode the residual. The outputter 160 may generate a bitstream including information about the prediction mode of the current block, structure information for determining a data unit having a hierarchical split shape, etc., and output the bitstream.

The encoder 155 may perform entropy encoding on syntax elements that are pieces of encoding information generated in an encoding process, and as an entropy encoding method, a context-based adaptive M-ary arithmetic coding (CAMAC) method may be used. The CAMAC may be referred to as context-based adaptive multi-symbol arithmetic coding. In an embodiment of the disclosure, the encoder 155 may obtain information about a slice type. The encoder 155 may perform, based on an occurrence probability of a symbol, arithmetic encoding on a current symbol corresponding to a syntax element. When the information about the slice type indicates an I slice, the encoder 155 may determine a first scaling factor for updating the occurrence probability of the symbol by using a first function, wherein a value of the first function is determined based on a first threshold value. When the information about the slice type indicates a B or P slice, the encoder 155 may determine the first scaling factor by using a second function, wherein a value of the second function is determined based on a second threshold value.

Figure 2B:
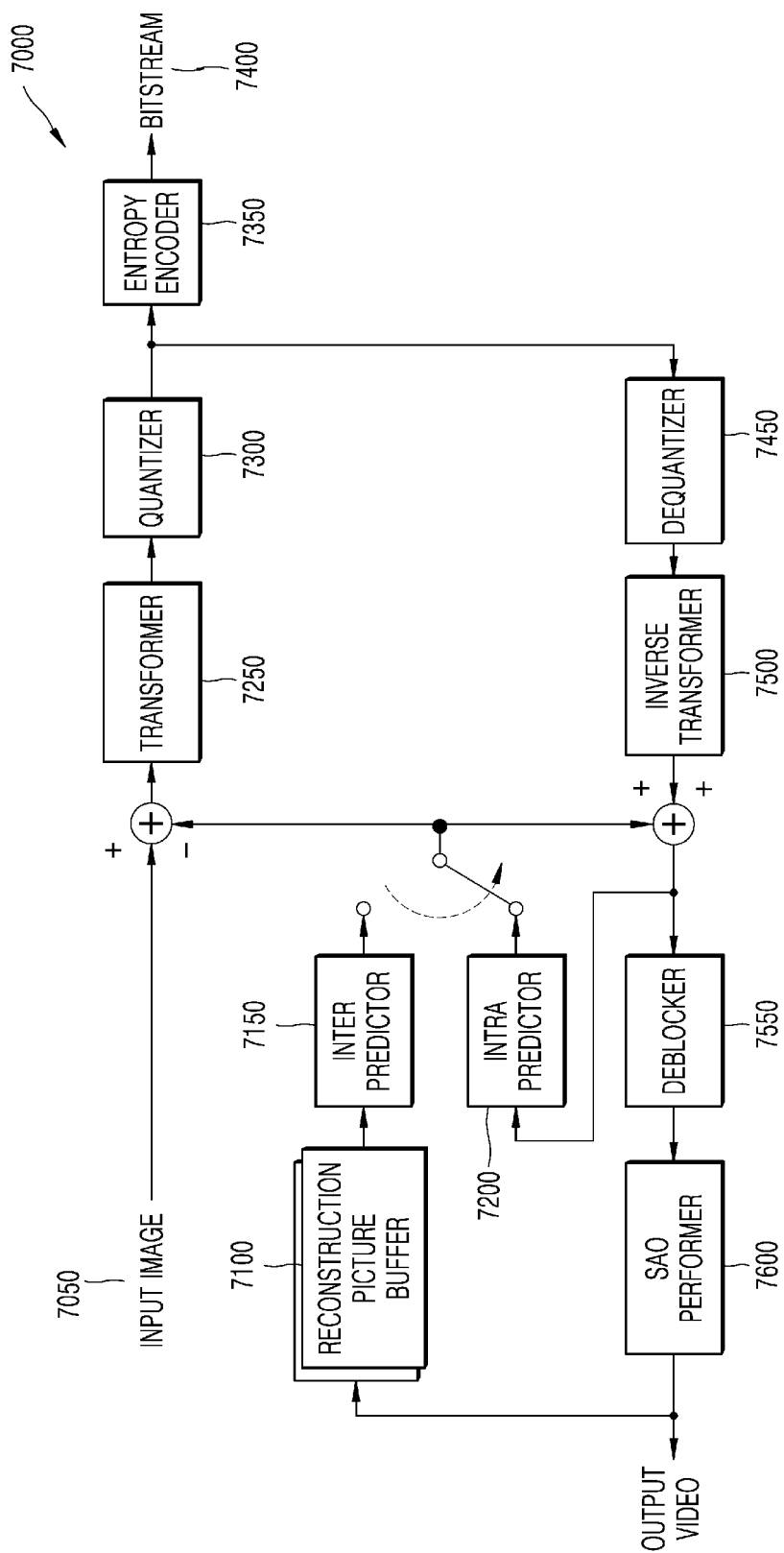
FIG. 2B is a block diagram of an image encoder according to an embodiment of the disclosure.

FIG. 2B is a block diagram of an image encoder 7000 according to an embodiment of the disclosure.

The image encoder 7000 according to an embodiment of the disclosure may perform operations that are performed by the encoder 155 of the image encoding apparatus 150 to encode image data.

That is, an intra predictor 7200 may perform intra prediction on each block of a current image 7050, and an inter predictor 7150 may perform inter prediction on each block by using the current image 7050 and a reference image obtained by a reconstruction picture buffer 7100.

Prediction data for each block, output from the intra predictor 7200 or the inter predictor 7150, may be subtracted from data for an encoded block of the current image 7050 to generate residual data, and a transformer 7250 and a quantizer 7300 may perform transformation and quantization on the residual data and output a quantized transform coefficient for each block.

A dequantizer 7450 and an inverse transformer 7500 may perform dequantization and inverse transformation on the quantized transform coefficient to reconstruct residual data of a spatial domain. The reconstructed residual data of the spatial domain may be added to the prediction data for each block, output from the intra predictor 7200 or the inter predictor 7150, to be reconstructed as data of the spatial domain for the block of the current image 7050. A deblocker 7550 and an SAO performer 7600 may perform in-loop filtering on the reconstructed data of the spatial domain to generate a filtered reconstructed image. The generated reconstructed image is stored in the reconstruction picture buffer 7100. Reconstructed images stored in the reconstruction picture buffer 7100 may be used as reference images for inter prediction of other images. An entropy encoder 7350 may perform entropy encoding on the quantized transform coefficient, such that an entropy-encoded coefficient may be output as a bitstream 7400.

As described below, in an embodiment of the disclosure, the entropy encoder 7350 may obtain information about a slice type. The entropy encoder 7350 may perform, based on an occurrence probability of a symbol, arithmetic encoding on a current symbol corresponding to a syntax element. When the information about the slice type indicates an I slice, the entropy encoder 7350 may determine a first scaling factor for updating the occurrence probability of the symbol by using a first function, wherein a value of the first function is determined based on a first threshold value. When the information about the slice type indicates a B or P slice, the entropy encoder 7350 may determine the first scaling factor by using a second function, wherein a value of the second function is determined based on a second threshold value.

In order to apply the image encoder 7000 according to an embodiment of the disclosure to the image encoding apparatus 150, phased operations of the image encoder 7000 according to an embodiment of the disclosure may be performed for each block.

Figure 2C:
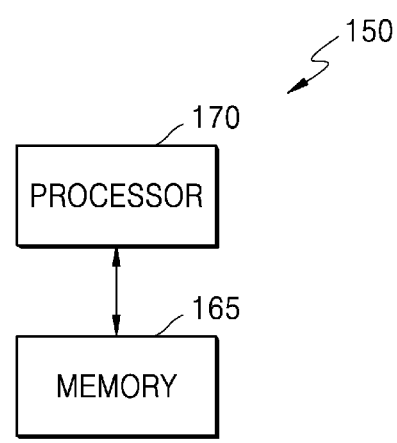
FIG. 2C is a block diagram of an image encoding apparatus according to an embodiment of the disclosure.

FIG. 2C is a block diagram of the image encoding apparatus 150 according to an embodiment of the disclosure.

The image encoding apparatus 150 according to an embodiment of the disclosure may include a memory 165 and at least one processor 170 connected to the memory 165. Operations of the image encoding apparatus 150 according to an embodiment of the disclosure may operate as individual processors or may operate under control by a central processor. Also, the memory 165 of the image encoding apparatus 150 may store data received from an external source, and data generated by the processor.

The memory 165 of the image encoding apparatus 150 according to an embodiment of the disclosure may include at least one instruction configured to be executable by the at least one processor 170. The at least one instruction, when executed, may be configured to cause the at least one processor 170 to obtain information about a slice type. The at least one instruction, when executed, may be configured to cause the processor 170 to perform, based on an occurrence probability of a symbol, arithmetic encoding on a current symbol corresponding to a syntax element. The at least one instruction, when executed, may be configured to cause the processor 170 to determine, when the information about the slice type indicates an I slice, a first scaling factor for updating the occurrence probability of the symbol by using a first function, wherein a value of the first function is determined based on a first threshold value. The at least one instruction, when executed, may be configured to cause the processor 170 to determine, when the information about the slice type indicates a B or P slice, the first scaling factor by using a second function, wherein a value of the second function is determined based on a second threshold value.

Hereinafter, splitting of a coding unit will be described in detail according to an embodiment of the disclosure.

First, one picture may be split into one or more slices or one or more tiles. One slice or one tile may be a sequence of one or more largest coding units (coding tree units (CTUs)). There is a largest coding block (coding tree block (CTB)) conceptually compared to a largest coding unit (CTU).

The largest coding unit (CTB) denotes an N×N block including N×N samples (N is an integer). Each color component may be split into one or more largest coding blocks.

When a picture has three sample arrays (sample arrays for Y, Cr, and Cb components), a largest coding unit (CTU) includes a largest coding block of a luma sample, two corresponding largest coding blocks of chroma samples, and syntax elements used to encode the luma sample and the chroma samples. When a picture is a monochrome picture, a largest coding unit includes a largest coding block of a monochrome sample and syntax elements used to encode the monochrome samples. When a picture is a picture encoded in color planes separated according to color components, a largest coding unit includes syntax elements used to encode the picture and samples of the picture.

One largest coding block (CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax elements used to encode the luma sample and the chroma samples. When a picture is a monochrome picture, a coding unit includes a coding block of a monochrome sample and syntax elements used to encode the monochrome samples. When a picture is a picture encoded in color planes separated according to color components, a coding unit includes syntax elements used to encode the picture and samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax element corresponding to the (largest) coding block. However, because it is understood by one of ordinary skill in the art that a (largest) coding unit or a (largest) coding block refers to a block of a predetermined size including a predetermined number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, the disclosure is not limited thereto.

For example, information about a maximum size of a luma coding block may be obtained from a bitstream. For example, the maximum size of the luma coding block indicated by the information about the maximum size of the luma coding block may be one of 16×16, 32×32, 64×64, 128×128, and 256×256.

For example, information about a luma block size difference and a maximum size of a luma coding block that may be split into two may be obtained from a bitstream. The information about the luma block size difference may refer to a size difference between a luma largest coding unit and a largest luma coding block that may be split into two. Accordingly, when the information about the maximum size of the luma coding block that may be split into two and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment of the disclosure, because information about a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-picture may be 32×32, and the maximum size of the luma coding block that is ternary splittable in a P-picture or a B-picture may be 64×64.

Also, a largest coding unit may be hierarchically split into coding units based on split shape mode information obtained from a bitstream. At least one of information indicating whether quad splitting is performed, information indicating whether multi-splitting is performed, split direction information, or split type information may be obtained as the split shape mode information from the bitstream.

For example, the information indicating whether quad splitting is performed may indicate whether a current coding unit is to be quad split (QUAD_SPLIT) or is not to be quad split.

When the current coding unit is not quad split, the information indicating whether multi-splitting is performed may indicate whether the current coding unit is no longer to be split (NO_SPLIT) or is to be binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode (SPLIT_TT_VER).

The image decoding apparatus 100 may obtain, from the bitstream, the split shape mode information from one bin string. A form of the bitstream received by the image decoding apparatus 100 may include fixed length binary code, unary code, truncated unary code, predetermined binary code, or the like. The bin string is information in a binary number. The bin string may include at least one bit. The image decoding apparatus 100 may obtain, based on a split rule, the split shape mode information corresponding to the bin string. The image decoding apparatus 100 may determine, based on one bin string, whether to quad-split a coding unit, whether to not split a coding unit, a split direction, and a split type.

The coding unit may be smaller than or same as the largest coding unit. For example, because a largest coding unit is a coding unit having a maximum size, the largest coding unit is one of coding units. When split shape mode information about a largest coding unit indicates that splitting is not performed, a coding unit determined in the largest coding unit has the same size as that of the largest coding unit. When the split shape mode information about the largest coding unit indicates that splitting is performed, the largest coding unit may be split into coding units. Also, when split shape mode information about a coding unit indicates that splitting is performed, the coding unit may be split into smaller coding units. However, the splitting of the image is not limited thereto, and the largest coding unit and the coding unit may not be distinguished. The splitting of the coding unit will be described in detail with reference to FIGS. 3 through 16.

Also, one or more prediction blocks for prediction may be determined from a coding unit. The prediction block may be smaller than or same as the coding unit. Also, one or more transform blocks for transformation may be determined from a coding unit. The transform block may be smaller than or same as the coding unit.

Shapes and sizes of the transform block and prediction block may not be related to each other.

In an embodiment of the disclosure, prediction may be performed by using a coding unit as a prediction block. Also, transformation may be performed by using a coding unit as a transform block.

The splitting of the coding unit will be described in detail with reference to FIGS. 3 through 16. A current block and an adjacent block of the disclosure may indicate one of the largest coding unit, the coding unit, the prediction block, and the transform block. Also, the current block of the current coding unit is a block that is currently being decoded or encoded or a block that is currently being split. The adjacent block may be a block reconstructed before the current block. The adjacent block may be spatially or temporally adjacent to the current block. The adjacent block may be located at one of the lower left, left, upper left, top, upper right, right, lower right locations of the current block.

FIG. 3 illustrates a process, performed by the image decoding apparatus 100, of determining at least one coding unit by splitting a current coding unit, according to an embodiment of the disclosure.

A block shape may include 4N×4N, 4N×2N, 2N×4N, 4N×N, N×4N, 32N×N, N×32N, 16N×N, N×16N, 8N×N, or N×8N. In this regard, N may be a positive integer. Block shape information is information indicating at least one of a shape, a direction, a ratio of a width and a height, or a size of a width and a height of the coding unit.

The shape of the coding unit may include a square shape and a non-square shape. When the lengths of the width and the height of the coding unit are the same (i.e., when the block shape of the coding unit is 4N×4N), the image decoding apparatus 100 may determine the block shape information of the coding unit to be a square shape. The image decoding apparatus 100 may determine the shape of the coding unit to be a non-square shape.

When the lengths of the width and the height of the coding unit are different from each other (i.e., when the block shape of the coding unit is 4N×2N, 2N×4N, 4N×N, N×4N, 32N× N, N×32N, 16N×N, N×16N, 8N×N, or N×8N), the image decoding apparatus 100 may determine the block shape information of the coding unit to be a non-square shape. When the shape of the coding unit is non-square, the image decoding apparatus 100 may determine the ratio of the width and the height among the block shape information of the coding unit to be at least one of 1:2, 2:1, 1:4, 4:1, 1:8, 8:1, 1:16, 16:1, 1:32, or 32:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or an area of the coding unit.

According to an embodiment of the disclosure, the image decoding apparatus 100 may determine the shape of the coding unit by using the block shape information, and may determine a splitting method of the coding unit by using the split shape mode information. That is, the splitting method of the coding unit, indicated by the split shape mode information, may be determined based on a block shape indicated by the block shape information used by the image decoding apparatus 100.

The image decoding apparatus 100 may obtain the split shape mode information from a bitstream. However, the disclosure is not limited thereto, and the image decoding apparatus 100 and the image encoding apparatus 150 may determine pre-agreed split shape mode information, based on the block shape information. The image decoding apparatus 100 may determine the pre-agreed split shape mode information with respect to a largest coding unit or a smallest coding unit. For example, the image decoding apparatus 100 may determine split shape mode information with respect to the largest coding unit to be a quad split. Also, the image decoding apparatus 100 may determine split shape mode information with respect to the smallest coding unit to be "no split". In detail, the image decoding apparatus 100 may determine the size of the largest coding unit to be 256×256. The image decoding apparatus 100 may determine the pre-agreed split shape mode information to be a quad split. The quad split is a split shape mode in which the width and the height of the coding unit are both bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "no split" with respect to the smallest coding unit.

According to an embodiment of the disclosure, the image decoding apparatus 100 may use the block shape information indicating that the current coding unit has a square shape. For example, the image decoding apparatus 100 may determine, based on the split shape mode information, whether to not split a square coding unit, whether to vertically split the square coding unit, whether to horizontally split the square coding unit, or whether to split the square coding unit into four coding units. Referring to FIG. 3, when the block shape information of a current coding unit 300 indicates a square shape, the decoder 120 may determine a coding unit 310*a* having the same size as the current coding unit 300, based on the split shape mode information indicating no split, or may determine coding units 310*b*, 310*c*, 310*d*, 310*e*, or 310*f* split based on the split shape mode information indicating a certain splitting method.

Referring to FIG. 3, according to an embodiment of the disclosure, the image decoding apparatus 100 may determine two coding units 310*b* obtained by splitting the current coding unit 300 in a vertical direction, based on the split shape mode information indicating to perform splitting in a vertical direction. The image decoding apparatus 100 may determine two coding units 310*c* obtained by splitting the current coding unit 300 in a horizontal direction, based on the split shape mode information indicating to perform splitting in a horizontal direction. The image decoding apparatus 100 may determine four coding units 310*d* obtained by splitting the current coding unit 300 in vertical and horizontal directions, based on the split shape mode information indicating to perform splitting in vertical and horizontal directions. According to an embodiment of the disclosure, the image decoding apparatus 100 may determine three coding units 310*e* obtained by splitting the current coding unit 300 in a vertical direction, based on the split shape mode information indicating to perform ternary splitting in a vertical direction. The image decoding apparatus 100 may determine three coding units 310*f* obtained by splitting the current coding unit 300 in a horizontal direction, based on the split shape mode information indicating to perform ternary-splitting in a horizontal direction. However, split shapes of the square coding unit are not limited to the above-described methods, and the split shape mode information may indicate various methods. Certain split shapes into which the square coding unit is to be split will be described in detail below in relation to an embodiment of the disclosure.

FIG. 4 illustrates a process, performed by the image decoding apparatus 100, of determining at least one coding unit by splitting a non-square coding unit, according to an embodiment of the disclosure.

According to an embodiment of the disclosure, the image decoding apparatus 100 may use block shape information indicating that a current coding unit has a non-square shape. The image decoding apparatus 100 may determine, based on split shape mode information, whether or not to split the non-square current coding unit or whether to split the non-square current coding unit by using a certain method. Referring to FIG. 4, when the block shape information of a current coding unit 400 or 450 indicates a non-square shape, the image decoding apparatus 100 may determine a coding unit 410 or 460 having the same size as the current coding unit 400 or 450, based on the split shape mode information indicating no split, or determine coding units 420*a* and 420*b*, 430*a* to 430*c*, 470*a* and 470*b*, or 480*a* to 480*c* split based on the split shape mode information indicating a certain splitting method. Certain splitting methods of splitting a non-square coding unit will be described in detail below in relation to an embodiment of the disclosure.

According to an embodiment of the disclosure, the image decoding apparatus 100 may determine a splitting method of a coding unit by using the split shape mode information and, in this case, the split shape mode information may indicate the number of one or more coding units generated by splitting the coding unit. Referring to FIG. 4, when the split shape mode information indicates to split the current coding unit 400 or 450 into two coding units, the image decoding apparatus 100 may determine two coding units 420*a* and 420*b*, or 470*a* and 470*b* included in the current coding unit

400 or 450, by splitting the current coding unit 400 or 450 based on the split shape mode information.

According to an embodiment of the disclosure, when the image decoding apparatus 100 splits the non-square current coding unit 400 or 450 based on the split shape mode information, the image decoding apparatus 100 may split the current coding unit 400 or 450 in consideration of a location of a long side of the non-square current coding unit 400 or 450. For example, the image decoding apparatus 100 may determine a plurality of coding units by splitting a long side of the current coding unit 400 or 450, in consideration of the shape of the current coding unit 400 or 450.

According to an embodiment of the disclosure, when the split shape mode information indicates to split (ternary split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430*a*, 430*b*, and 430*c*, or 480*a*, 480*b*, and 480*c*.

According to an embodiment of the disclosure, a ratio of a width and a height of the current coding unit 400 or 450 may be 4:1 or 1:4. When the ratio of the width and the height is 4:1, the block shape information may be a horizontal direction because a length of the width is longer than a length of the height. When the ratio of the width and the height is 1:4, the block shape information may be a vertical direction because the non-square of the width is shorter than the length of the height. The image decoding apparatus 100 may determine to split a current coding unit into the odd number of blocks, based on the split shape mode information. Also, the image decoding apparatus 100 may determine a split direction of the current coding unit 400 or 450, based on the block shape information of the current coding unit 400 or 450. For example, when the current coding unit 400 corresponds to a vertical direction because a height of the current coding unit 400 is greater than a width of the current coding unit 400, the image decoding apparatus 100 may determine coding units 430*a*, 430*b*, and 430*c* by splitting the current coding unit 400 in a horizontal direction. Also, when the current coding unit 450 corresponds to a horizontal direction because a width of the current coding unit 450 is greater than a height of the current coding unit 450, the image decoding apparatus 100 may determine coding units 480*a*, 480*b*, and 480*c* by splitting the current coding unit 450 in a vertical direction.

According to an embodiment of the disclosure, the image decoding apparatus 100 may determine the odd number of coding units included in the current coding unit 400 or 450, and not all the determined coding units may have the same size. For example, a certain coding unit 430*b* or 480*b* from among the determined odd number of coding units 430*a*, 430*b*, and 430*c*, or 480*a*, 480*b*, and 480*c* may have a size different from those of the other coding units 430*a* and 430*c*, or 480*a* and 480*c*. That is, coding units which may be determined by splitting the current coding unit 400 or 450 may have multiple sizes and, in some cases, all of the odd number of coding units 430*a*, 430*b*, and 430*c*, or 480*a*, 480*b*, and 480*c* may have different sizes.

According to an embodiment of the disclosure, when the split shape mode information indicates to split a coding unit into the odd number of blocks, the image decoding apparatus 100 may determine the odd number of coding units included in the current coding unit 400 or 450, and in addition, may put a certain restriction on at least one coding unit from among the odd number of coding units generated by splitting the current coding unit 400 or 450. Referring to FIG. 4, the image decoding apparatus 100 may set a decoding process regarding the coding unit 430*b* or 480*b* at a center location among the three coding units 430*a*, 430*b*, and 430*c* or 480*a*, 480*b*, and 480*c* generated by splitting the current coding unit 400 or 450, to be different from that of the other coding units 430*a* and 430*c*, or 480*a* and 480*c*. For example, the image decoding apparatus 100 may restrict the coding unit 430*b* or 480*b* at the center location to be no longer split or to be split only a certain number of times, unlike the other coding units 430*a* and 430*c*, or 480*a* and 480*c*.

Figure 5:
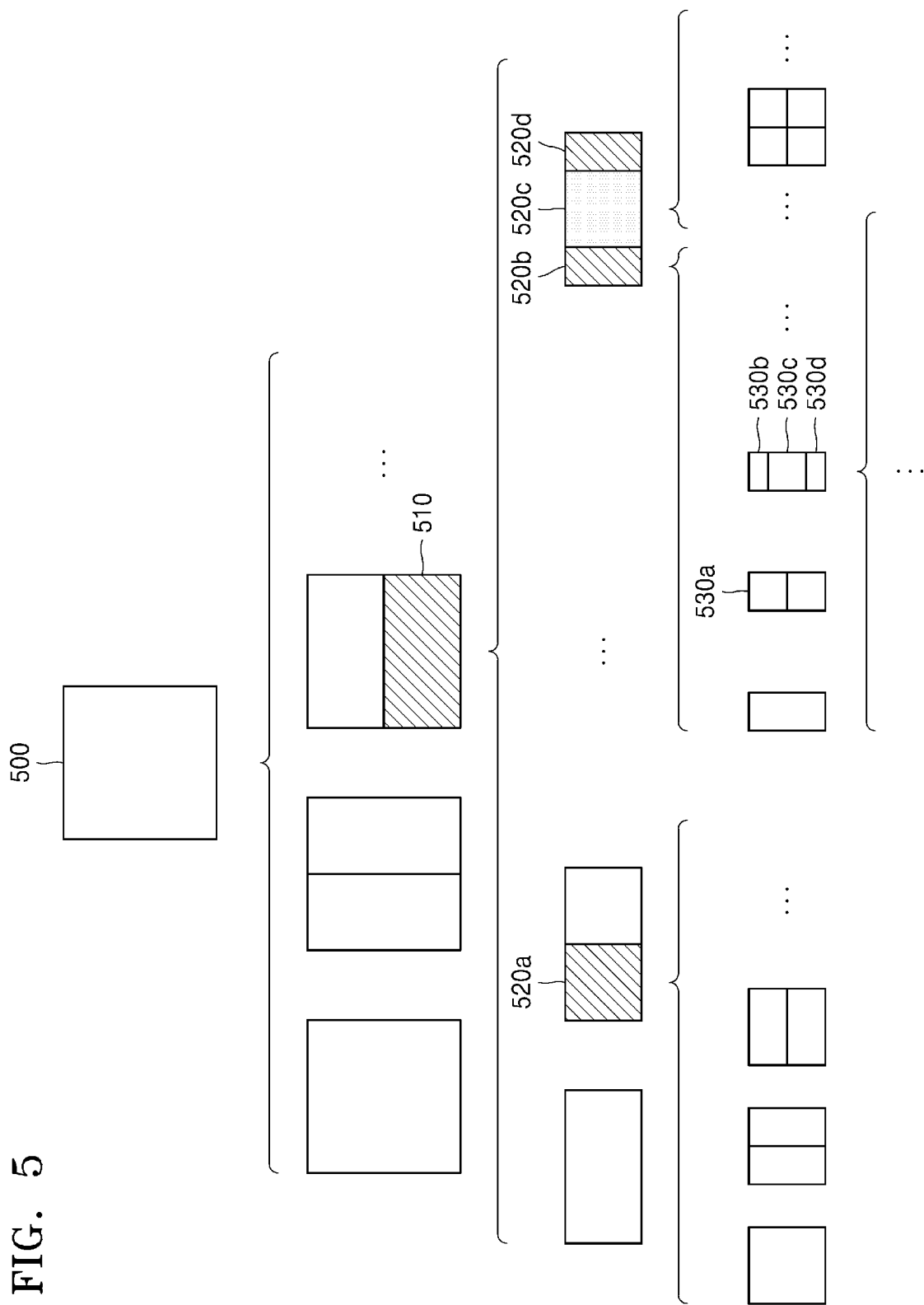
FIG. 5 illustrates a process, performed by an image decoding apparatus, of splitting a coding unit based on at least one of block shape information or split shape mode information, according to an embodiment of the disclosure.

FIG. 5 illustrates a process, performed by the image decoding apparatus 100, of splitting a coding unit based on at least one of block shape information or split shape mode information, according to an embodiment of the disclosure.

According to an embodiment of the disclosure, the image decoding apparatus 100 may determine to split or not to split a square first coding unit 500 into coding units, based on at least one of the block shape information or the split shape mode information. According to an embodiment of the disclosure, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment of the disclosure are terms used to understand a relation before and after splitting a coding unit. For example, a second coding unit may be determined by splitting a first coding unit, and a third coding unit may be determined by splitting the second coding unit. It will be understood that a relation among the first coding unit, the second coding unit, and the third coding unit follows the above descriptions.

According to an embodiment of the disclosure, the image decoding apparatus 100 may determine to split or not to split the determined second coding unit 510 into coding units, based on the split shape mode information. Referring to FIG. 5, the image decoding apparatus 100 may or may not split the non-square second coding unit 510, which is determined by splitting the first coding unit 500, into one or more third coding units 520*a*, or 520*b*, 520*c*, and 520*d* based on the split shape mode information. The image decoding apparatus 100 may obtain the split shape mode information, and may determine a plurality of various-shaped second coding units (e.g., 510) by splitting the first coding unit 500, based on the obtained split shape mode information, and the second coding unit 510 may be split by using a splitting method of the first coding unit 500 based on the split shape mode information. According to an embodiment of the disclosure, when the first coding unit 500 is split into the second coding units 510 based on the split shape mode information of the first coding unit 500, the second coding unit 510 may also be split into the third coding units 520*a*, or 520*b*, 520*c*, and 520*d* based on the split shape mode information of the second coding unit 510. That is, a coding unit may be recursively split based on split shape mode information of each coding unit. Therefore, a square coding unit may be determined by splitting a non-square coding unit, and a non-square coding unit may be determined by recursively splitting the square coding unit.

Referring to FIG. 5, a certain coding unit from among the odd number of third coding units 520*b*, 520*c*, and 520*d* determined by splitting the non-square second coding unit 510 (e.g., a coding unit at a center location or a square coding unit) may be recursively split. According to an embodiment of the disclosure, the square third coding unit 520*b* from among the odd number of third coding units 520*b*, 520*c*, and 520*d* may be split in a horizontal direction into a plurality of fourth coding units. A non-square fourth coding unit 530*b* or 530*d* from among a plurality of fourth coding units 530*a*, 530*b*, 530*c*, and 530*d* may be split into a plurality of coding units again. For example, the non-square fourth coding unit 530*b* or 530*d* may be split into the odd number of coding units again. A method that may be used to recursively split a coding unit will be described below in relation to an embodiment of the disclosure.

According to an embodiment of the disclosure, the image decoding apparatus 100 may split each of the third coding units 520*a*, or 520*b*, 520*c*, and 520*d* into coding units, based on the split shape mode information. Also, the image decoding apparatus 100 may determine not to split the second coding unit 510 based on the split shape mode information. According to an embodiment of the disclosure, the image decoding apparatus 100 may split the non-square second coding unit 510 into the odd number of third coding units 520*b*, 520*c*, and 520*d*. The image decoding apparatus 100 may put a certain restriction on a certain third coding unit from among the odd number of third coding units 520*b*, 520*c*, and 520*d*. For example, the image decoding apparatus 100 may restrict the third coding unit 520*c* at a center location from among the odd number of third coding units 520*b*, 520*c*, and 520*d* to be no longer split or to be split a settable number of times.

Referring to FIG. 5, the image decoding apparatus 100 may restrict the third coding unit 520*c*, which is at the center location from among the odd number of third coding units 520*b*, 520*c*, and 520*d* included in the non-square second coding unit 510, to be no longer split, to be split by using a certain splitting method (e.g., split into only four coding units or split by using a splitting method of the second coding unit 510), or to be split only a certain number of times (e.g., split only n times (where n>0)). However, the restrictions on the third coding unit 520*c* at the center location are not limited to the above-described examples, and may include various restrictions for decoding the third coding unit 520*c* at the center location differently from the other third coding units 520*b* and 520*d*.

According to an embodiment of the disclosure, the image decoding apparatus 100 may obtain the split shape mode information, which is used to split a current coding unit, from a certain location in the current coding unit.

Figure 6:
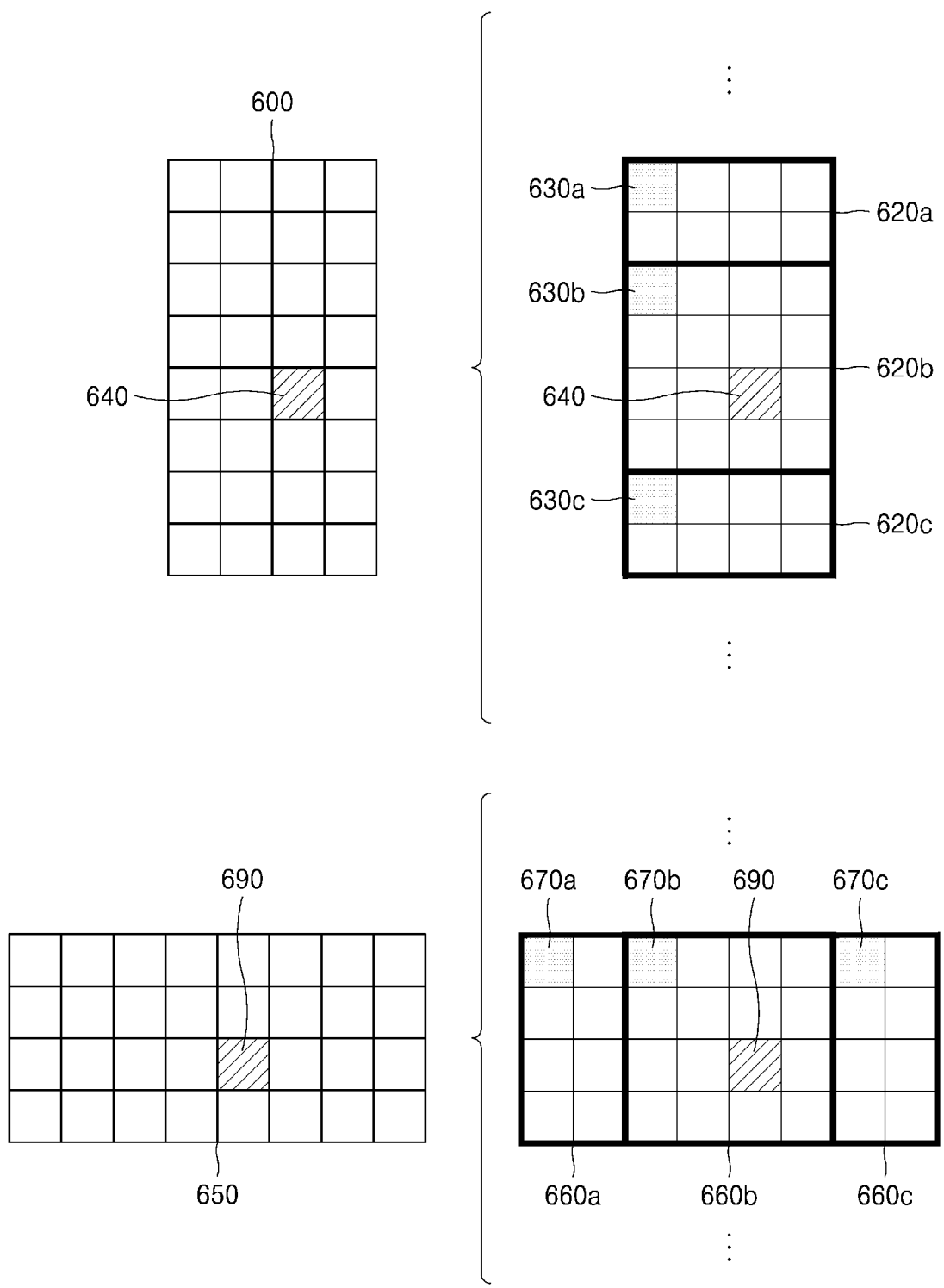
FIG. 6 illustrates a method, performed by an image decoding apparatus, of determining a predetermined coding unit from among an odd number of coding units, according to an embodiment of the disclosure.

FIG. 6 illustrates a method, performed by the image decoding apparatus 100, of determining a certain coding unit from among an odd number of coding units, according to an embodiment of the disclosure.

Referring to FIG. 6, split shape mode information of a current coding unit 600 or 650 may be obtained from a sample at a certain location (e.g., a sample 640 or 690 at a center location) from among a plurality of samples included in the current coding unit 600 or 650. However, the certain location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, and lower right locations). The image decoding apparatus 100 may obtain the split shape mode information from the certain location and may determine to split or not to split the current coding unit into various-shaped and various-sized coding units.

According to an embodiment of the disclosure, when the current coding unit is split into a certain number of coding units, the image decoding apparatus 100 may select one of the coding units. Various methods may be used to select one of a plurality of coding units, as will be described below in relation to an embodiment of the disclosure.

According to an embodiment of the disclosure, the image decoding apparatus 100 may split the current coding unit into a plurality of coding units, and may determine a coding unit at a certain location.

According to an embodiment of the disclosure, the image decoding apparatus 100 may use information indicating locations of the odd number of coding units, to determine a coding unit at a center location from among the odd number of coding units. Referring to FIG. 6, the image decoding apparatus 100 may determine the odd number of coding units 620*a*, 620*b*, and 620*c* or the odd number of coding units 660*a*, 660*b*, and 660*c* by splitting the current coding unit 600 or the current coding unit 650. The image decoding apparatus 100 may determine the middle coding unit 620*b* or the middle coding unit 660*b* by using information about the locations of the odd number of coding units 620*a*, 620*b*, and 620*c* or the odd number of coding units 660*a*, 660*b*, and 660*c*. For example, the image decoding apparatus 100 may determine the coding unit 620*b* at the center location by determining the locations of the coding units 620*a*, 620*b*, and 620*c* based on information indicating locations of certain samples included in the coding units 620*a*, 620*b*, and 620*c*. In detail, the image decoding apparatus 100 may determine the coding unit 620*b* at the center location by determining the locations of the coding units 620*a*, 620*b*, and 620*c* based on information indicating locations of upper left samples 630*a*, 630*b*, and 630*c* of the coding units 620*a*, 620*b*, and 620*c*.

According to an embodiment of the disclosure, the information indicating the locations of the upper left samples 630*a*, 630*b*, and 630*c*, which are included in the coding units 620*a*, 620*b*, and 620*c*, respectively, may include information about locations or coordinates of the coding units 620*a*, 620*b*, and 620*c* in a picture. According to an embodiment of the disclosure, the information indicating the locations of the upper left samples 630*a*, 630*b*, and 630*c*, which are included in the coding units 620*a*, 620*b*, and 620*c*, respectively, may include information indicating widths or heights of the coding units 620*a*, 620*b*, and 620*c* included in the current coding unit 600, and the widths or heights may correspond to information indicating differences between the coordinates of the coding units 620*a*, 620*b*, and 620*c* in the picture. That is, the image decoding apparatus 100 may determine the coding unit 620*b* at the center location by directly using the information about the locations or coordinates of the coding units 620*a*, 620*b*, and 620*c* in the picture, or by using the information about the widths or heights of the coding units, which correspond to the difference values between the coordinates.

According to an embodiment of the disclosure, information indicating the location of the upper left sample 630*a* of the upper coding unit 620*a* may include coordinates (xa, ya), information indicating the location of the upper left sample 630*b* of the middle coding unit 620*b* may include coordinates (xb, yb), and information indicating the location of the upper left sample 630*c* of the lower coding unit 620*c* may include coordinates (xc, yc). The image decoding apparatus 100 may determine the middle coding unit 620*b* by using the coordinates of the upper left samples 630*a*, 630*b*, and 630*c* which are included in the coding units 620*a*, 620*b*, and 620*c*, respectively. For example, when the coordinates of the upper left samples 630*a*, 630*b*, and 630*c* are sorted in an ascending or descending order, the coding unit 620*b* including the coordinates (xb, yb) of the sample 630*b* at a center location may be determined as a coding unit at a center location from among the coding units 620a, 620b, and 620c determined by splitting the current coding unit 600. However, the coordinates indicating the locations of the upper left samples 630a, 630b, and 630c may include coordinates indicating absolute locations in the picture, or may use coordinates (dxb, dyb) indicating a relative location of the upper left sample 630b of the middle coding unit 620b and coordinates (dxc, dyc) indicating a relative location of the upper left sample 630c of the lower coding unit 620c with respect to the location of the upper left sample 630a of the upper coding unit 620a. A method of determining a coding unit at a certain location by using coordinates of a sample included in the coding unit, as information indicating a location of the sample, is not limited to the above-described method, and may include various arithmetic methods capable of using the coordinates of the sample.

According to an embodiment of the disclosure, the image decoding apparatus 100 may split the current coding unit 600 into a plurality of coding units 620a, 620b, and 620c, and may select one of the coding units 620a, 620b, and 620c based on a certain criterion. For example, the image decoding apparatus 100 may select the coding unit 620b, which has a size different from those of the others, from among the coding units 620a, 620b, and 620c.

According to an embodiment of the disclosure, the image decoding apparatus 100 may determine a width or a height of each of the coding units 620a, 620b, and 620c by using the coordinates (xa, ya) that are the information indicating the location of the upper left sample 630a of the upper coding unit 620a, the coordinates (xb, yb) that are the information indicating the location of the upper left sample 630b of the middle coding unit 620b, and the coordinates (xc, yc) that are the information indicating the location of the upper left sample 630c of the lower coding unit 620c. The image decoding apparatus 100 may determine respective sizes of the coding units 620a, 620b, and 620c by using the coordinates (xa, ya), (xb, yb), and (xc, yc) indicating the locations of the coding units 620a, 620b, and 620c. According to an embodiment of the disclosure, the image decoding apparatus 100 may determine the width of the upper coding unit 620a to be a width of the current coding unit 600. The image decoding apparatus 100 may determine the height of the upper coding unit 620a to be yb-ya. According to an embodiment of the disclosure, the image decoding apparatus 100 may determine the width of the middle coding unit 620b to be the width of the current coding unit 600. The image decoding apparatus 100 may determine the height of the middle coding unit 620b to be yc-yb. According to an embodiment of the disclosure, the image decoding apparatus 100 may determine the width or the height of the lower coding unit 620c by using the width or a height of the current coding unit 600 or the widths or the heights of the upper and middle coding units 620a and 620b. The image decoding apparatus 100 may determine a coding unit, which has a size different from those of the others, based on the determined widths and heights of the coding units 620a to 620c. Referring to FIG. 6, the image decoding apparatus 100 may determine the middle coding unit 620b, which has a size different from those of the upper and lower coding units 620a and 620c, to be the coding unit at the certain location. However, the above-described method, performed by the image decoding apparatus 100, of determining a coding unit having a size different from those of the other coding units merely corresponds to an example of determining a coding unit at a certain location by using the sizes of coding units, which are determined based on coordinates of samples, and thus various methods of determining a coding unit at a certain location by comparing the sizes of coding units, which are determined based on coordinates of certain samples, may be used.

The image decoding apparatus 100 may determine a width or a height of each of the coding units 660a, 660b, and 660c by using the coordinates (xd, yd) that are information indicating the location of a upper left sample 670a of the left coding unit 660a, the coordinates (xe, ye) that are information indicating the location of a upper left sample 670b of the middle coding unit 660b, and the coordinates (xf, yf) that are information indicating a location of the upper left sample 670c of the right coding unit 660c. The image decoding apparatus 100 may determine respective sizes of the coding units 660a, 660b, and 660c by using the coordinates (xd, yd), (xe, ye), and (xf, yf) indicating the locations of the coding units 660a, 660b, and 660c.

According to an embodiment of the disclosure, the image decoding apparatus 100 may determine the width of the left coding unit 660a to be xe-xd. The image decoding apparatus 100 may determine the height of the left coding unit 660a to be a height of the current coding unit 650. According to an embodiment of the disclosure, the image decoding apparatus 100 may determine the width of the middle coding unit 660b to be xf-xe. The image decoding apparatus 100 may determine the height of the middle coding unit 660b to be the height of the current coding unit 650. According to an embodiment of the disclosure, the image decoding apparatus 100 may determine the width or the height of the right coding unit 660c by using a width or the height of the current coding unit 650 or the widths or the heights of the left and middle coding units 660a and 660b. The image decoding apparatus 100 may determine a coding unit, which has a size different from those of the others, based on the determined widths and heights of the coding units 660a to 660c. Referring to FIG. 6, the image decoding apparatus 100 may determine the middle coding unit 660b, which has a size different from those of the left and right coding units 660a and 660c, to be the coding unit at the certain location. However, the above-described method, performed by the image decoding apparatus 100, of determining a coding unit having a size different from those of the other coding units merely corresponds to an example of determining a coding unit at a certain location by using the sizes of coding units, which are determined based on coordinates of samples, and thus various methods of determining a coding unit at a certain location by comparing the sizes of coding units, which are determined based on coordinates of certain samples, may be used.

However, locations of samples considered to determine locations of coding units are not limited to the above-described upper left locations, and information about arbitrary locations of samples included in the coding units may be used.

According to an embodiment of the disclosure, the image decoding apparatus 100 may select a coding unit at a certain location from among an odd number of coding units determined by splitting the current coding unit, in consideration of a shape of the current coding unit. For example, when the current coding unit has a non-square shape, a width of which is longer than a height, the image decoding apparatus 100 may determine the coding unit at the certain location in a horizontal direction. That is, the image decoding apparatus 100 may determine one of coding units at different locations in a horizontal direction and put a restriction on the coding unit. When the current coding unit has a non-square shape, a height of which is longer than a width, the image decoding apparatus 100 may determine the coding unit at the certain location in a vertical direction. That is, the image decoding apparatus 100 may determine one of coding units at different locations in a vertical direction and may put a restriction on the coding unit.

According to an embodiment of the disclosure, the image decoding apparatus 100 may use information indicating respective locations of an even number of coding units, to determine the coding unit at the certain location from among the even number of coding units. The image decoding apparatus 100 may determine an even number of coding units by splitting (binary splitting) the current coding unit, and may determine the coding unit at the certain location by using the information about the locations of the even number of coding units. A specific process related thereto may correspond to the process of determining a coding unit at a certain location (e.g., a center location) from among an odd number of coding units, which has been described in detail above in relation to FIG. 6, and thus, detailed descriptions thereof are not provided herein.

According to an embodiment of the disclosure, when a non-square current coding unit is split into a plurality of coding units, certain information about a coding unit at a certain location may be used in a splitting process to determine the coding unit at the certain location from among the plurality of coding units. For example, the image decoding apparatus 100 may use at least one of block shape information or split shape mode information, which is stored in a sample included in a middle coding unit, in a splitting process to determine a coding unit at a center location from among the plurality of coding units determined by splitting the current coding unit.

Referring to FIG. 6, the image decoding apparatus 100 may split the current coding unit 600 into the plurality of coding units 620a, 620b, and 620c based on the split shape mode information, and may determine the coding unit 620b at a center location from among the plurality of the coding units 620a, 620b, and 620c. Furthermore, the image decoding apparatus 100 may determine the coding unit 620b at the center location, in consideration of a location from which the split shape mode information is obtained. That is, the split shape mode information of the current coding unit 600 may be obtained from the sample 640 at a center location of the current coding unit 600, and when the current coding unit 600 is split into the plurality of coding units 620a, 620b, and 620c based on the split shape mode information, the coding unit 620b including the sample 640 may be determined to be the coding unit at the center location. However, information used to determine the coding unit at the center location is not limited to the split shape mode information, and various types of information may be used to determine the coding unit at the center location.

According to an embodiment of the disclosure, certain information for identifying the coding unit at the certain location may be obtained from a certain sample included in a coding unit to be determined. Referring to FIG. 6, the image decoding apparatus 100 may use the split shape mode information, which is obtained from a sample at a certain location in the current coding unit 600 (e.g., a sample at a center location of the current coding unit 600) to determine a coding unit at a certain location from among the plurality of the coding units 620a, 620b, and 620c determined by splitting the current coding unit 600 (e.g., a coding unit at a center location from among a plurality of split coding units). That is, the image decoding apparatus 100 may determine the sample at the certain location in consideration of a block shape of the current coding unit 600, may determine the coding unit 620b including a sample, from which certain information (e.g., the split shape mode information) may be obtained, from among the plurality of coding units 620a, 620b, and 620c determined by splitting the current coding unit 600, and may put a certain restriction on the coding unit 620b. Referring to FIG. 6, according to an embodiment of the disclosure, the image decoding apparatus 100 may determine the sample 640 at the center location of the current coding unit 600 as the sample from which the certain information may be obtained, and may put a certain restriction on the coding unit 620b including the sample 640, in a decoding process. However, the location of the sample from which the certain information may be obtained is not limited to the above-described location, and may include arbitrary locations of samples included in the coding unit 620b to be determined for a restriction.

According to an embodiment of the disclosure, the location of the sample from which the certain information may be obtained may be determined based on a shape of the current coding unit 600. According to an embodiment of the disclosure, the block shape information may indicate whether the current coding unit has a square or non-square shape, and the location of the sample from which the certain information may be obtained may be determined based on the shape. For example, the image decoding apparatus 100 may determine a sample located on a boundary at which at least one of a width or a height of the current coding unit is split in half, to be the sample from which the certain information may be obtained, by using at least one of information about the width of the current coding unit or information about the height of the current coding unit. As another example, when block shape information related to a current coding unit indicates a non-square shape, the image decoding apparatus 100 may determine one of samples being adjacent to a boundary at which a longer side of the current coding unit is split in half, to be a sample from which certain information may be obtained.

According to an embodiment of the disclosure, when the current coding unit is split into a plurality of coding units, the image decoding apparatus 100 may use the split shape mode information to determine a coding unit at a certain location from among the plurality of coding units. According to an embodiment of the disclosure, the image decoding apparatus 100 may obtain the split shape mode information from a sample at a certain location in a coding unit, and may split the plurality of coding units, which are generated by splitting the current coding unit, by using the split shape mode information, which is obtained from the sample at the certain location in each of the plurality of coding units. That is, a coding unit may be recursively split based on the split shape mode information, which is obtained from the sample at the certain location in each coding unit. A process of recursively splitting a coding unit has been described above in relation to FIG. 5, and thus, detailed descriptions thereof will not be provided herein.

According to an embodiment of the disclosure, the image decoding apparatus 100 may determine one or more coding units by splitting the current coding unit, and may determine an order of decoding the one or more coding units, based on a certain block (e.g., the current coding unit).

Figure 7:
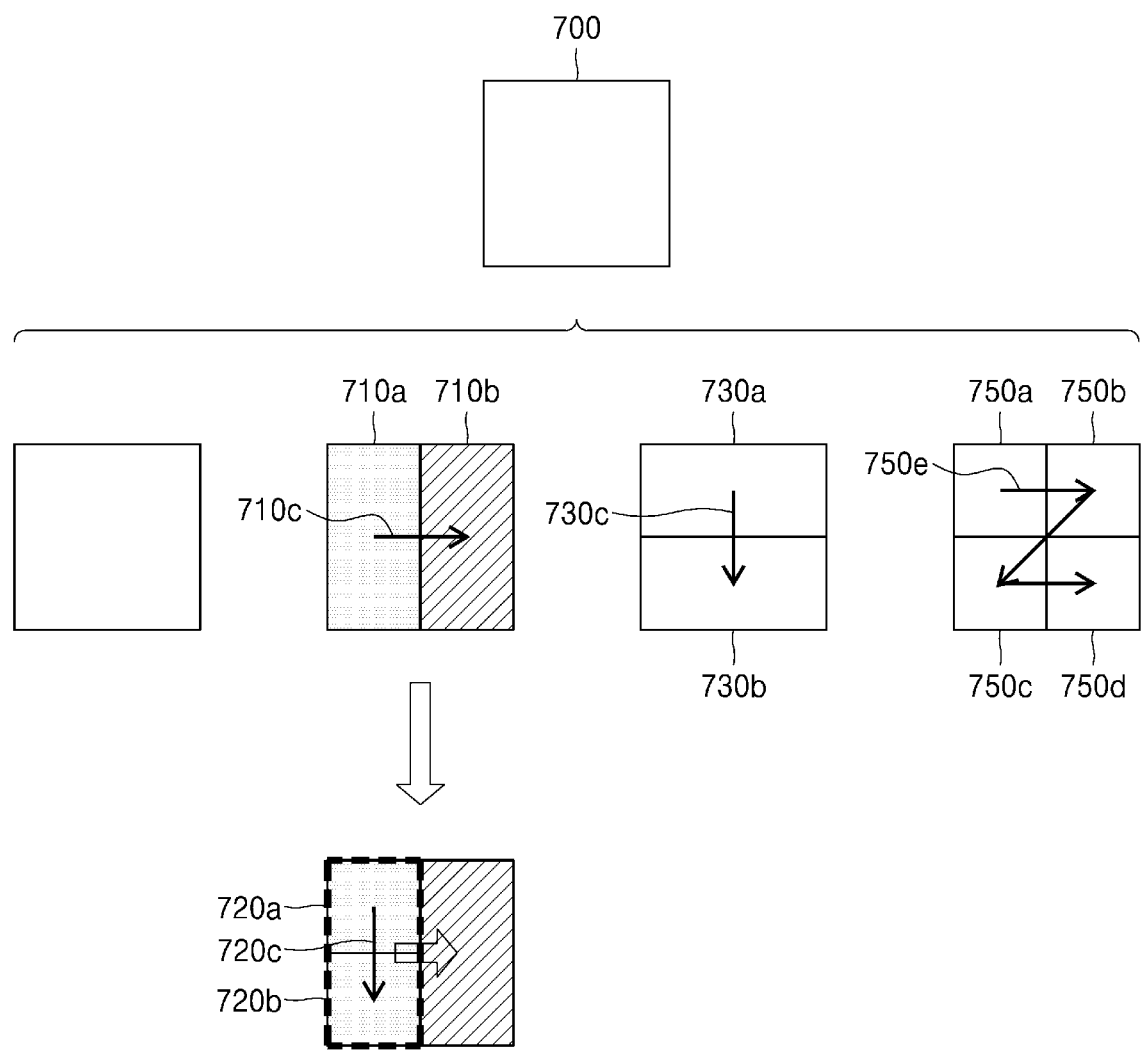
FIG. 7 illustrates an order of processing a plurality of coding units when an image decoding apparatus determines the plurality of coding units by splitting a current coding unit, according to an embodiment of the disclosure.

FIG. 7 illustrates an order of processing a plurality of coding units when the image decoding apparatus 100 determines the plurality of coding units by splitting a current coding unit, according to an embodiment of the disclosure.

According to an embodiment of the disclosure, the image decoding apparatus 100 may determine second coding units 710a and 710b by splitting a first coding unit 700 in a vertical direction, may determine second coding units 730*a* and 730*b* by splitting the first coding unit 700 in a horizontal direction, or may determine second coding units 750*a*, 750*b*, 750*c*, and 750*d* by splitting the first coding unit 700 in vertical and horizontal directions, based on split shape mode information.

Referring to FIG. 7, the image decoding apparatus 100 may determine the second coding units 710*a* and 710*b*, which are determined by splitting the first coding unit 700 in a vertical direction, to be processed in a horizontal direction order 710*c*. The image decoding apparatus 100 may determine the second coding units 730*a* and 730*b*, which are determined by splitting the first coding unit 700 in a horizontal direction, to be processed in a vertical direction order 730*c*. The image decoding apparatus 100 may determine the second coding units 750*a*, 750*b*, 750*c*, and 750*d*, which are determined by splitting the first coding unit 700 in vertical and horizontal directions, to be processed in a certain order for processing coding units in a row and then processing coding units in a next row (e.g., in a raster scan order or Z-scan order 750*e*).

According to an embodiment of the disclosure, the image decoding apparatus 100 may recursively split coding units. Referring to FIG. 7, the image decoding apparatus 100 may determine the plurality of coding units 710*a* and 710*b*, 730*a* and 730*b*, or 750*a*, 750*b*, 750*c*, and 750*d* by splitting the first coding unit 700, and may recursively split each of the plurality of determined coding units 710*a* and 710*b*, 730*a* and 730*b*, or 750*a*, 750*b*, 750*c*, and 750*d*. A splitting method of the plurality of coding units 710*a* and 710*b*, 730*a* and 730*b*, or 750*a*, 750*b*, 750*c*, and 750*d* may correspond to a splitting method of the first coding unit 700. Accordingly, each of the plurality of coding units 710*a* and 710*b*, 730*a* and 730*b*, or 750*a*, 750*b*, 750*c*, and 750*d* may be independently split into a plurality of coding units. Referring to FIG. 7, the image decoding apparatus 100 may determine the second coding units 710*a* and 710*b* by splitting the first coding unit 700 in a vertical direction, and may determine to independently split or not to split each of the second coding units 710*a* and 710*b*.

According to an embodiment of the disclosure, the image decoding apparatus 100 may determine third coding units 720*a* and 720*b* by splitting the left second coding unit 710*a* in a horizontal direction, and may not split the right second coding unit 710*b*.

According to an embodiment of the disclosure, a processing order of coding units may be determined based on a process of splitting a coding unit. In other words, a processing order of split coding units may be determined based on a processing order of coding units immediately before being split. The image decoding apparatus 100 may determine a processing order of the third coding units 720*a* and 720*b* determined by splitting the left second coding unit 710*a*, independently of the right second coding unit 710*b*. Because the third coding units 720*a* and 720*b* are determined by splitting the left second coding unit 710*a* in a horizontal direction, the third coding units 720*a* and 720*b* may be processed in a vertical direction order 720*c*. Because the left and right second coding units 710*a* and 710*b* are processed in the horizontal direction order 710*c*, the right second coding unit 710*b* may be processed after the third coding units 720*a* and 720*b* included in the left second coding unit 710*a* are processed in the vertical direction order 720*c*. A process of determining a processing order of coding units based on a coding unit before being split is not limited to the above-described example, and various methods may be used to independently process coding units, which are split and determined to various shapes, in a certain order.

Figure 8:
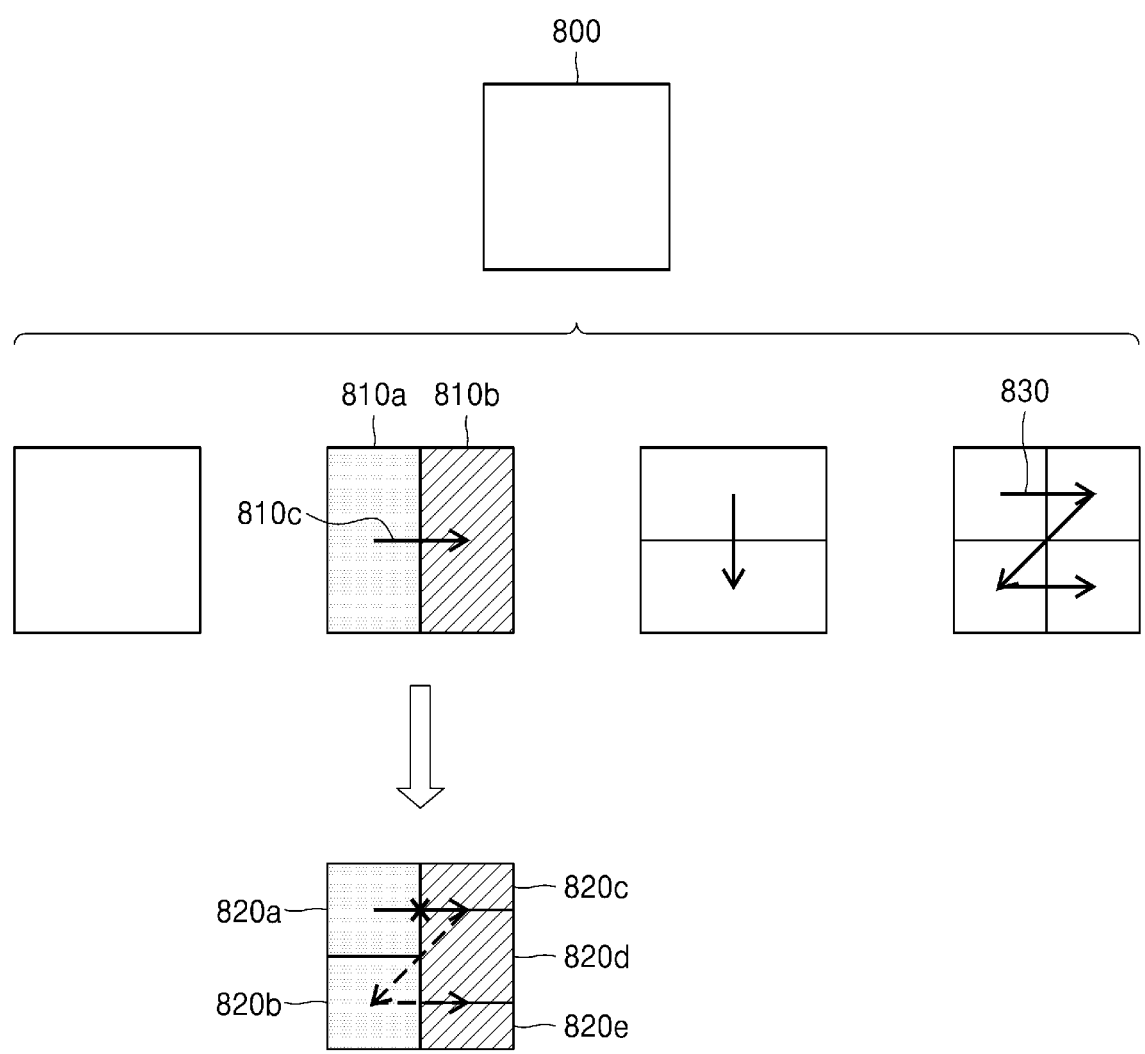
FIG. 8 illustrates a process, performed by an image decoding apparatus, of determining that a current coding unit is to be split into an odd number of coding units, when the coding units are not processable in a predetermined order, according to an embodiment of the disclosure.

FIG. 8 illustrates a process, performed by the image decoding apparatus 100, of determining that a current coding unit is to be split into an odd number of coding units, when the coding units are not processable in a certain order, according to an embodiment of the disclosure.

According to an embodiment of the disclosure, the image decoding apparatus 100 may determine that the current coding unit is split into an odd number of coding units, based on obtained split shape mode information. Referring to FIG. 8, a square first coding unit 800 may be split into non-square second coding units 810*a* and 810*b*, and the second coding units 810*a* and 810*b* may be independently split into third coding units 820*a* and 820*b*, and 820*c*, 820*d*, and 820*e*. According to an embodiment of the disclosure, the image decoding apparatus 100 may determine the plurality of third coding units 820*a* and 820*b* by splitting the left second coding unit 810*a* in a horizontal direction, and may split the right second coding unit 810*b* into the odd number of third coding units 820*c* to 820*e*.

According to an embodiment of the disclosure, the image decoding apparatus 100 may determine whether any coding unit is split into an odd number of coding units, by determining whether the third coding units 820*a* and 820*b*, and 820*c* to 820*e* are processable in a certain order. Referring to FIG. 8, the image decoding apparatus 100 may determine the third coding units 820*a* and 820*b*, and 820*c* to 820*e* by recursively splitting the first coding unit 800. The image decoding apparatus 100 may determine whether any of the first coding unit 800, the second coding units 810*a* and 810*b*, and the third coding units 820*a* and 820*b*, and 820*c* to 820*e* are split into an odd number of coding units, based on at least one of the block shape information or the split shape mode information. For example, the right second coding unit 810*b* among the second coding units 810*a* and 810*b* may be split into an odd number of third coding units 820*c* to 820*e*. A processing order of a plurality of coding units included in the first coding unit 800 may be a certain order (e.g., a Z-scan order 830), and the image decoding apparatus 100 may determine whether the third coding units 820*c*, 820*d*, and 820*e*, which are determined by splitting the right second coding unit 810*b* into an odd number of coding units, satisfy a condition for processing in the certain order.

According to an embodiment of the disclosure, the image decoding apparatus 100 may determine whether the third coding units 820*a* and 820*b*, and 820*c* to 820*e* included in the first coding unit 800 satisfy the condition for processing in the certain order, and the condition relates to whether at least one of a width or a height of the second coding units 810*a* and 810*b* is to be split in half along a boundary of the third coding units 820*a* and 820*b*, and 820*c* to 820*e*. For example, the third coding units 820*a* and 820*b* determined when the height of the non-square left second coding unit 810*a* is split in half may satisfy the condition. However, because the boundaries of the third coding units 820*c* to 820*e* determined when the right second coding unit 810*b* is split into three coding units are unable to split the width or the height of the right second coding unit 810*b* in half, it may be determined that the third coding units 820*c* to 820*e* do not satisfy the condition. When the condition is not satisfied as described above, the image decoding apparatus 100 may determine disconnection of a scan order, and may determine that the right second coding unit 810*b* is split into an odd number of coding units, based on a result of the determination. According to an embodiment of the disclosure, when a coding unit is split into an odd number of coding units, the image decoding apparatus 100 may put a certain restriction on a coding unit at a certain location from among the split coding units. The restriction or the certain location has been described above in relation to an embodiment of the disclosure, and thus, detailed descriptions thereof will not be provided herein.

Figure 9:
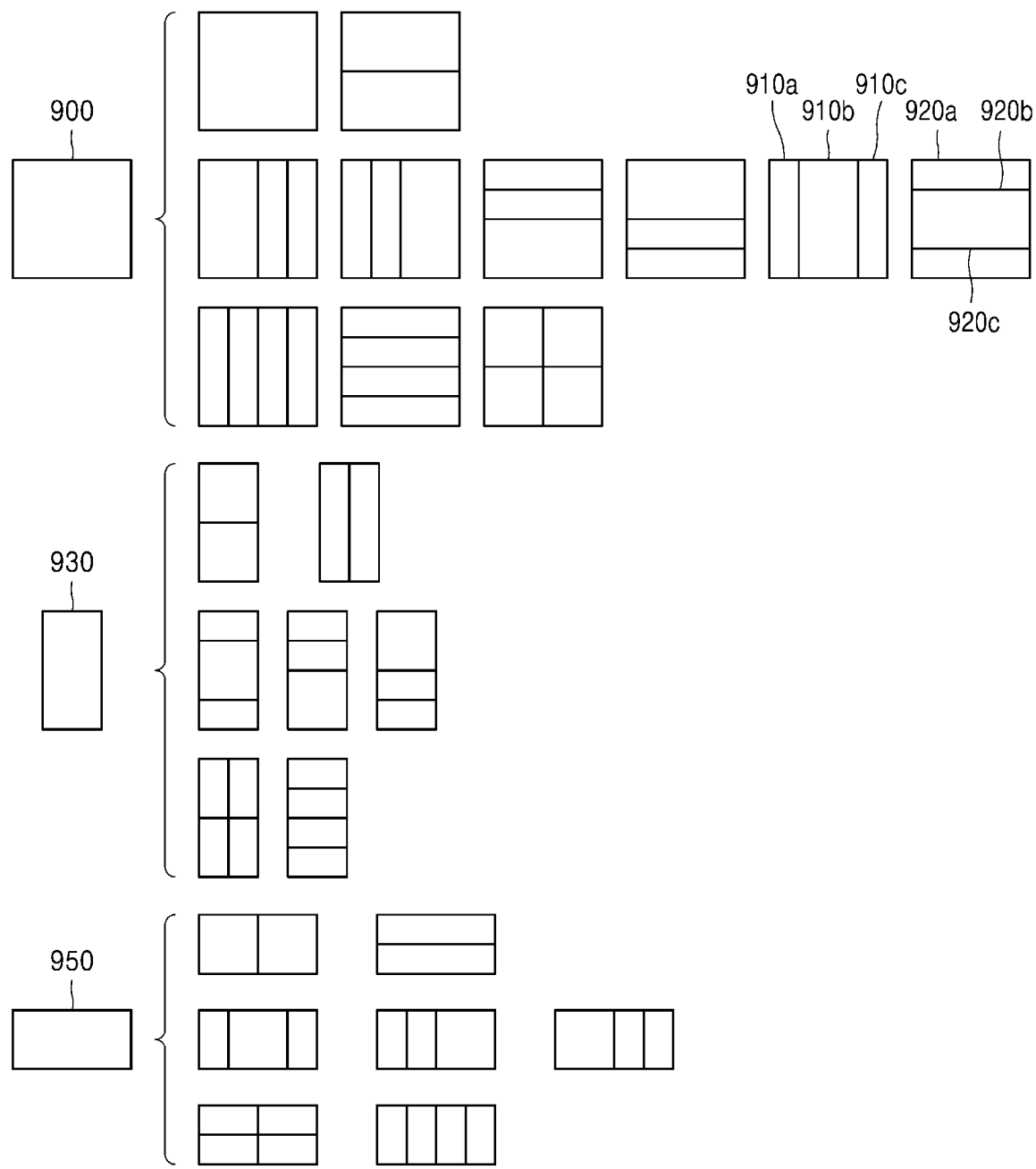
FIG. 9 illustrates a process, performed by an image decoding apparatus, of determining at least one coding unit by splitting a first coding unit, according to an embodiment of the disclosure.

FIG. 9 illustrates a process, performed by the image decoding apparatus 100, of determining at least one coding unit by splitting a first coding unit 900, according to an embodiment of the disclosure.

According to an embodiment of the disclosure, the image decoding apparatus 100 may split the first coding unit 900, based on split shape mode information, which is obtained through a receiver (not shown). The square first coding unit 900 may be split into four square coding units, or may be split into a plurality of non-square coding units. For example, referring to FIG. 9, when the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910*a*, 910*b*, and 910*c* determined by splitting the square first coding unit 900 in a vertical direction or second coding units 920*a*, 920*b*, and 920*c* determined by splitting the square first coding unit 900 in a horizontal direction.

According to an embodiment of the disclosure, the image decoding apparatus 100 may determine whether the second coding units 910*a*, 910*b*, and 910*c*, and 920*a*, 920*b*, and 920*c* included in the first coding unit 900 satisfy a condition for processing in a certain order, and the condition relates to whether at least one of a width or a height of the first coding unit 900 is to be split in half along a boundary of the second coding units 910*a*, 910*b*, and 910*c*, and 920*a*, 920*b*, and 920*c*. Referring to FIG. 9, because boundaries of the second coding units 910*a*, 910*b*, and 910*c* determined by splitting the square first coding unit 900 in a vertical direction are unable to split the width of the first coding unit 900 in half, it may be determined that the first coding unit 900 does not satisfy the condition for processing in the certain order. In addition, because boundaries of the second coding units 920*a*, 920*b*, and 920*c* determined by splitting the square first coding unit 900 in a horizontal direction are unable to split the width of the first coding unit 900 in half, it may be determined that the first coding unit 900 does not satisfy the condition for processing in the certain order. When the condition is not satisfied as described above, the image decoding apparatus 100 may determine disconnection of a scan order, and may determine that the first coding unit 900 is split into an odd number of coding units, based on a result of the determination. According to an embodiment of the disclosure, when a coding unit is split into an odd number of coding units, the image decoding apparatus 100 may put a certain restriction on a coding unit at a certain location from among the split coding units. The restriction or the certain location has been described above in relation to an embodiment of the disclosure, and thus, detailed descriptions thereof will not be provided herein.

According to an embodiment of the disclosure, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

FIG. 10 illustrates that a shape into which a second coding unit is splittable is restricted when the second coding unit having a non-square shape, which is determined when the image decoding apparatus 100 splits a first coding unit 1000, satisfies a certain condition, according to an embodiment of the disclosure.

According to an embodiment of the disclosure, the image decoding apparatus 100 may determine to split the square first coding unit 1000 into non-square second coding units 1010*a* and 1010*b* or 1020*a* and 1020*b*, based on split shape mode information, which is obtained by the receiver (not shown). The second coding units 1010*a* and 1010*b* or 1020*a* and 1020*b* may be independently split. Accordingly, the image decoding apparatus 100 may determine to split or not to split each of the second coding units 1010*a* and 1010*b* or 1020*a* and 1020*b* into a plurality of coding units, based on split shape mode information of each of the second coding units 1010*a* and 1010*b* or 1020*a* and 1020*b*. According to an embodiment of the disclosure, the image decoding apparatus 100 may determine third coding units 1012*a* and 1012*b* by splitting the non-square left second coding unit 1010*a*, which is determined by splitting the first coding unit 1000 in a vertical direction, in a horizontal direction. However, when the left second coding unit 1010*a* is split in a horizontal direction, the image decoding apparatus 100 may restrict the right second coding unit 1010*b* not to be split in a horizontal direction in which the left second coding unit 1010*a* is split. When third coding units 1014*a* and 1014*b* are determined by splitting the right second coding unit 1010*b* in a same direction, because the left and right second coding units 1010*a* and 1010*b* are independently split in a horizontal direction, the third coding units 1012*a* and 1012*b* or 1014*a* and 1014*b* may be determined. However, this case serves equally as a case in which the image decoding apparatus 100 splits the first coding unit 1000 into four square second coding units 1030*a*, 1030*b*, 1030*c*, and 1030*d*, based on the split shape mode information, and may be inefficient in terms of image decoding.

According to an embodiment of the disclosure, the image decoding apparatus 100 may determine third coding units 1022*a* and 1022*b* or 1024*a* and 1024*b* by splitting the non-square second coding unit 1020*a* or 1020*b*, which is determined by splitting the first coding unit 1000 in a horizontal direction, in a vertical direction. However, when a second coding unit (e.g., the upper second coding unit 1020*a*) is split in a vertical direction, for the above-described reason, the image decoding apparatus 100 may restrict the other second coding unit (e.g., the lower second coding unit 1020*b*) not to be split in a vertical direction in which the upper second coding unit 1020*a* is split.

Figure 11:
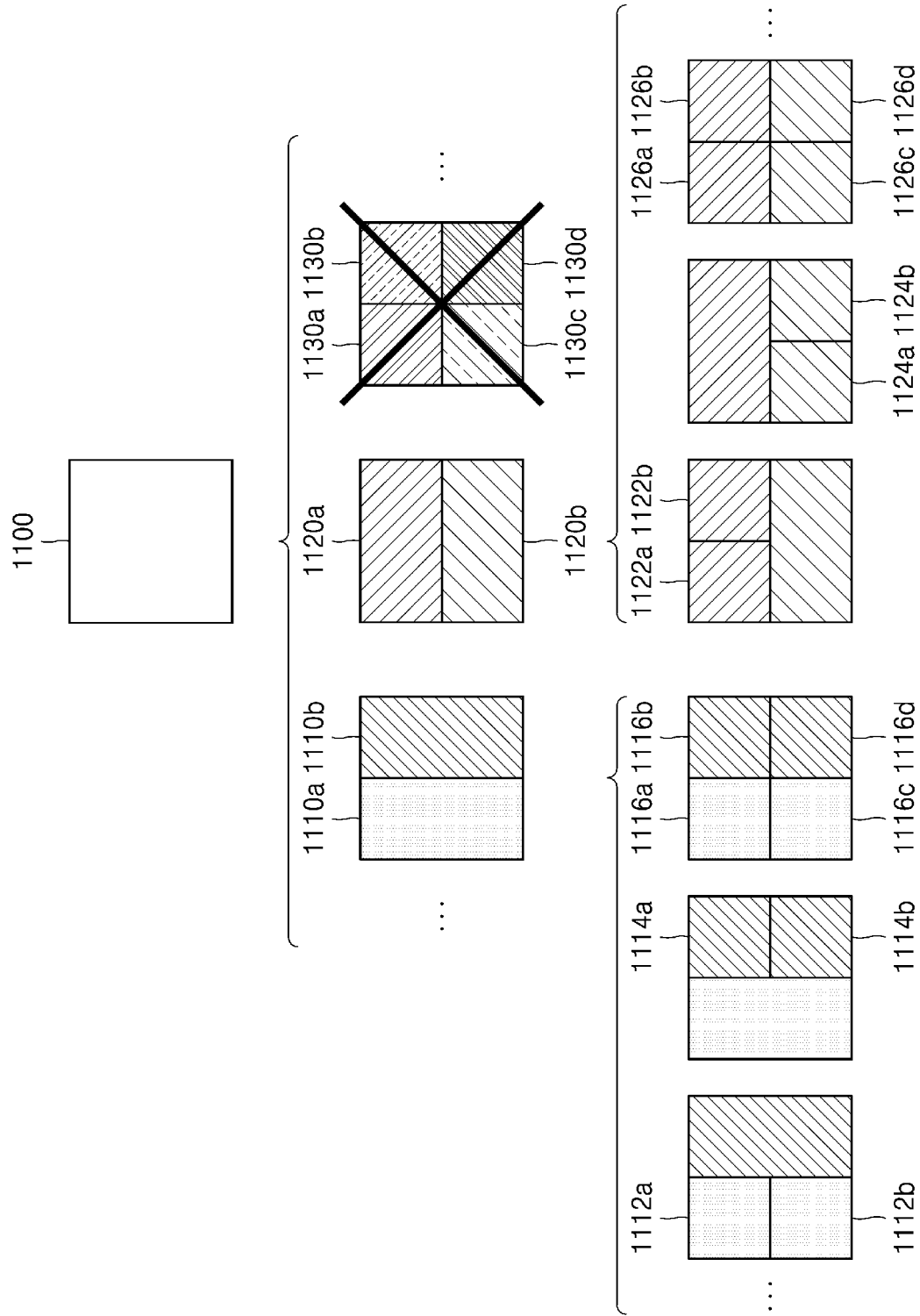
FIG. 11 illustrates a process, performed by an image decoding apparatus, of splitting a square coding unit when split shape mode information is unable to indicate that the square coding unit is split into four square coding units, according to an embodiment of the disclosure.

FIG. 11 illustrates a process, performed by the image decoding apparatus 100, of splitting a square coding unit when split shape mode information is unable to indicate that the square coding unit is split into four square coding units, according to an embodiment of the disclosure.

According to an embodiment of the disclosure, the image decoding apparatus 100 may determine second coding units 1110*a* and 1110*b* or 1120*a* and 1120*b* by splitting a first coding unit 1100, based on split shape mode information. The split shape mode information may include information about various methods of splitting a coding unit, but the information about various splitting methods may not include information for splitting a coding unit into four square coding units. According to such split shape mode information, the image decoding apparatus 100 may not split the square first coding unit 1100 into four square second coding units 1130*a*, 1130*b*, 1130*c*, and 1130*d*. The image decoding apparatus 100 may determine the non-square second coding units 1110*a* and 1110*b* or 1120*a* and 1120*b*, based on the split shape mode information.

According to an embodiment of the disclosure, the image decoding apparatus 100 may independently split the non-square second coding units 1110*a* and 1110*b* or 1120*a* and 1120*b*. Each of the second coding units 1110*a* and 1110*b* or 1120*a* and 1120*b* may be recursively split in a certain order, and this splitting method may correspond to a method of splitting the first coding unit 1100, based on the split shape mode information.

For example, the image decoding apparatus 100 may determine square third coding units 1112*a* and 1112*b* by splitting the left second coding unit 1110*a* in a horizontal direction, and may determine square third coding units 1114*a* and 1114*b* by splitting the right second coding unit 1110*b* in a horizontal direction. Furthermore, the image decoding apparatus 100 may determine square third coding units 1116*a*, 1116*b*, 1116*c*, and 1116*d* by splitting both of the left and right second coding units 1110*a* and 1110*b* in a horizontal direction. In this case, coding units having the same shape as the four square second coding units 1130*a*, 1130*b*, 1130*c*, and 1130*d* split from the first coding unit 1100 may be determined.

As another example, the image decoding apparatus 100 may determine square third coding units 1122*a* and 1122*b* by splitting the upper second coding unit 1120*a* in a vertical direction, and may determine square third coding units 1124*a* and 1124*b* by splitting the lower second coding unit 1120*b* in a vertical direction. Furthermore, the image decoding apparatus 100 may determine square third coding units 1126*a*, 1126*b*, 1126*c*, and 1126*d* by splitting both of the upper and lower second coding units 1120*a* and 1120*b* in a vertical direction. In this case, coding units having the same shape as the four square second coding units 1130*a*, 1130*b*, 1130*c*, and 1130*d* split from the first coding unit 1100 may be determined.

Figure 12:
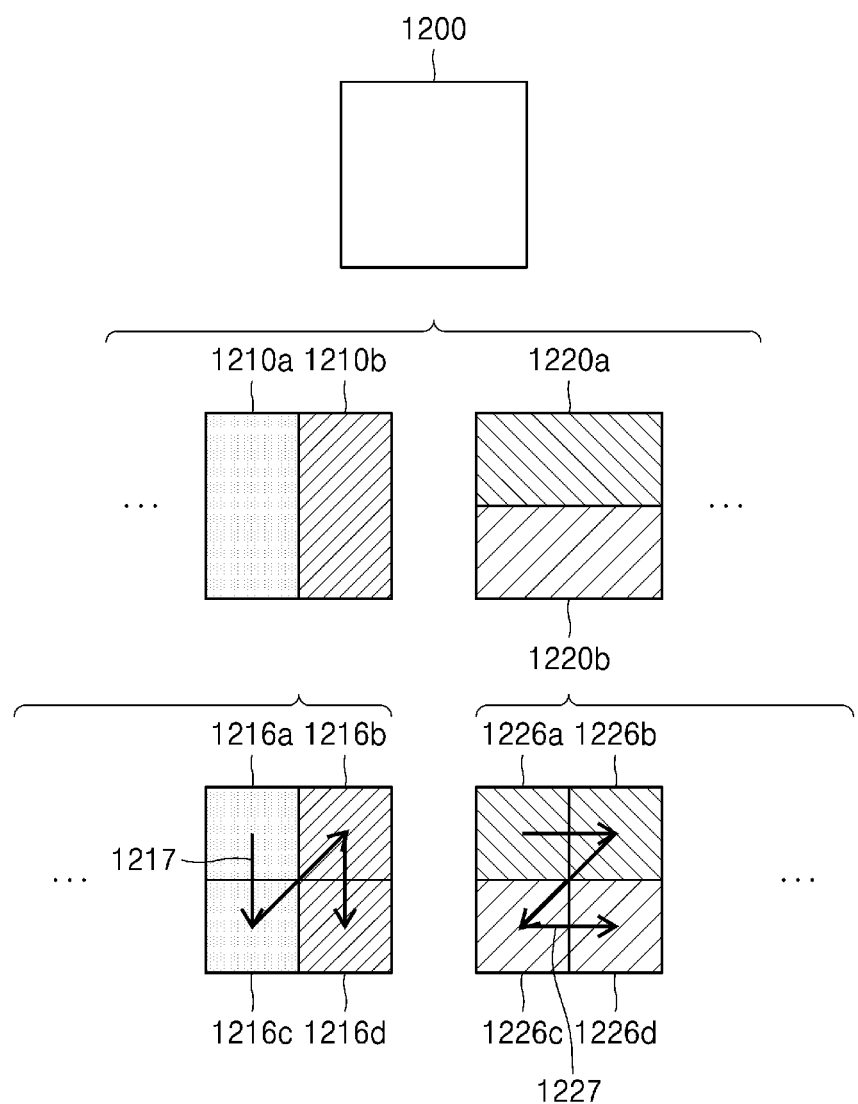
FIG. 12 illustrates that a processing order between a plurality of coding units may be changed depending on a process of splitting a coding unit, according to an embodiment of the disclosure.

FIG. 12 illustrates that a processing order between a plurality of coding units may be changed depending on a process of splitting a coding unit, according to an embodiment of the disclosure.

According to an embodiment of the disclosure, the image decoding apparatus 100 may split a first coding unit 1200 based on split shape mode information. When a block shape indicates a square shape and the split shape mode information indicates to split the first coding unit 1200 in at least one of a horizontal direction or a vertical direction, the image decoding apparatus 100 may determine second coding units 1210*a* and 1210*b* or 1220*a* and 1220*b* by splitting the first coding unit 1200. Referring to FIG. 12, the non-square second coding units 1210*a* and 1210*b* or 1220*a* and 1220*b* determined by splitting the first coding unit 1200 in only a horizontal direction or vertical direction may be independently split based on split shape mode information of each coding unit. For example, the image decoding apparatus 100 may determine third coding units 1216*a*, 1216*b*, 1216*c*, and 1216*d* by splitting the second coding units 1210*a* and 1210*b*, which are generated by splitting the first coding unit 1200 in a vertical direction, in a horizontal direction, and may determine third coding units 1226*a*, 1226*b*, 1226*c*, and 1226*d* by splitting the second coding units 1220*a* and 1220*b*, which are generated by splitting the first coding unit 1200 in a horizontal direction, in a vertical direction. A process of splitting the second coding units 1210*a* and 1210*b* or 1220*a* and 1220*b* has been described above in relation to FIG. 11, and thus, detailed descriptions thereof will not be provided herein.

According to an embodiment of the disclosure, the image decoding apparatus 100 may process coding units in a certain order. An operation of processing coding units in a certain order has been described above in relation to FIG. 7, and thus, detailed descriptions thereof will not be provided herein. Referring to FIG. 12, the image decoding apparatus 100 may determine four square third coding units 1216*a*, 1216*b*, 1216*c*, and 1216*d*, and 1226*a*, 1226*b*, 1226*c*, and 1226*d* by splitting the square first coding unit 1200. According to an embodiment of the disclosure, the image decoding apparatus 100 may determine processing orders of the third coding units 1216*a*, 1216*b*, 1216*c*, and 1216*d*, and 1226*a*, 1226*b*, 1226*c*, and 1226*d* based on a splitting method of the first coding unit 1200.

According to an embodiment of the disclosure, the image decoding apparatus 100 may determine the third coding units 1216*a*, 1216*b*, 1216*c*, and 1216*d* by splitting the second coding units 1210*a* and 1210*b* generated by splitting the first coding unit 1200 in a vertical direction, in a horizontal direction, and may process the third coding units 1216*a*, 1216*b*, 1216*c*, and 1216*d* in a processing order 1217 for initially processing the third coding units 1216*a* and 1216*c*, which are included in the left second coding unit 1210*a*, in a vertical direction and then processing the third coding unit 1216*b* and 1216*d*, which are included in the right second coding unit 1210*b*, in a vertical direction.

According to an embodiment of the disclosure, the image decoding apparatus 100 may determine the third coding units 1226*a*, 1226*b*, 1226*c*, and 1226*d* by splitting the second coding units 1220*a* and 1220*b* generated by splitting the first coding unit 1200 in a horizontal direction, in a vertical direction, and may process the third coding units 1226*a*, 1226*b*, 1226*c*, and 1226*d* in a processing order 1227 for initially processing the third coding units 1226*a* and 1226*b*, which are included in the upper second coding unit 1220*a*, in a horizontal direction and then processing the third coding unit 1226*c* and 1226*d*, which are included in the lower second coding unit 1220*b*, in a horizontal direction.

Referring to FIG. 12, the square third coding units 1216*a*, 1216*b*, 1216*c*, and 1216*d*, and 1226*a*, 1226*b*, 1226*c*, and 1226*d* may be determined by splitting the second coding units 1210*a* and 1210*b*, and 1220*a* and 1920*b*, respectively. Although the second coding units 1210*a* and 1210*b* are determined by splitting the first coding unit 1200 in a vertical direction differently from the second coding units 1220*a* and 1220*b* which are determined by splitting the first coding unit 1200 in a horizontal direction, the third coding units 1216*a*, 1216*b*, 1216*c*, and 1216*d*, and 1226*a*, 1226*b*, 1226*c*, and 1226*d* split therefrom eventually show same-shaped coding units split from the first coding unit 1200. Accordingly, by recursively splitting a coding unit in different processes based on the split shape information, the image decoding apparatus 100 may process a plurality of coding units in different orders even when the coding units are eventually determined to be the same shape.

FIG. 13 illustrates a process of determining a depth of a coding unit when a shape and size of the coding unit change, when the coding unit is recursively split such that a plurality of coding units are determined, according to an embodiment of the disclosure.

According to an embodiment of the disclosure, the image decoding apparatus 100 may determine the depth of the coding unit, based on a certain criterion. For example, the certain criterion may be a length of a long side of the coding unit. When a length of a long side of a current coding unit before being split is 2n times (n>0) a length of a long side of a split current coding unit, the image decoding apparatus 100 may determine that a depth of the current coding unit is increased from a depth of the coding unit before being split, by n. Hereinafter, a coding unit having an increased depth is expressed as a coding unit of a deeper depth.

Referring to FIG. 13, according to an embodiment of the disclosure, the image decoding apparatus 100 may determine a second coding unit 1302 and a third coding unit 1304 of deeper depths by splitting a square first coding unit 1300 based on block shape information indicating a square shape (e.g., the block shape information may be expressed as '0: SQUARE'). Assuming that the size of the square first coding unit 1300 is 2N×2N, the second coding unit 1302 determined by splitting a width and a height of the first coding unit 1300 in ½ may have a size of N×N. Furthermore, the third coding unit 1304 determined by splitting a width and a height of the second coding unit 1302 in ½ may have a size of N/2×N/2. In this case, a width and a height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment of the disclosure, the image decoding apparatus 100 may determine a second coding unit 1312 or 1322 and a third coding unit 1314 or 1324 of deeper depths by splitting a non-square first coding unit 1310 or 1320 based on block shape information indicating a non-square shape (e.g., the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 1302, 1312, or 1322 by splitting at least one of a width or a height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment of the disclosure, the image decoding apparatus 100 may determine the second coding unit 1302, 1312, or 1322 by splitting at least one of a width or a height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment of the disclosure, the image decoding apparatus 100 may determine a third coding unit 1304, 1314, or 1324 by splitting at least one of a width or a height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment of the disclosure, the image decoding apparatus 100 may determine the third coding unit 1304, 1314, or 1324 by splitting at least one of a width or a height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment of the disclosure, the image decoding apparatus 100 may determine the third coding unit 1304, 1314, or 1324 by splitting at least one of a width or a height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment of the disclosure, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment of the disclosure, when a depth is determined based on a length of the longest side of a coding unit, a depth of a coding unit determined by splitting the first coding unit 1300 having a size of 2N×2N in a horizontal or vertical direction may be the same as the depth of the first coding unit 1300.

According to an embodiment of the disclosure, a width and a height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
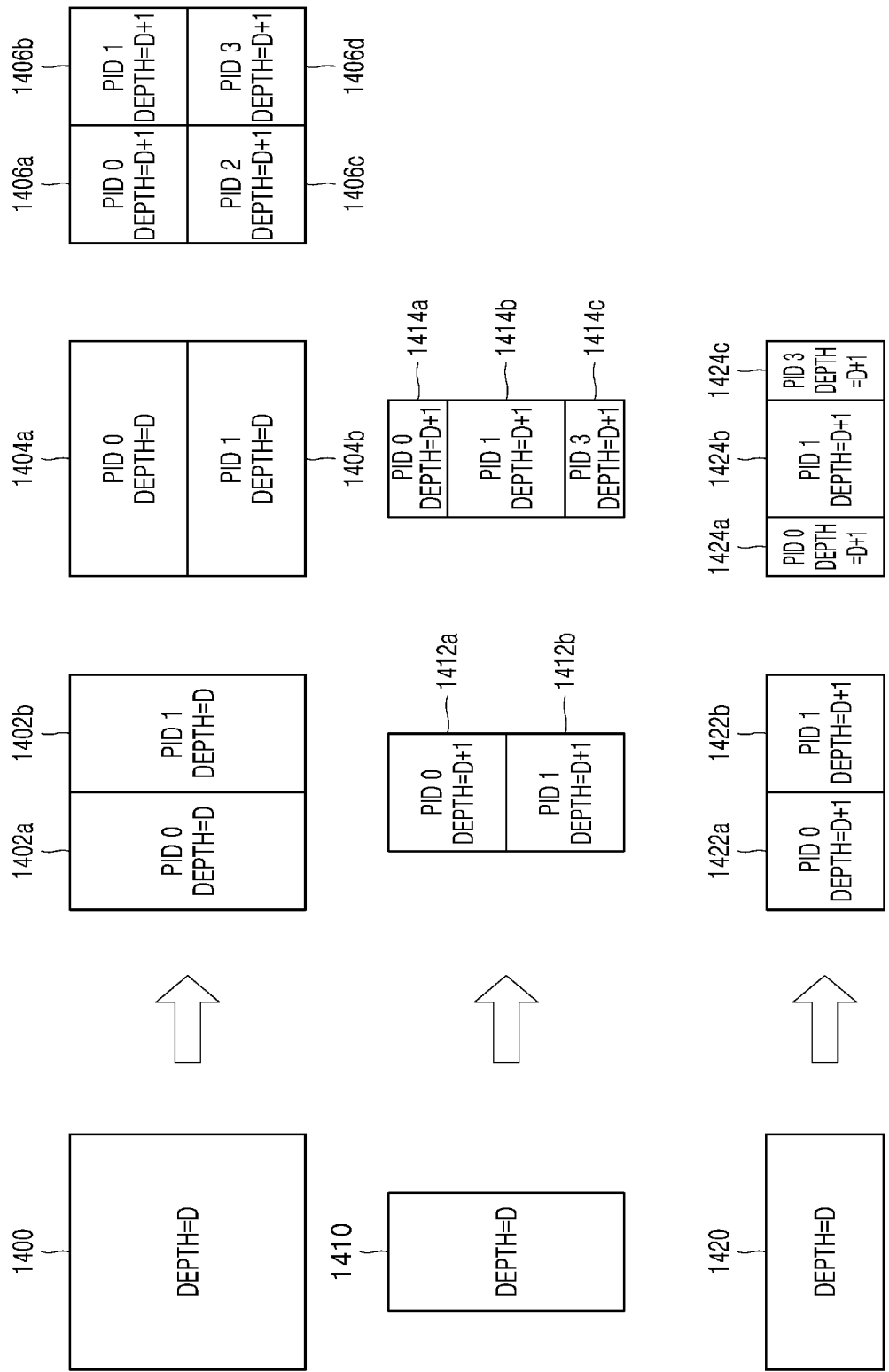
FIG. 14 illustrates depths that are determinable based on shapes and sizes of coding units, and part indexes (PIDs) that are for distinguishing the coding units, according to an embodiment of the disclosure.

FIG. 14 illustrates depths that are determinable based on shapes and sizes of coding units, and part indexes (PIDs) that are for distinguishing the coding units, according to an embodiment of the disclosure.

According to an embodiment of the disclosure, the image decoding apparatus 100 may determine various-shape second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of a vertical direction or a horizontal direction based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment of the disclosure, a depth of the second coding units 1402a and 1402b, 1404a and 1404b, and 1406*a*, 1406*b*, 1406*c*, and 1406*d*, which are determined based on the split shape mode information of the square first coding unit 1400, may be determined based on a length of a long side thereof. For example, because a length of a side of the square first coding unit 1400 is equal to a length of a long side of the non-square second coding units 1402*a* and 1402*b*, and 1404*a* and 1404*b*, the first coding unit 2100 and the non-square second coding units 1402*a* and 1402*b*, and 1404*a* and 1404*b* may have the same depth, e.g., D. However, when the image decoding apparatus 100 splits the first coding unit 1400 into the four square second coding units 1406*a*, 1406*b*, 1406*c*, and 1406*d* based on the split shape mode information, because a length of a side of the square second coding units 1406*a*, 1406*b*, 1406*c*, or 1406*d* is ½ times the length of the side of the first coding unit 1400, a depth of the second coding units 1406*a*, 1406*b*, 1406*c*, and 1406*d* may be D+1 which is deeper than the depth D of the first coding unit 1400 by 1.

According to an embodiment of the disclosure, the image decoding apparatus 100 may determine a plurality of second coding units 1412*a* and 1412*b*, and 1414*a*, 1414*b*, and 1414*c* by splitting a first coding unit 1410, a height of which is longer than a width, in a horizontal direction based on the split shape mode information. According to an embodiment of the disclosure, the image decoding apparatus 100 may determine a plurality of second coding units 1422*a* and 1422*b*, and 1424*a*, 1424*b*, and 1424*c* by splitting a first coding unit 1420, a width of which is longer than a height, in a vertical direction based on the split shape mode information.

According to an embodiment of the disclosure, a depth of the second coding units 1412*a* and 1412*b*, and 1414*a*, 1414*b*, and 1414*c*, or 1422*a* and 1422*b*, and 1424*a*, 1424*b*, and 1424*c*, which are determined based on the split shape mode information of the non-square first coding unit 1410 or 1420, may be determined based on a length of a long side thereof. For example, because a length of a side of the square second coding units 1412*a* and 1412*b* is ½ times a length of a long side of the first coding unit 1410 having a non-square shape, a height of which is longer than a width, a depth of the square second coding units 1412*a* and 1412*b* is D+1 which is deeper than the depth D of the non-square first coding unit 1410 by 1.

Furthermore, the image decoding apparatus 100 may split the non-square first coding unit 1410 into an odd number of second coding units 1414*a*, 1414*b*, and 1414*c* based on the split shape mode information. The odd number of second coding units 1414*a*, 1414*b*, and 1414*c* may include the non-square second coding units 1414*a* and 1414*c* and the square second coding unit 1414*b*. In this case, because a length of a long side of the non-square second coding units 1414*a* and 1414*c* and a length of a side of the square second coding unit 1414*b* are ½ times the length of the long side of the first coding unit 1410, a depth of the second coding units 1414*a*, 1414*b*, and 1414*c* may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment of the disclosure, the image decoding apparatus 100 may determine PIDs for identifying split coding units, based on a size ratio between the coding units when an odd number of split coding units do not have equal sizes. Referring to FIG. 14, a coding unit 1414*b* of a center location among an odd number of split coding units 1414*a*, 1414*b*, and 1414*c* may have a width equal to those of the other coding units 1414*a* and 1414*c* and a height which is two times those of the other coding units 1414*a* and 1414*c*. That is, in this case, the coding unit 1414*b* at the center location may include two of the other coding units 1414*a* and 1414*c*. Therefore, when a PID of the coding unit 1414*b* at the center location is 1 based on a scan order, a PID of the coding unit 1414*c* located next to the coding unit 1414*b* may be increased by 2 and thus may be 3. That is, discontinuity in PID values may be present. According to an embodiment of the disclosure, the image decoding apparatus 100 may determine whether an odd number of split coding units do not have equal sizes, based on whether discontinuity is present in PIDs for identifying the split coding units.

According to an embodiment of the disclosure, the image decoding apparatus 100 may determine whether a specific splitting method is used, based on PID values for identifying a plurality of coding units determined by splitting a current coding unit. Referring to FIG. 14, the image decoding apparatus 100 may determine an even number of coding units 1412*a* and 1412*b* or an odd number of coding units 1414*a*, 1414*b*, and 1414*c* by splitting the first coding unit 1410 having a rectangular shape, a height of which is longer than a width. The image decoding apparatus 100 may use PIDs indicating respective coding units so as to identify the respective coding units. According to an embodiment of the disclosure, the PID may be obtained from a sample at a certain location of each coding unit (e.g., an upper left sample).

According to an embodiment of the disclosure, the image decoding apparatus 100 may determine a coding unit at a certain location from among the split coding units, by using the PIDs for distinguishing the coding units. According to an embodiment of the disclosure, when the split shape mode information of the first coding unit 1410 having a rectangular shape, a height of which is longer than a width, indicates to split a coding unit into three coding units, the image decoding apparatus 100 may split the first coding unit 1410 into three coding units 1414*a*, 1414*b*, and 1414*c*. The image decoding apparatus 100 may assign a PID to each of the three coding units 1414*a*, 1414*b*, and 1414*c*. The image decoding apparatus 100 may compare PIDs of an odd number of split coding units to determine a coding unit at a center location from among the coding units. The image decoding apparatus 100 may determine the coding unit 1414*b* having a PID corresponding to a middle value among the PIDs of the coding units, as the coding unit at the center location from among the coding units determined by splitting the first coding unit 1410. According to an embodiment of the disclosure, the image decoding apparatus 100 may determine PIDs for distinguishing split coding units, based on a size ratio between the coding units when the split coding units do not have equal sizes. Referring to FIG. 14, the coding unit 1414*b* generated by splitting the first coding unit 1410 may have a width equal to those of the other coding units 1414*a* and 1414*c* and a height which is two times those of the other coding units 1414*a* and 1414*c*. In this case, when the PID of the coding unit 1414*b* at the center location is 1, the PID of the coding unit 1414*c* located next to the coding unit 1414*b* may be increased by 2 and thus may be 3. When the PID is not uniformly increased as described above, the image decoding apparatus 100 may determine that a coding unit is split into a plurality of coding units including a coding unit having a size different from those of the other coding units. According to an embodiment of the disclosure, when the split shape mode information indicates to split a coding unit into an odd number of coding units, the image decoding apparatus 100 may split a current coding unit in such a manner that a coding unit at a certain location among an odd number of coding units (e.g., a coding unit of a center location) has a size different from those of the other coding units. In this case, the image decoding apparatus 100 may determine the coding unit at the center location, which has a different size, by using PIDs of the coding units. However, the PIDs and the size or location of the coding unit at the certain location are not limited to the above-described examples, and various PIDs and various locations and sizes of coding units may be used.

According to an embodiment of the disclosure, the image decoding apparatus 100 may use a certain data unit where a coding unit starts to be recursively split.

Figure 15:
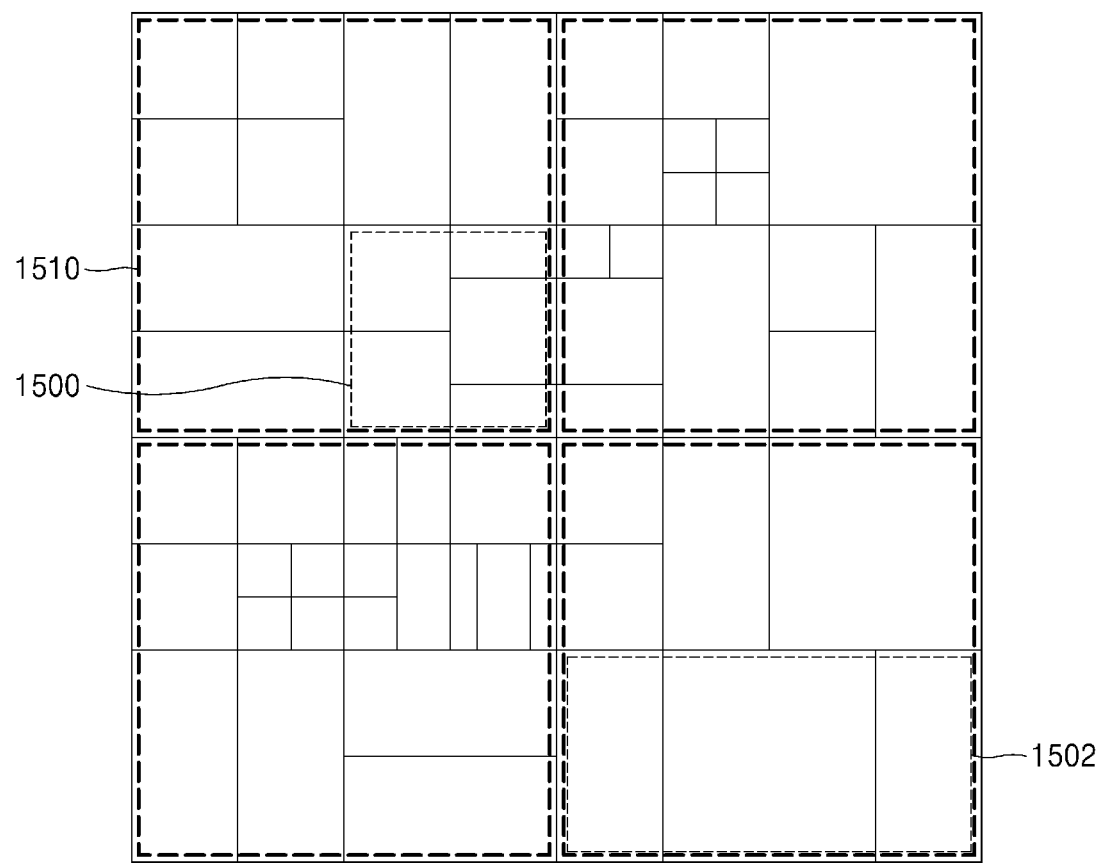
FIG. 15 illustrates that a plurality of coding units are determined based on a plurality of certain data units included in a picture, according to an embodiment of the disclosure.

FIG. 15 illustrates that a plurality of coding units are determined based on a plurality of certain data units included in a picture, according to an embodiment of the disclosure.

According to an embodiment of the disclosure, a certain data unit may be defined as a data unit where a coding unit starts to be recursively split by using split shape mode information. That is, the certain data unit may correspond to a coding unit of an uppermost depth, which is used to determine a plurality of coding units split from a current picture. Hereinafter, for convenience of description, the certain data unit is referred to as a reference data unit.

According to an embodiment of the disclosure, the reference data unit may have a certain size and a certain size shape. According to an embodiment of the disclosure, the reference data unit may include M×N samples. In this regard, M and N may be equal to each other, and may be integers expressed as powers of 2. That is, the reference data unit may have a square or non-square shape, and may be split into an integer number of coding units.

According to an embodiment of the disclosure, the image decoding apparatus 100 may split the current picture into a plurality of reference data units. According to an embodiment of the disclosure, the image decoding apparatus 100 may split the plurality of reference data units, which are split from the current picture, by using split shape mode information of each reference data unit. A process of splitting the reference data unit may correspond to a splitting process using a quadtree structure.

According to an embodiment of the disclosure, the image decoding apparatus 100 may previously determine a minimum size allowed for the reference data units included in the current picture. Accordingly, the image decoding apparatus 100 may determine various reference data units having sizes greater than or equal to the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment of the disclosure, a shape and size of reference coding units may be determined based on various data units capable of including one or more reference coding units (e.g., sequences, pictures, slices, slice segments, tiles, tile groups, largest coding units, or the like).

According to an embodiment of the disclosure, the receiver (not shown) of the image decoding apparatus 100 may obtain, from a bitstream, at least one of reference coding unit shape information or reference coding unit size information with respect to each of the various data units. A process of splitting the square reference coding unit 1500 into one or more coding units has been described above in relation to the process of splitting the current coding unit 300 of FIG. 3, and a process of splitting the non-square reference coding unit 1502 into one or more coding units has been described above in relation to the process of splitting the current coding unit 400 or 450 of FIG. 4. Thus, detailed descriptions thereof will not be provided herein.

According to an embodiment of the disclosure, the image decoding apparatus 100 may use a PID for identifying a size and a shape of the reference coding unit, to determine the size and the shape of the reference coding units according to some data units previously determined based on a certain condition. That is, the receiver (not shown) may obtain, from the bitstream, only the PID for identifying the size and the shape of the reference coding units with respect to each slice, slice segment, tile, tile group, or largest coding unit which is a data unit satisfying a certain condition (e.g., a data unit having a size smaller than or equal to a slice) among the various data units (e.g., sequences, pictures, slices, slice segments, tiles, tile groups, largest coding units, or the like). The image decoding apparatus 100 may determine the size and the shape of the reference data units with respect to each data unit, which satisfies the certain condition, by using the PID. When the reference coding unit shape information and the reference coding unit size information are obtained and used from the bitstream according to each data unit having a relatively small size, efficiency of using the bitstream may not be high, and thus, only the PID may be obtained and used instead of directly obtaining the reference coding unit shape information and the reference coding unit size information. In this case, at least one of the size or the shape of the reference coding units corresponding to the PID for identifying the size and shape of the reference coding units may be previously determined. That is, the image decoding apparatus 100 may determine at least one of the size or the shape of the reference coding units included in a data unit serving as a unit for obtaining the PID, by selecting the previously determined at least one of the size or the shape of the reference coding units based on the PID.

According to an embodiment of the disclosure, the image decoding apparatus 100 may use one or more reference coding units included in a largest coding unit. That is, a largest coding unit split from a picture may include one or more reference coding units, and coding units may be determined by recursively splitting each reference coding unit. According to an embodiment of the disclosure, at least one of a width or a height of the largest coding unit may be integer times at least one of a width or a height of the reference coding units. According to an embodiment of the disclosure, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information or the split shape mode information according to an embodiment of the disclosure.

Figure 16:
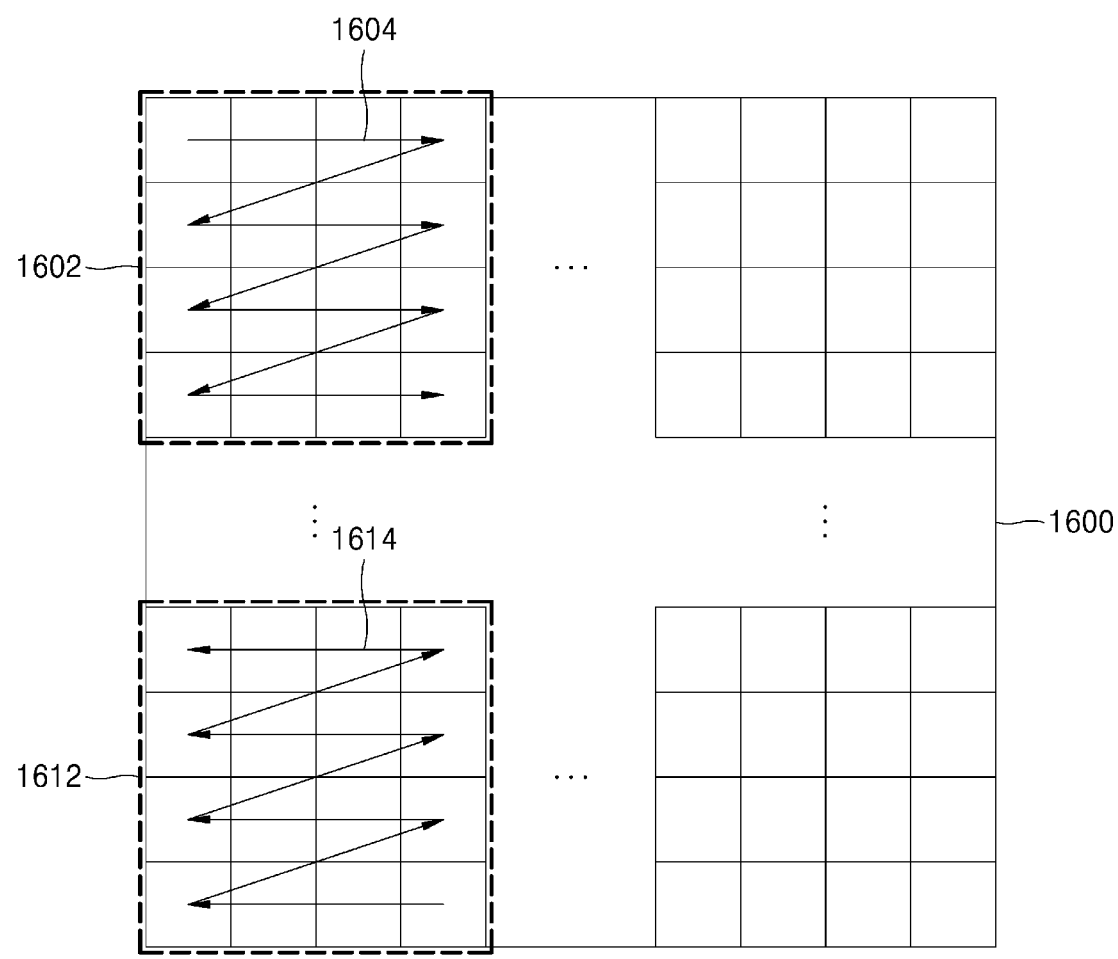
FIG. 16 illustrates a processing block that is used as criterion for determining an order of determining reference coding units included in a picture, according to an embodiment of the disclosure.

FIG. 16 illustrates a processing block that is used as criterion for determining an order of determining reference coding units included in a picture 1600, according to an embodiment of the disclosure.

According to an embodiment of the disclosure, the image decoding apparatus 100 may determine at least one processing block for splitting a picture. A processing block may be a data unit including at least one reference coding unit of splitting an image, and the at least one reference coding unit included in the processing block may be determined in a specific order. That is, an order of determining at least one reference coding unit, determined for each processing block, may be one of various order types by which reference coding units may be determined, and different processing blocks may determine reference coding units in different orders. The order of determining reference coding units, determined for each processing block, may be one of various orders, such as raster scan, Z-scan, N-scan, up-right diagonal scan, horizontal scan, vertical scan, etc., although not limited to the above-described scan orders.

According to an embodiment of the disclosure, the image decoding apparatus 100 may obtain information about a size of a processing block to determine a size of at least one processing block included in an image. The image decoding apparatus 100 may obtain information about a size of a processing block from a bitstream to determine a size of at least one processing block included in an image. The size of the processing block may be a certain size of a data unit indicated by the information about the size of the processing block.

According to an embodiment of the disclosure, the receiver (not shown) of the image decoding apparatus 100 may obtain information about a size of a processing block for each specific data unit from a bitstream. For example, information about a size of a processing block may be obtained from a bitstream for each data unit, such as an image, a sequence, a picture, a slice, a slice segment, a tile, a tile group, etc. That is, the receiver (not shown) may obtain information about a size of a processing block for each of various data units described above, from a bitstream, and the image decoding apparatus 100 may determine a size of at least one processing block splitting a picture by using the obtained information about the size of the processing block. The size of the processing block may be a size of a multiple of a reference coding unit.

According to an embodiment of the disclosure, the image decoding apparatus 100 may determine a size of processing blocks 1602 and 1612 included in the picture 1600. For example, the image decoding apparatus 100 may determine the size of the processing blocks 1602 or 1612, based on the information about the size of the processing block, obtained from the bitstream. Referring to FIG. 16, the image decoding apparatus 100 may determine a horizontal size of the processing blocks 1602 and 1612 to be four times a horizontal size of a reference coding unit, and a vertical size of the processing blocks 1602 and 1612 to be four times a vertical size of the reference coding unit, according to an embodiment of the disclosure. The image decoding apparatus 100 may determine an order in which at least one reference coding unit is determined in at least one processing block.

According to an embodiment of the disclosure, the image decoding apparatus 100 may determine the processing blocks 1602 and 1612 included in the picture 1600 based on the size of the processing block, and determine an order in which at least one reference coding unit included in the processing blocks 1602 and 1612 is determined. According to an embodiment of the disclosure, determining a reference coding unit may include determining a size of the reference coding unit.

According to an embodiment of the disclosure, the image decoding apparatus 100 may obtain, from the bitstream, information about an order of determining at least one reference coding unit included in at least one processing block, and determine an order of determining at least one reference coding unit based on the obtained information about the determination order. The information about the determination order may be defined as an order or direction in which reference coding units are determined in the processing block. That is, an order in which reference coding units are determined may be determined independently for each processing block.

According to an embodiment of the disclosure, the image decoding apparatus 100 may obtain, from a bitstream, information about a determination order of a reference coding unit for each specific data unit. For example, the receiver (not shown) may obtain, from a bitstream, information about a determination order of a reference coding unit for each data unit, such as an image, a sequence, a picture, a slice, a slice segment, a tile, a tile group, a processing block, etc. Because information about a determination order of a reference coding unit indicates an order of determining a reference coding unit in a processing block, information about a determination order may be obtained for each specific data unit including an integer number of processing blocks.

The image decoding apparatus 100 may determine at least one reference coding unit based on the determination order according to an embodiment of the disclosure.

According to an embodiment of the disclosure, the receiver (not shown) may obtain, from a bitstream, information about a determination order of reference coding units as information related to the processing blocks 1602 and 1612, and the image decoding apparatus 100 may determine an order of determining at least one reference coding unit included in the processing blocks 1602 and 1612, and determine the at least one reference coding unit included in the picture 1600 according to the determination order of the reference coding unit. Referring to FIG. 16, the image decoding apparatus 100 may determine determination orders 1604 and 1614 of the at least one reference coding unit related to the respective processing blocks 1602 and 1612. For example, when information about a determination order of a reference coding unit is obtained for each processing block, the respective processing blocks 1602 and 1612 may have different determination orders of reference encoding blocks related to the respective processing blocks 1602 and 1612. When the determination order 1604 of the reference coding unit, related to the processing block 1602, is a raster scan order, reference coding units included in the processing block 1602 may be determined in the raster scan order. In contrast, when the determination order 1614 of the reference coding unit, related to the other processing block 1612, is a reverse order of the raster scan order, reference coding units included in the processing block 1612 may be determined in the reverse order of the raster scan order.

According to an embodiment of the disclosure, the image decoding apparatus 100 may decode at least one determined reference coding unit. The image decoding apparatus 100 may decode an image based on a reference coding unit determined through the above-described embodiment of the disclosure. A method of decoding a reference coding unit may include various methods of decoding an image.

According to an embodiment of the disclosure, the image decoding apparatus 100 may obtain, from the bitstream, block shape information indicating the shape of a current coding unit or split shape mode information indicating a splitting method of the current coding unit, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

Hereinafter, a method of determining a split rule, according to an embodiment of the disclosure will be described in detail.

The image decoding apparatus 100 may determine a split rule of an image. The split rule may be predetermined between the image decoding apparatus 100 and the image encoding apparatus 150. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, a slice segment header, a tile header, or a tile group header. The image decoding apparatus 100 may differently determine the split rule according to frames, slices, temporal layers, largest coding units, or coding units.

The image decoding apparatus 100 may determine the split rule based on block shape information of a coding unit. A block shape may include a size, a shape, a ratio of a width and a height, and a direction of the coding unit. Th image encoding apparatus 150 and the image decoding apparatus 100 may determine in advance that a split rule is determined based on a block shape of a coding unit. However, the disclosure is not limited thereto. The image decoding apparatus 100 may determine a split rule based on information obtained from a bitstream received from the image encoding apparatus 150.

The shape of the coding unit may include a square shape and a non-square shape. When lengths of the width and the height of the coding unit are equal, the image decoding apparatus 100 may determine the shape of the coding unit to be a square shape. Also, when the lengths of the width and the height of the coding unit are not equal, the image decoding apparatus 100 may determine the shape of the coding unit to be a non-square shape.

The size of the coding unit may include various sizes, such as 4×4, 8×4, 4×8, 8×8, 16×4, 16×8, ..., and 256×256. The size of the coding unit may be classified based on a length of a long side, a length of a short side, or an area of the coding unit. The image decoding apparatus 100 may apply the same split rule to coding units classified as the same group. For example, the image decoding apparatus 100 may classify coding units having the same lengths of the long sides as having the same size. Also, the image decoding apparatus 100 may apply the same split rule to coding units having the same lengths of the long sides.

The ratio of the width and the height of the coding unit may include 1:2, 2:1, 1:4, 4:1, 1:8, 8:1, 1:16, 16:1, or the like. Also, the direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

Determining a split rule based on a size of a coding unit may be a split rule determined in advance between the image encoding apparatus 150 and the image decoding apparatus 100. Also, the image decoding apparatus 100 may determine a split rule based on information obtained from a bitstream.

The image decoding apparatus 100 may adaptively determine the split rule based on a location of the coding unit. The image decoding apparatus 100 may adaptively determine the split rule based on the location of the coding unit in the image.

Also, the image decoding apparatus 100 may determine the split rule such that coding units generated via different splitting paths do not have the same block shape. However, the disclosure is not limited thereto, and the coding units generated via different splitting paths have the same block shape. The coding units generated via the different splitting paths may have different decoding process orders. Because the decoding process orders have been described above with reference to FIG. 12, detailed descriptions thereof are not provided again.

Hereinafter, a process of performing entropy encoding and decoding according to one or more embodiments disclosed in this specification will be described in detail with reference to FIGS. 17 to 28. The process for entropy encoding and decoding according to an embodiment of the disclosure may be performed by the decoder 120 of the image decoding apparatus 100 shown in FIG. 1A and the encoder 155 of the image encoding apparatus 150 shown in FIG. 2A, or by the processor 125 of the image decoding apparatus 100 shown in FIG. 10 and the processor 170 of the image encoding apparatus 150 shown in FIG. 2C. In detail, the process for entropy encoding and decoding according to an embodiment of the disclosure may be performed by the entropy decoder 6150 of the image decoder 6000 shown in FIG. 1B and the entropy encoder 7350 of the image encoder 7000 shown in FIG. 2B.

As described above, the image encoding apparatus 150 according to an embodiment of the disclosure may perform encoding by using a coding unit resulting from hierarchically splitting a largest coding unit. The entropy encoder 7350 may perform entropy encoding on encoding information generated in an encoding process, e.g., syntax elements, such as a quantized transform coefficient, a prediction mode of a prediction unit, a quantization parameter, a motion vector, etc. As an entropy encoding method, CAMAC may be used.

Figure 17:
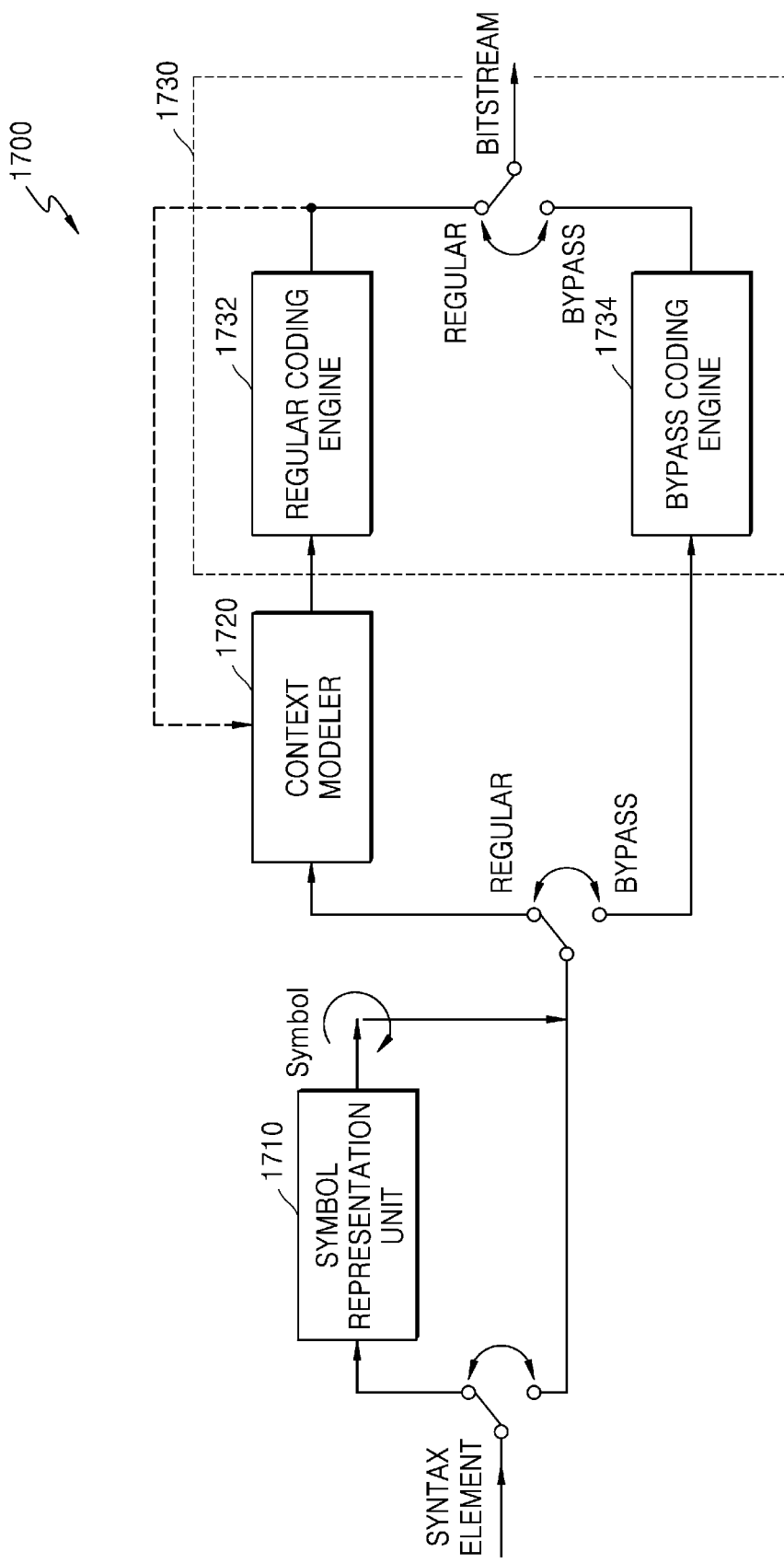
FIG. 17 is a block diagram illustrating a configuration of an entropy encoding apparatus according to an embodiment of the disclosure.

FIG. 17 is a block diagram illustrating a configuration of an entropy encoding apparatus 1700 according to an embodiment of the disclosure.

Referring to FIG. 17, according to an embodiment of the disclosure, the entropy encoding apparatus 1700 includes a symbol representation unit 1710, a context modeler 1720, and an arithmetic coder 1730. According to an embodiment, the arithmetic coder 1730 may include a regular coding engine 1732 and a bypass coding engine 1734.

According to an embodiment of the disclosure, syntax elements input to the entropy encoding apparatus 1700 may not be symbols. Symbols may include at least one of numbers or letters. For example, when the prediction mode is an intra prediction mode or an inter prediction mode, symbol may be represented by numbers "0" or "1", respectively. Alternatively, for example, symbol may be represented by characters "intra" or "inter", respectively. However, it is not limited thereto, and the symbol may be expressed in various ways, such as a combination of numbers and letters or numbers expressed in binary. Hereinafter, for convenience of description, a case in which symbols are numbers will be described as an example. When the syntax elements are not symbols, the symbol representation unit 1710 outputs the syntax elements into one of M symbols. For example, when an input syntax element is not a symbol, the symbol representation unit 1710 may determine a corresponding symbol from among symbols 0 to M−1. Each syntax element may indicate a different M value. Each symbol is encoded through CAMAC.

A symbol output from the symbol representation unit 1710 is arithmetic-coded by the regular coding engine 1732 or the bypass coding engine 1734. When frequencies of symbols of the syntax elements are uniform, that is, when frequencies of symbols 0 to M−1 are the same, the symbol is output to the bypass coding engine 1734 that does not use a probability value, and encoded via the bypass coding engine 1734. Whether a current symbol is to be arithmetic-coded by the regular coding engine 1732 or the bypass coding engine 1734, may be predetermined according to a type of a syntax element. According to an embodiment of the disclosure, the symbol representation unit 1710 may be referred to as an M-ary representation unit.

The regular coding engine 1732 performs arithmetic encoding on the symbol based on a probability model determined by the context modeler 1720. The context modeler 1720 provides a probability model for the current symbol to the regular coding engine 1732. The context modeler 1720 may determine an occurrence probability of a symbol based on a previously encoded symbol, update an occurrence probability previously used to encode the symbol, and output the probability to the regular coding engine 1732. According to an embodiment of the disclosure, the context modeler 1720 may determine one context model by using a context index ctxIdx. According to an embodiment of the disclosure, the context index may be determined for each symbol. The context modeler 1720 may determine an occurrence probability of a symbol of the context model.

According to an embodiment of the disclosure, the context modeler 1720 may determine at least one scaling factor for updating the occurrence probability of the symbol. The context modeler 1720 may update the occurrence probability of the symbol by using the at least one scaling factor, according to the current symbol. A detailed process of updating the occurrence probability of the symbol will be described below.

The regular coding engine 1732 performs arithmetic encoding based on the current symbol and the occurrence probability of the symbol provided from the context modeler 1720. According to an embodiment of the disclosure, the regular coding engine 1732 may determine a cumulative probability c(0) of occurrence of symbol "0" and a cumulative probability c(1) of occurrence of symbol "1" to a cumulative probability c(M−1) of occurrence of symbol "M−1", based on the occurrence probability of the symbol provided from the context modeler 1720. A cumulative probability c(k) of occurrence of symbol "k" indicates a sum of probabilities of occurrence of symbols "0" to "k". That is c(k)=P(0)+P(1)++P(k), wherein P(k) is an occurrence probability of symbol k. According to an embodiment of the disclosure, the regular coding engine 1732 may determine a probability P(0) of occurrence of symbol "0" and a probability P(1) to of occurrence of symbol "1" a probability P(M−1) of occurrence of symbol "M−1", based on the occurrence probability of the symbol provided from the context modeler 1720. For convenience of description, a cumulative occurrence probability of a symbol and an occurrence probability of a symbol are distinguished. However, according to an embodiment of the disclosure, the occurrence probability of the symbol may refer to the cumulative occurrence probability of a symbol.

Arithmetic encoding is performed by dividing a range representing a probability interval according to the current symbol and the determined probabilities c(0) to c(M−1) of occurrence of symbols, and outputting a binary value of a representative value belonging to a divided interval.

Figure 18:
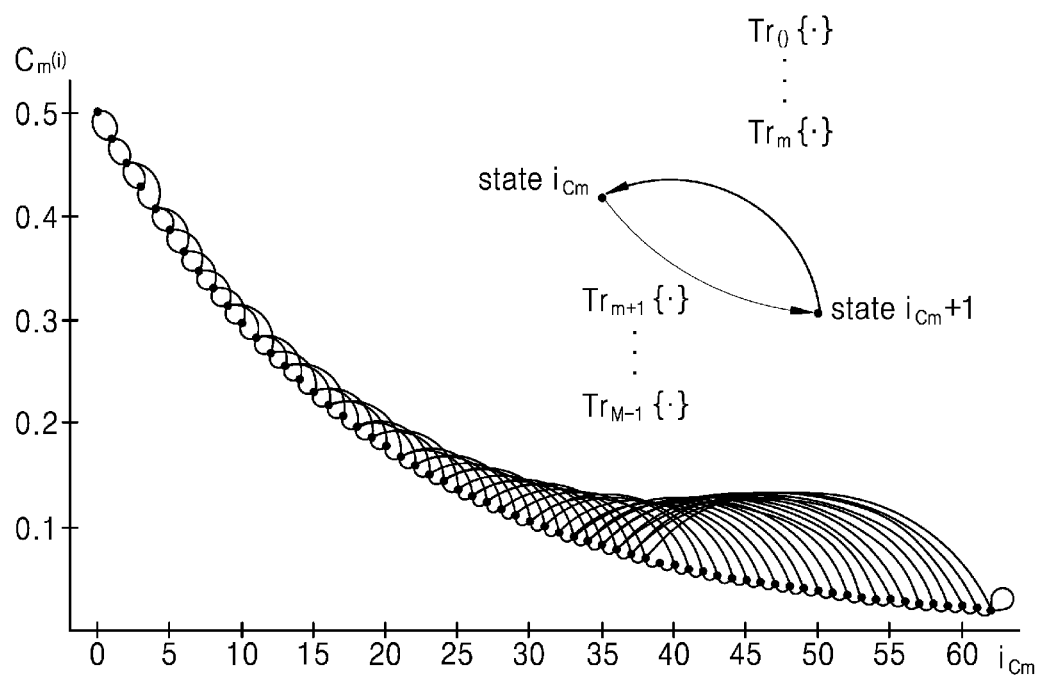
FIG. 18 is a diagram of a probability update process used for CAMAC, according to an embodiment of the disclosure.

FIG. 18 is a diagram of a probability update process used for CAMAC, according to an embodiment of the disclosure.

Referring to FIG. 18, a context model may be defined as a certain preset probability state corresponding to a certain number of symbols and a certain scaling factor. The context modeler 1720 may determine a probability state by using a context model for a certain number of symbols and a certain scaling factor. Each probability state may be determined based on a state index. For example, the probability state for symbol m may be determined based on the state index probability function $i_{Cm}$. A preset state transition table may be used to indicate which probability state is to be transitioned from a current probability state when the probability is updated. The probability state is changed according to the symbol currently being arithmetic-encoded. For example, when the symbol currently being arithmetic-encoded is greater than m, a probability state $i_{Cm}$ for symbol m is changed in a forward state $i_{Cm}+1$, which is a direction in which the occurrence probability of the symbol decreases, and when the symbol currently being arithmetic-encoded is less than or equal to m, the probability state $i_{Cm}$ for symbol m is changed in a backward state $i_{Cm}-1$, which is a direction in which the occurrence probability of the symbol increases. In FIG. 18, $Tr_k\{\}$ denotes, when a symbol to be arithmetic-encoded is k, a probability state transition direction after arithmetic encoding.

When a probability is updated or a probability interval is divided, in a case in which a dense probability value is used, an amount of multiplication operation increases, which may increase the load of hardware. Accordingly, a probability model, in which probability values are changed in a stepwise manner by mapping probabilities $C_m$ shown in FIG. 18 to a certain value through a rounding operation or the like, may be used.

According to an embodiment of the disclosure, the context modeler 1720 may calculate a probability of a symbol. The probability of the symbol may be updated based on a previously determined probability of the symbol. For example, the probability of the symbol may be calculated based on the previously updated probability of the symbol and the scaling factor, rather than according to a preset table. As the number of symbols and the number of context models increase, calculating based on the previously updated probability of the symbol may be effective, rather than according to the preset table.

Figure 19A:
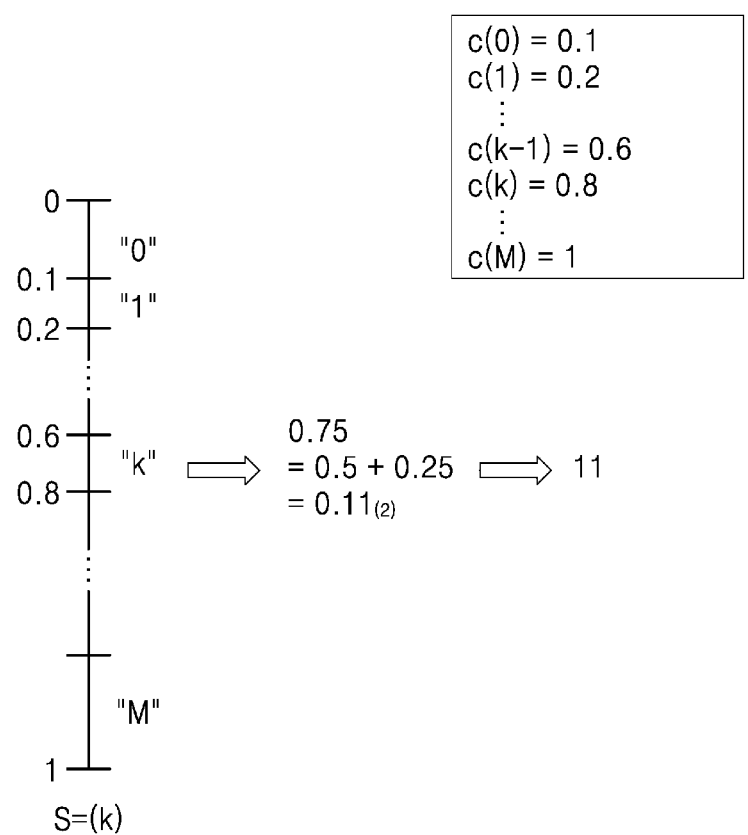
FIG. 19A is a diagram of a process of performing arithmetic encoding based on CAMAC, according to an embodiment of the disclosure.
Figure 19B:
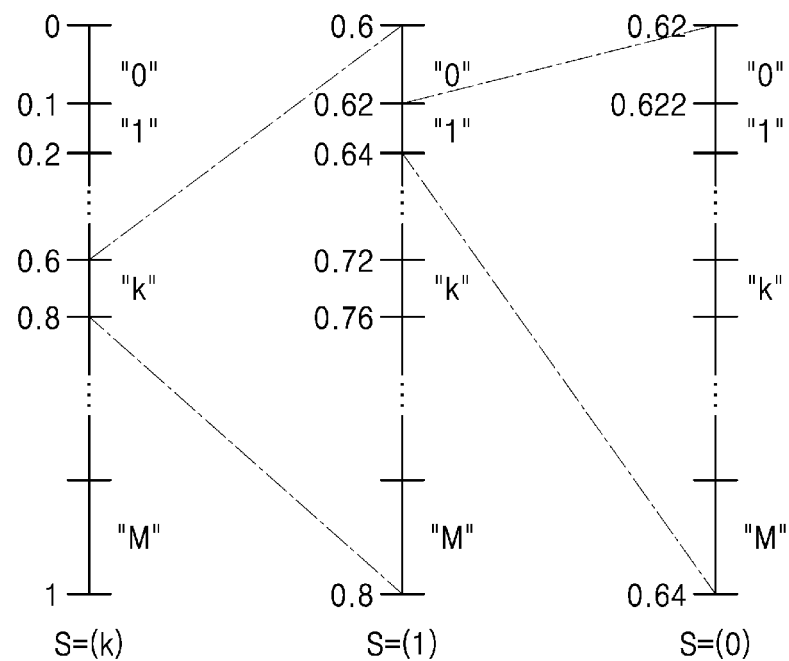
FIG. 19B is a diagram of a process of performing arithmetic encoding based on CAMAC, according to an embodiment of the disclosure.
Figure 19C:
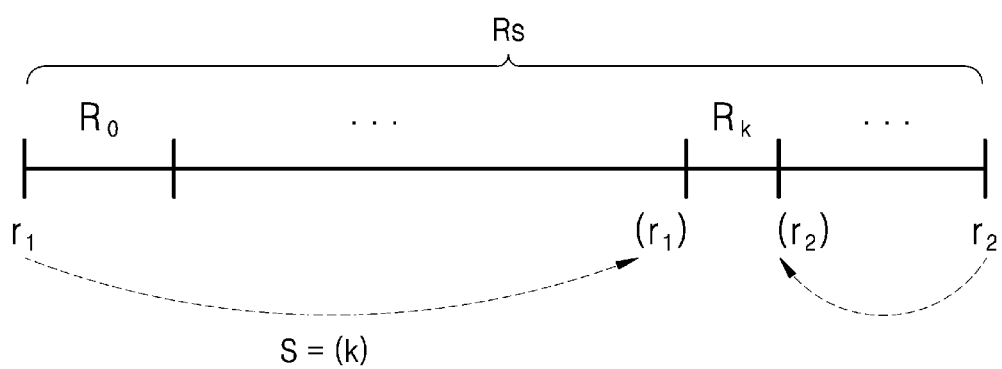
FIG. 19C is a diagram of a process of performing arithmetic encoding based on CAMAC, according to an embodiment of the disclosure.

FIG. 19A is a diagram of a process of performing arithmetic encoding based on CAMAC, according to an embodiment of the disclosure. FIG. 19B is a diagram of a process of performing arithmetic encoding based on CAMAC, according to an embodiment of the disclosure. FIG. 19C is a diagram of a process of performing arithmetic encoding based on CAMAC, according to an embodiment of the disclosure.

Referring to FIG. 19A, the context modeler 1720 provides, to the regular coding engine 1732, probabilities of occurrence of a symbols, e.g., c(1) to c(M−1). The regular coding engine 1732 performs arithmetic encoding by dividing a probability interval in consideration of a probability of an input symbol. In FIG. 19A, it is assumed that an occurrence probability of symbol "0" c(1)=0.1, an occurrence probability of symbol "1" c(1)=0.2, an occurrence probability of symbol "k−1" c(k−1)=0.6, and an occurrence probability of symbol "k" c(k)=0.8. In this regard, c(k) may denote a cumulative occurrence probability. Because a first input symbol $S_1$ is k, the regular coding engine 1732 selects (0.6, 0.8), which is a probability interval of a value of "k", from an interval (0, 1). Then, the regular coding engine 1732 selects 0.75 as a representative value representing the interval (0.6, 0.8), and outputs, in a bitstream, "11" below the decimal point in a binary value 0.11 corresponding to 0.75. That is, the input symbol "k" is mapped to "11" and output.

Referring to FIG. 19B, the context modeler 1720 may encode a plurality of symbols. Although a case in which c(0) to c(M−1) are fixed is described for convenience of description, as described above, values of c(0) to c(M−1) may be updated whenever one symbol is encoded.

The regular coding engine 1732 selects (0.6, 0.8), which is a probability interval of the value of "k", from the interval (0, 1) because the first input symbol $S_1$ is k, selects (0.62, 0.64), which is a probability interval corresponding to "1", from the interval (0.6, 0.8) because a next input bin $S_2$ has a value of 1, and finally determines (0.62, 0.622), which is a probability interval corresponding to "0", from the interval (0.62, 0.64) because a last input bin $S_3$ has a value of 0. Then, the regular coding engine 1732 selects 0.62109375 as a representative value representing the interval (0.62, 0.622), and outputs, in a bitstream, "10011111" below the decimal point in a binary value 0.10011111 corresponding to 0.62109375. That is, the input symbols "k", "1" and "0" are mapped to "10011111" and output.

Referring to FIG. 19C, a binary arithmetic encoding process according to CAMAC may be performed by updating a currently available range Rs, and a lower boundary value $r_1$ and an upper boundary value $r_2$ of the currently available range Rs. When arithmetic encoding starts, Rs=510, $r_1$=0, and $r_2$=510 are set. When the current symbol is k, the range Rs is changed to $R_k$, and the lower boundary value $r_1$ and the upper boundary value $r_2$ may be updated to indicate $R_k$. As in the above-described example of FIG. 19B, in the arithmetic encoding process, a certain interval Rs is updated according to the current symbol, and a binary value indicating the updated interval is output.

Hereinafter, a process of updating a probability model, which is performed by the context modeler 1720, will be described in detail.

A probability update process used in CAMAC may be performed according to Equation 1 below.

$$c_m(t)=(1-\alpha_i)*c_m(t-1), m\in[0,\text{symbol}]$$

$$c_m(t)=c_m(t-1)+\alpha_i*(1-c_m(t-1)), m\in[\text{symbol},M-1] \quad \text{[Equation 1]}$$

In Equation 1, $c_m(t)$ and $c_m(t-1)$ are probabilities of occurrence of a symbol, e.g., probabilities of occurrence of symbol m, and respectively represent an updated probability and a previous probability, which are expressed as real numbers between 0 and 1. $\alpha_i$ ($0\le\alpha_i\le1$ wherein $\alpha_i$ is a real number) denotes a reciprocal of a scaling factor. i denotes an integer value indicating the number of scaling factors.

According to an embodiment of the disclosure, a probability value may be expressed in a range of integers, instead of a range of real numbers between 0 and 1, to simplify the operation. It is assumed that a probability $c_i$ has a value in the form of $c_i=C_i/2^k$ by using an integer $C_i$ between 0 and $2^k$ (k is an integer). Also, a reciprocal $\alpha_i$ of a scaling factor Shift may also be set to have a value as shown in the following equation; $\alpha_i=1/(2^{\text{Shift}_i})$ ($\text{Shift}_i$ is an integer), by using a power of 2. In this case, a multiplication operation included in Equation 1 expressed above may be replaced with a shift operation such as Equation 2 below. In Equation 2, ">>" is a right shift operator.

$$C_m(t)=C_m(t-1)-(C_m(t-1)>>\text{Shift}_i), m\in[0,\text{symbol}]$$

$$C_m(t)=C_m(t-1)+(2^k>>\text{Shift}_i)-(C_m(t-1)>>\text{Shift}_i), m\in[\text{symbol},M-1] \quad \text{[Equation 2]}$$

In Equation 2, $C_m(t)$ and $C_m(t-1)$ are probabilities of occurrence of symbol m, and respectively represent an updated probability and a previous probability, which are expressed as integers between 0 and $2^k$. Shift represents a scaling factor in a log scale. In this regard, i is an integer value representing the number of scaling factors.

The scaling factor Shift may correspond to a window size ($N_i=2^{\text{Shift}_i}$) representing the number of symbols encoded before the current symbol. That is, updating a probability by using the scaling factor Shift may represent that values of previously encoded $N_i$ symbols are considered when updating a probability of the current symbol.

A scaling factor may determine sensitivity representing how sensitively a probability used in CAMAC is updated and robustness representing how robust a probability used in CAMAC is against errors. For example, when the scaling factor Shift is small, that is, when a short window is used, a probability quickly changes to quickly converge into a proper value, but fluctuations easily occur due to sensitivity to individual data. In contrast, when the scaling factor Shift is great, that is, when a long window is used, fluctuations may less occur upon convergence of an updated probability into a proper value, although a probability does not quickly change, such that a stable operation is possible without causing a sensitive response to errors, noise, etc.

For balancing between sensitivity and robustness, the context modeler 1720 according to an embodiment of the disclosure may generate, when updating a probability, a plurality of updated probabilities by using a plurality of different scaling factors, and determine a finally updated probability by using the plurality of updated probabilities.

As the number of used scaling factors increases, computational complexity may increase accordingly, although accuracy of a predicted probability may increase. Accordingly, in the following description, a case in which i is 1 or 2, that is, a case in which a probability is updated by using one or two scaling factors will be described. However, the probability update method according to the disclosure may also be applied to a case of updating a probability by using three scaling factors or more.

In an embodiment of the disclosure, the context modeler 1720 may obtain, when two scaling factors are used, two updated probabilities according to Equation 3 or 4 below, and determine a finally updated probability from the two updated probabilities. According to an embodiment of the disclosure, the finally updated probability may be determined by weighted-summing the two updated probabilities. According to an embodiment of the disclosure, the finally updated probability may be a simple sum of the two updated probabilities.

$$c1_m(t)=(1-\alpha_i)*c1_m(t-1), m\in[0,\text{symbol}]$$

$$c1_m(t)=c1_{m1}(t-1)+\alpha_i*(1-c1_m(t-1)), m\in[\text{symbol},M-1]$$

$$c2_m(t)=(1-\alpha_i)*c2_m(t-1), m\in[0,\text{symbol}]$$

$$c2_m(t)=c2_{m1}(t-1)+\alpha_i*(1-c2_m(t-1)), m\in[\text{symbol},M-1]$$

$$c_m(t)=(a*c1_m(t)+b*c2_m(t)+(a+b)>>1)/(a+b) \quad \text{[Equation 3]}$$

$$C1_m(t)=C1_m(t-1)-(C1_m(t-1)>>\text{Shift}), m \in [0, \text{symbol})$$

$$C1_m(t)=C1_m(t-1)+(2^k>>\text{Shift}_i)-(C1_m(t-1)>>\text{Shift}_i),$$
$$m \in [\text{symbol}, M-1)$$

$$C2_m(t)=C2_m(t-1)-(C2_m(t-1)>>\text{Shift}), m \in [0, \text{symbol})$$

$$C2_m(t)=C2_m(t-1)+(2^k>>\text{Shift}_i)-(C2_m(t-1)>>\text{Shift}),$$
$$m \in [\text{symbol}, M-1)$$

$$C_m(t)=(a*C1_m(t)+b*C2_m(t)+(2^{k*}(a+b)))>>1)/(a+b) \quad \text{[Equation 4]}$$

According to an embodiment of the disclosure, a division operation may also be implemented through a shift operation.

Hereinafter, a probability update method using a plurality of scaling factors will be described in detail with reference to FIGS. 20 to 24.

Figure 20:
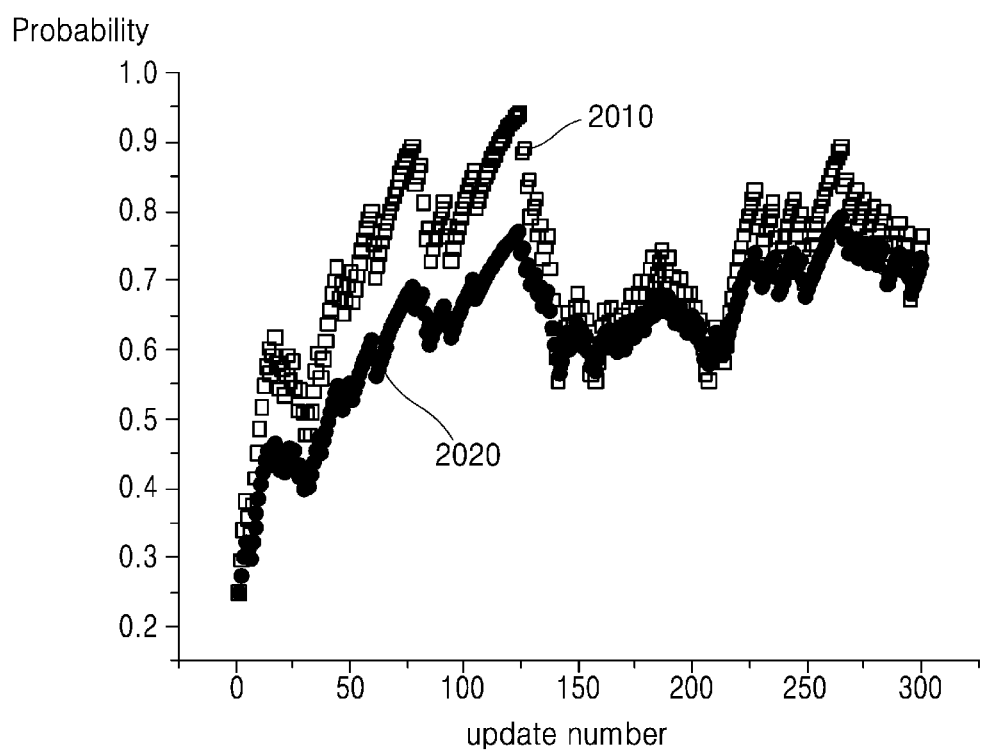
FIG. 20 is a diagram for comparing a probability update process using one scaling factor with a probability update process using a plurality of scaling factors.

FIG. 20 is a diagram for comparing a probability update process using one scaling factor with a probability update process using a plurality of scaling factors.

In a CAMAC encoding/decoding process, an entropy reset may be performed for each certain data unit. For example, an entropy reset may be performed for each slice unit or each coding unit. The entropy reset means discarding a current probability value and newly performing CAMAC based on a predetermined probability value. In a probability update process that is performed after the entropy reset, a probability value set to an initial value may not be an optimal value, and converge into a predetermined probability value after the probability update process is performed several times.

FIG. 20 shows results of probability updates performed by two methods based on the same symbol sequence and initial value. A graph 2010 represents probabilities when a scaling factor corresponding to a short window is used, and a graph 2020 represents probabilities when two scaling factors respectively corresponding to a short window and a long window are used. In FIG. 20, the x axis represents update numbers, and the y axis represents probability values. Referring to FIG. 20, in the case 2010 of updating a probability using a scaling factor, the probability may quickly change to quickly converge into a proper value as an update number of the probability increases, but great fluctuations may occur as updates are repeated. In contrast, in the case 2020 of updating a probability using a plurality of scaling factors, according to an embodiment of the disclosure, fluctuations may less occur upon convergence of an updated probability into a proper value, although the probability does not quickly change, such that a stable operation is possible without causing a sensitive response to errors, noise, etc.

Accordingly, the context modeler 1720 may determine whether to update a probability by using a plurality of scaling factors, in consideration of probability update processes of the case of using one scaling factor and the case of using a plurality of scaling factors.

Figure 21:
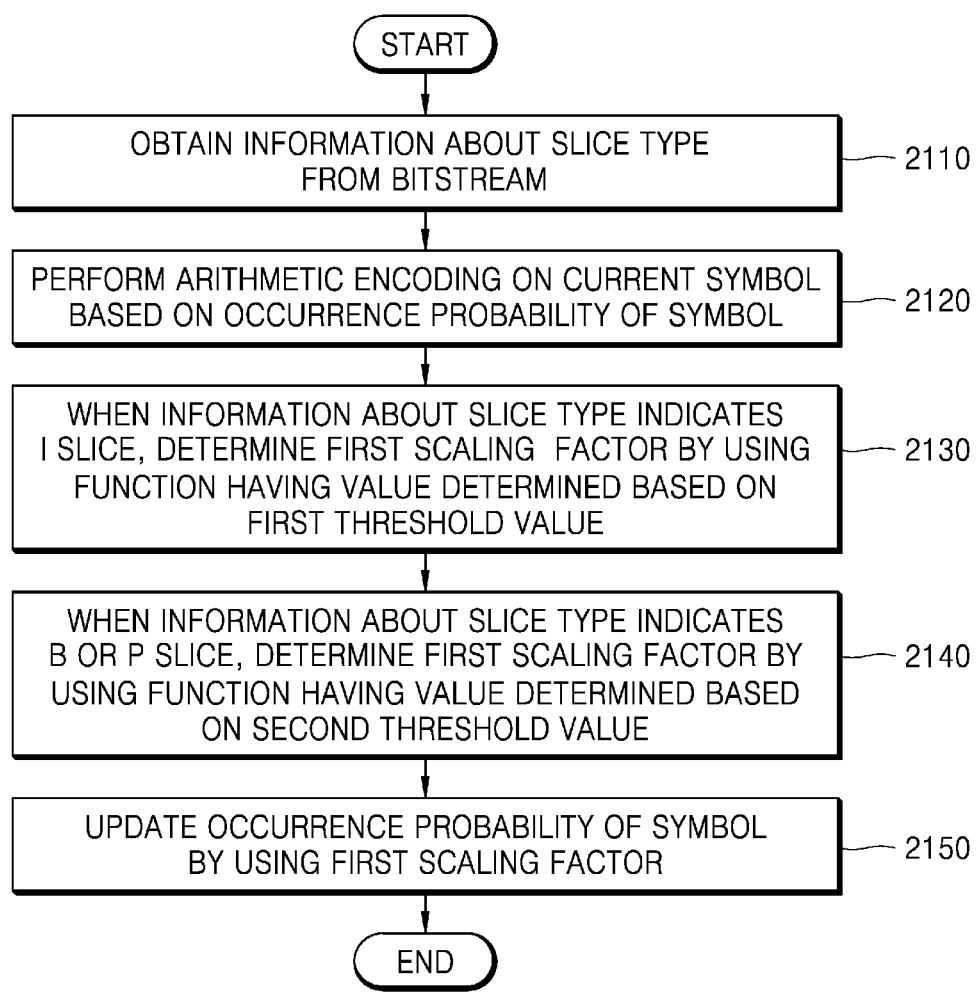
FIG. 21 is a flowchart of a method of updating a probability by using a scaling factor, according to an embodiment of the disclosure.

FIG. 21 is a flowchart of a method of updating a probability by using a scaling factor, according to an embodiment of the disclosure.

Referring to FIG. 21, in operation 2110, the context modeler 1720 may obtain information about a slice type from a bitstream. The slice type may include an I slice, a B slice, or a P slice. The information about the slice type may be included in a slice header. The context modeler 1720 may obtain the information about the slice header in the form of a bitstream.

In operation 2120, the context modeler 1720 may perform arithmetic encoding on a current symbol based on an occurrence probability of a symbol. The current symbol may be determined to correspond to a syntax element by the symbol representation unit 1710. According to an embodiment of the disclosure, the occurrence probability of the symbol may be a cumulative occurrence probability. For example, an occurrence probability of symbol k may be a sum of probabilities of occurrence of individual symbols 0 to k. According to an embodiment of the disclosure, the occurrence probability of the symbol may be an occurrence probability of an individual symbol, which is a probability that the symbol may occur.

According to an embodiment of the disclosure, the occurrence probability of the symbol may be independently determined for each of a plurality of context models corresponding to the syntax element. For example, the context modeler 1720 may obtain a plurality of scaling factor indexes shiftIdx designated for each context model, and determine a value corresponding to each scaling factor index to be a scaling factor.

To designate a scaling factor according to a context model, an additional memory space for a preset scaling factor table may be required. That is, when n bits are required to represent a value of each scaling factor $\text{Shift}_i$, a memory corresponding to n*2*[the number of context models] bits may be required to define two scaling factors for each context model. For example, when a scaling factor is represented by 4 bits and 400 context models are provided, a table of designating two scaling factors for each context model may require ROM of 3200 bits (4*2*400=3200).

Accordingly, the context modeler 1720 according to an embodiment of the disclosure may determine all or some of a plurality of scaling factors based on values being irrelevant to a context model, such that a memory required for determining scaling factors may be saved.

According to an embodiment of the disclosure, only some context models may be set to use scaling factors designated for the context models. For example, only context models for coefficient coding may have designated scaling factors. Also, according to another example, only other context models except for context models for coefficient coding may have designated scaling factors. When a context model has no designated value of a scaling factor, the context modeler 1720 may determine the plurality of scaling factors to be a predetermined reference value.

According to an embodiment of the disclosure, at least one of the plurality of scaling factors may be determined to be a predetermined value being irrelevant to a context model. For example, the context modeler 1720 may determine a first scaling factor $\text{Shift}_1$ corresponding to a short window among two scaling factors to be a fixed value M for all context models, and determine a second scaling factor $\text{Shift}_2$ corresponding to a long window to be a value designated according to a context model. Alternatively, on the contrary, the context modeler 1720 may determine the second scaling factor $\text{Shift}_2$ to be a fixed value, and determine the first scaling factor $\text{Shift}_1$ to be a value designated according to a context model.

When a probability $C_i$ is represented as an integer between 0 and $2_k$, as in Equation 4, a memory of k bits may be required to represent a probability. Accordingly, when two scaling factors are used for each context model, two probabilities may need to be updated, and accordingly, a memory of k*2*[the number of context models] bits may be required. For example, when $C_i$ is represented by an integer that is smaller than or equal to 215 and 400 context models are provided, RAM of 12000 bits (15*2*400=12000) may need to be secured to update probabilities.

Accordingly, to reduce a memory required for representing a probability, the context modeler 1720 according to an embodiment of the disclosure may determine whether to update a probability by using all of a plurality of scaling factors, or whether to update a probability by using only some of the plurality of scaling factors, instead of using all of the plurality of scaling factors, based on a context model. In an embodiment of the disclosure, when the context modeler 1720 determines to update a probability by using some of the plurality of scaling factors, the context modeler 1720 may update a probability by using only one of the plurality of scaling factors. In this case, because a probability, e.g., a value of Pi, needs to be updated, a memory required for representing the probability may be reduced.

In an embodiment of the disclosure, some context models may be set to update a probability by using a plurality of scaling factors. For example, only context models for coefficient coding may be set to update a probability by using a plurality of scaling factors, and the other context models may be set to update a probability by using only one scaling factor. Alternatively, on the contrary, only other context models except for context models for coefficient coding may be set to update a probability by using a plurality of scaling factors, and context models for coefficient coding may be set to update a probability by using only one scaling factor.

In operation 2130, when the information about the slice type indicates an I slice, the context modeler 1720 may determine a first scaling factor by using a function having a value determined based on a first threshold value. For example, when the first threshold value is th1, a value of a first scaling factor $shift_i$ may be determined as $shift_i = b1 + I(count > th1)$. b1 may be a predetermined constant, and the function $I(count > th1)$ may indicate a value greater than 0 when count is greater than th1, and 0 when count is less than or equal to th1. For example, the function $I(count > th1)$ may be 1 when count is greater than th1, and 0 when count is less than or equal to th1.

According to an embodiment of the disclosure, count may be the number of times a symbol is arithmetic-encoded. According to an embodiment of the disclosure, when a plurality of context models are provided, count may be the number of times a symbol is arithmetic-encoded based on each context model. According to an embodiment of the disclosure, b1 may be a value of 2 to 7. For convenience of description, an example in which the value of the first scaling factor shift is determined by one threshold value has been described, but the disclosure is not limited thereto. The value of shift may be determined based on a plurality of threshold values. Also, the value of the first scaling factor shift may be determined in further consideration of other variables. For example, the value of the first scaling factor shift may be determined based on the number of symbols.

In operation 2140, the context modeler 1720 may determine, when the information about the slice type indicates a B or P slice, the first scaling factor by using a function having a value determined based on a second threshold value. For example, when the second threshold value is th2, the value of the first scaling factor shift may be determined as $shift_i = b2 + I(count > th2)$. b2 may be a predetermined constant, and the function $I(count > th2)$ may indicate a value greater than 0 when count is greater than th2, and 0 when count is less than or equal to th2. According to an embodiment of the disclosure, b2 may be a value of 2 to 7. The first threshold value may be greater than or equal to the second threshold value. Also, b2 may be greater than or equal to b1.

When the first threshold value is greater than or equal to the second threshold value, a value of a scaling factor determined based on the first threshold value may be less than a value of a scaling factor determined based on the second threshold value. In the above-described example, a value of a scaling factor when the slice type is an I slice may be less than a value of a scaling factor when the slice type is a B or P slice. Because an inter-slice has a relatively smaller amount of data to be encoded than an intra-slice, the value of the scaling factor in the I slice may be less than the value of the scaling factor in the B or P slice so that an occurrence probability of a symbol in the I slice converges relatively quickly. A bitrate may be saved by determining the scaling factor based on the slice type.

In operation 2150, the context modeler 1720 may update the occurrence probability of the symbol by using the first scaling factor. According to an embodiment of the disclosure, the context modeler 1720 may perform arithmetic encoding and updating based on an occurrence probability of one symbol. As described above, the context modeler 1720 may perform arithmetic encoding and updating based on a plurality of probabilities of occurrence of a symbol. As in Equations 3 and 4, the context modeler 1720 may update each of the plurality of probabilities of occurrence of the symbol, weighted-sum the plurality of updated probabilities of occurrence of the symbol, and finally update an occurrence probability of a symbol. According to an embodiment of the disclosure, the context modeler 1720 may finally update the occurrence probability of the symbol by averaging the plurality of updated probabilities of occurrence of the symbol.

According to an embodiment of the disclosure, the context modeler 1720 may determine a function using the first threshold value as a first scaling factor, and determine a value of the first scaling factor according to a predetermined condition. According to an embodiment of the disclosure, the context modeler 1720 may determine a function using the second threshold value as a first scaling factor, and determine a value of the first scaling factor according to a predetermined condition. According to an embodiment of the disclosure, the context modeler 1720 may determine a function using at least one of the first threshold value or the second threshold value as a first scaling factor, and determine a value of the first scaling factor according to a predetermined condition.

Figure 22:
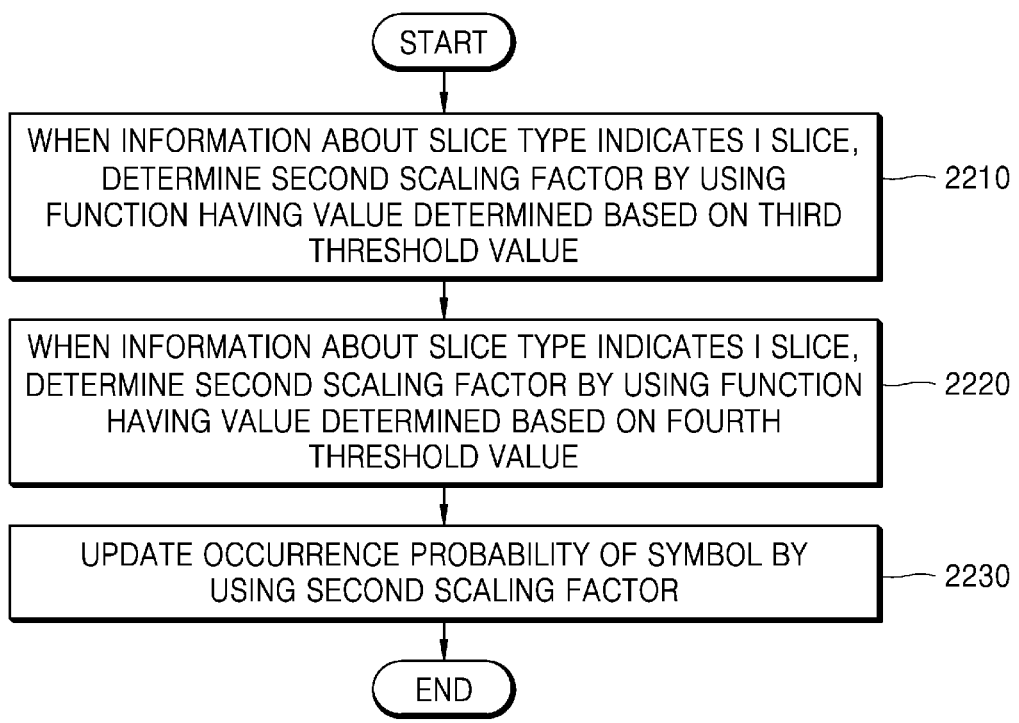
FIG. 22 is a flowchart of a method of updating a probability by using a plurality of scaling factors, according to an embodiment of the disclosure.

FIG. 22 is a flowchart of a method of updating a probability by using a plurality of scaling factors, according to an embodiment of the disclosure. According to an embodiment of the disclosure, operation 2210 may be performed after operation 2120 of FIG. 21.

Referring to FIG. 22, in operation 2210, when information about a slice type indicates an I slice, the context modeler 1720 may determine a second scaling factor by using a function having a value determined based on a third threshold value.

In operation 2220, the context modeler 1720 may determine, when the information about the slice type indicates a B or P slice, the second scaling factor by using a function having a value determined based on a fourth threshold value.

A method by which the context modeler 1720 determines the second scaling factor by using a function having a value determined based on the third threshold value or determines the second scaling factor by using a function having a value determined based on the fourth threshold value may be the same as the method of determining the second scaling factor based on the first threshold value or the second threshold value, which has been described with reference to FIG. 21.

In operation 2230, the context modeler 1720 may update an occurrence probability of a symbol by using the second scaling factor. According to an embodiment of the disclosure, the context modeler 1720 may update the occurrence probability of the symbol by using the first scaling factor or the second scaling factor, which has been obtained in FIG. 21. As described above, the occurrence probability of the symbol may be updated by weighted-summing probabilities of occurrence of a symbol corresponding to a plurality of scaling factors, which are updated based on respective scaling factors.

According to an embodiment of the disclosure, when the information about the slice type indicates an I slice, a weight of a probability corresponding to a scaling factor having a large value among the plurality of scaling factors may be relatively large. For example, when the information about the slice type indicates an I slice and a value of the first scaling factor is greater than or equal to a value of the second scaling factor, a weight for a first probability may be greater than or equal to a weight for a second probability. When the slice type is an I slice, having a large weight for a probability having a greater scaling factor may be efficient.

According to an embodiment of the disclosure, when the information about the slice type indicates a B or P slice, a weight of a probability corresponding to a scaling factor having a large value among the plurality of scaling factors may be relatively small. For example, when the information about the slice type indicates a B or P slice and a value of the first scaling factor is greater than or equal to a value of the second scaling factor, a weight for a first probability may be less than or equal to a weight for a second probability. When the slice type is a B or P slice, having a small weight for a probability having a greater scaling factor may be efficient.

Figure 23:
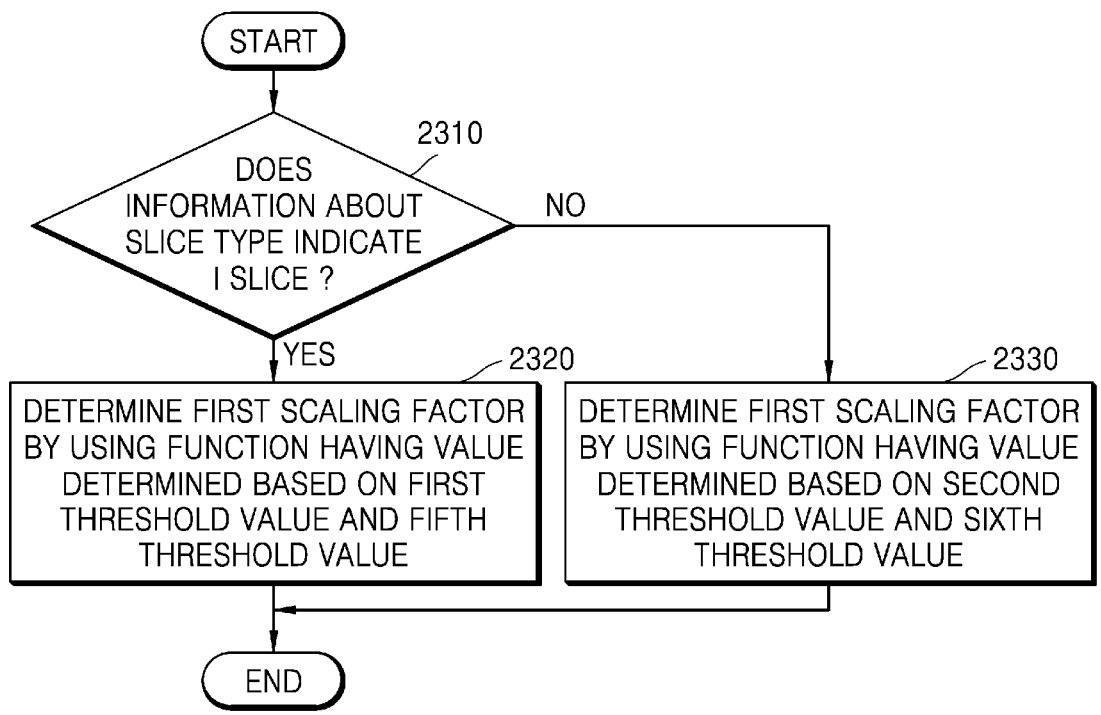
FIG. 23 is a flowchart of a method of updating an occurrence probability of a symbol by using a plurality of scaling factors, according to an embodiment of the disclosure.

FIG. 23 is a flowchart of a method of updating an occurrence probability of a symbol by using a plurality of scaling factors, according to an embodiment of the disclosure.

Referring to FIG. 23, in operation 2310, the context modeler 1720 determines whether information about a slice type indicates an I slice. When the information about the slice type is an I slice, operation 2320 is performed, and when the information about the slice type is not an I slice, operation 2330 is performed.

In operation 2320, the context modeler 1720 may determine a first scaling factor by using a function having a value determined based on a first threshold value and a fifth threshold value. For example, when the first threshold value is th11 and the fifth threshold value is th12, a value of a first scaling factor $shift_i$ may be determined as $shift_i = b1 + I(count > th11) + I(count > th12)$. b1 may be a predetermined constant, and the functions $I(count > th11)$ and $I(count > th12)$ may mean that a value greater than 0 is indicated when count is greater than or equal to th11 and th12, respectively. The constant b1, the function $I(count > th)$, and the threshold value th may be understood with reference to operation 2130 of FIG. 21.

In operation 2330, the context modeler 1720 may determine the first scaling factor by using a function having a value determined based on a second threshold value and a sixth threshold value. For example, when the second threshold value is th21 and the sixth threshold value is th22, a value of the first scaling factor shift may be determined as $shift_i = b2 + I(count > th21) + I(count > th22)$.

An equation for determining shift in operations 2320 and 2330 is merely an example, and the disclosure is not limited thereto. Other elements may be further included to determine $shift_i$.

According to an embodiment of the disclosure, a predetermined threshold value, such as the first threshold value, may be a fixed value, e.g., 31. According to an embodiment of the disclosure, the predetermined threshold may be a value designated according to a context model. According to an embodiment of the disclosure, the context modeler 1720 may use, with respect to some context models, thresholds respectively designated for the context models, and use, with respect to the other context models, a pre-designated fixed value.

Figure 24:
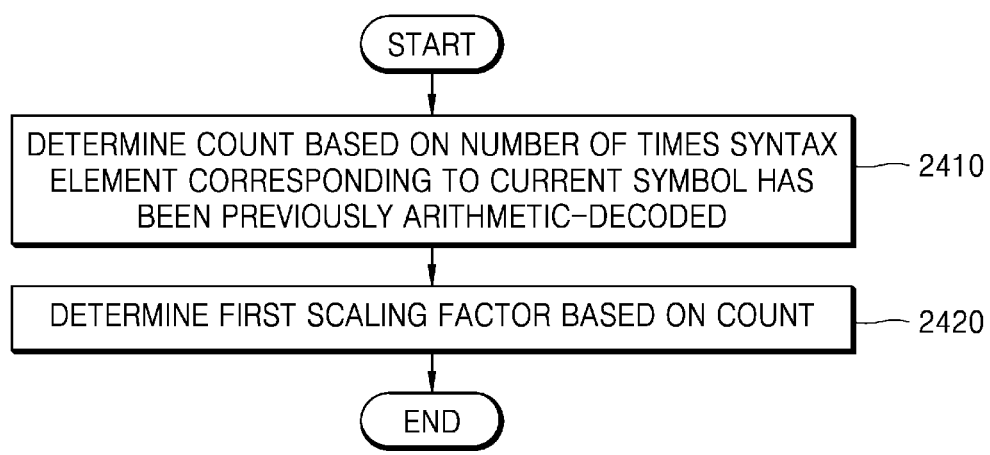
FIG. 24 is a flowchart of a method of determining a value of a scaling factor based on a syntax element corresponding to a current symbol, according to an embodiment of the disclosure.

FIG. 24 is a flowchart of a method of determining a value of a scaling factor based on a syntax element corresponding to a current symbol, according to an embodiment of the disclosure.

In operation 2410, the context modeler 1720 may determine a count based on the number of times a syntax element corresponding to a current symbol has been previously arithmetic-decoded.

According to an embodiment of the disclosure, the context modeler 1720 may determine, as a count, the number of times the syntax element corresponding to the current symbol has been previously arithmetic-decoded. That is, the count may be increased by 1 whenever the syntax element is arithmetic-decoded. According to an embodiment of the disclosure, when the number of times the syntax element has been previously arithmetic-decoded is greater than or equal to a predetermined value, the count may be expressed as a fixed value. For example, when a threshold value is 31 and the number of times the syntax element has been previously arithmetic-decoded is not greater than 31, the count may be the same as the number of times the syntax element has been previously arithmetic-decoded. When the threshold value is 31 and the number of times the syntax element has been previously arithmetic-decoded is greater than or equal to 31, the count may be determined as a predetermined value. For example, the count may be fixed at 31 corresponding to the threshold value or 32 which is increased by 1 from the threshold value. A case in which the threshold value is 31 has been described for convenience of description, but the disclosure is not limited thereto. The threshold value may be determined to be another number, such as 63, according to selection of one of ordinary skill in the art.

In operation 2420, the context modeler 1720 may determine a value of a first scaling factor based on the count.

According to an embodiment of the disclosure, a value of the first function determined when the number of times of arithmetic decoding is greater than or equal to the first threshold value may be greater than a value of the first function determined when the number of times of arithmetic decoding is less than the first threshold value. For example, the value of the first function determined when the number of times of arithmetic decoding is greater than or equal to the first threshold value may be greater by 1 than the value of the first function determined when the number of times of arithmetic decoding is less than the first threshold value. For example, the function $I(count > th1)$ for determining a value of a scaling factor may have a value of 1 when count is greater than th1, and a value of 0 when count is less than or equal to th1.

Figure 25:
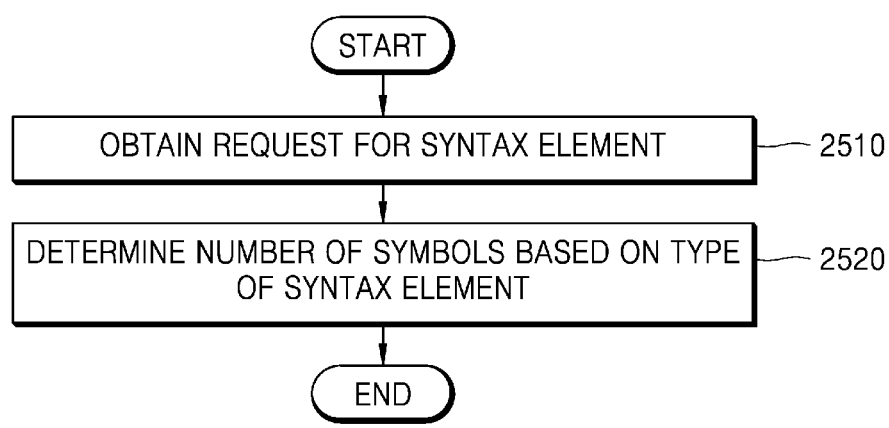
FIG. 25 is a flowchart of a method of determining the number of symbols based on a syntax element, according to an embodiment of the disclosure.

FIG. 25 is a flowchart of a method of determining the number of symbols based on a syntax element, according to an embodiment of the disclosure.

In operation 2510, the context modeler 1720 may obtain a request for a syntax element.

In operation 2520, the context modeler 1720 may determine the number of symbols based on a type of the syntax element. The number of symbols may refer to the number of symbols to which a syntax element may correspond. For example, when the number of symbols is M (M is an integer), the syntax elements may correspond to one of symbols 0 to M−1. According to an embodiment of the disclosure, the number of symbols may be different for each syntax element. The number of symbols may be predetermined. According to an embodiment of the disclosure, the number of symbols may be 2 to 16. According to an embodiment of the disclosure, the number of symbols may be 2 to 8.

According to an embodiment of the disclosure, the scaling factor may be determined by using the number of symbols. For example, the scaling factor may be determined as $shift_i = b1 + I(count > th1) + min(log(M), 2)$. In this regard, M denotes the number of symbols. That is, the value of the scaling factors may be determined based on a result of comparing the number of symbols with a predetermined value (e.g., 2).

According to an embodiment of the disclosure, when the number of symbols is greater than or equal to the predetermined value, the value of the first scaling factor may be determined based on the predetermined value, and when the number of symbols is less than the predetermined value, the value of the first scaling factor may be determined based on the number of symbols. For example, the value of the scaling factor may be determined based on a smaller value between a predetermined value and a log value of the number of symbols.

The number of elements (e.g., a probability) related to each symbol increases as the number of symbols increases, and thus, by varying the number of symbols for each syntax element, memory efficiency may be enhanced.

Figure 26:
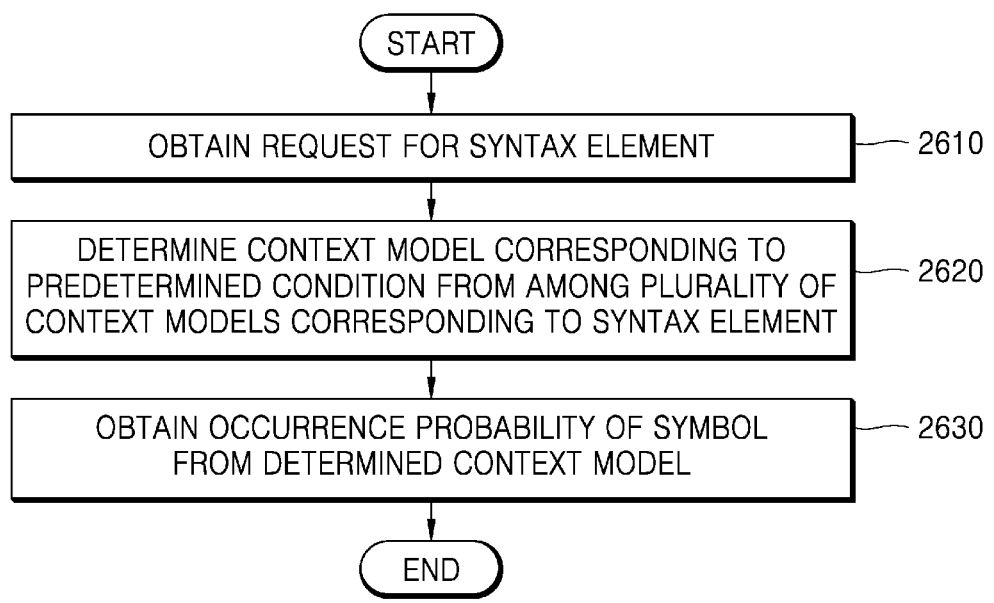
FIG. 26 is a flowchart of a method of determining an occurrence probability of a symbol based on a context model, according to an embodiment of the disclosure.

FIG. 26 is a flowchart of a method of determining an occurrence probability of a symbol based on a context model, according to an embodiment of the disclosure.

In operation 2610, the context modeler 1720 may obtain a request for a syntax element. Operation 2610 may correspond to operation 2510.

In operation 2620, the context modeler 1720 may determine a context model corresponding to a predetermined condition, from among a plurality of context models corresponding to a syntax element.

In operation 2630, the context modeler 1720 may obtain an occurrence probability of a symbol from the determined context model. The plurality of context models may be determined and updated independently of the occurrence probability of the symbol. That is, the obtained occurrence probability of a symbol may be different according to the determined context model in operation 2620.

Figure 27:
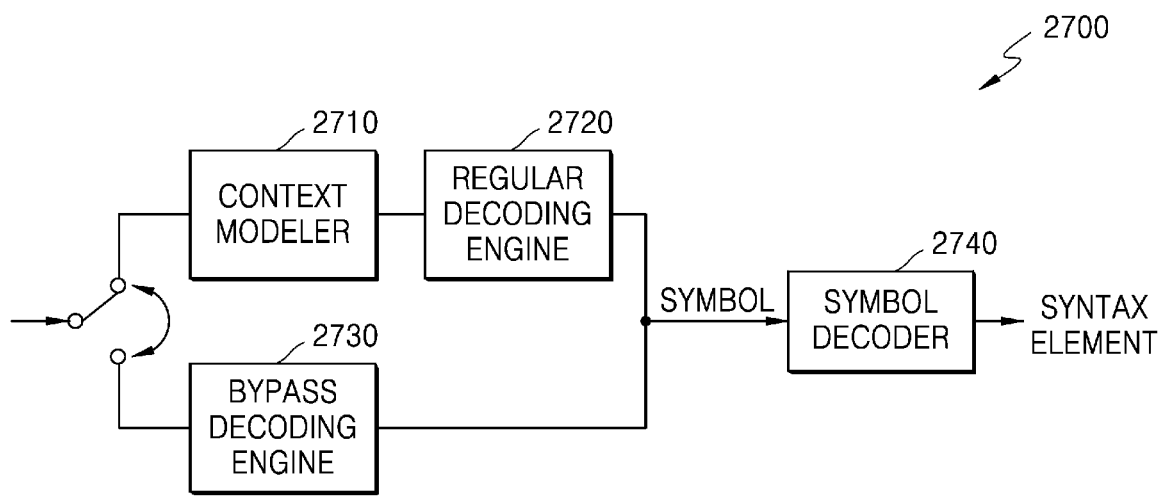
FIG. 27 is a block diagram illustrating a configuration of an entropy decoding apparatus according to an embodiment of the disclosure.

FIG. 27 is a block diagram illustrating a configuration of an entropy decoding apparatus 2700 according to an embodiment of the disclosure.

Referring to FIG. 27, an entropy decoding apparatus 2700 may include a context modeler 2710, a regular decoding engine 2720, a bypass decoding engine 2730, and a symbol decoder 2740. The entropy decoding apparatus 2700 may perform an inverse process of an entropy encoding process performed by the entropy encoding apparatus 1700 described above.

Bins encoded by bypass coding may be output to the bypass decoding engine 2730 and decoded, and bins encoded by regular coding may be decoded by the regular decoding engine 2720. The regular decoding engine 2720 may perform arithmetic decoding on a current bin provided from the context modeler 2710 by using a probability of a binary value determined based on previous bins decoded before the current bin is decoded.

The context modeler 2710 may provide a probability model for bins to the regular decoding engine 2720. More particularly, the context modeler 2710 may determine a probability of a predetermined binary value based on the previously decoded bins, update a probability of a binary value used to decode the previous bins, and output the updated probability to the regular decoding engine 2720.

The context modeler 2710 according to an embodiment of the disclosure may determine a plurality of scaling factors for updating an occurrence probability of a predetermined binary value for a current symbol. The context modeler 2710 may update the occurrence probability of the predetermined binary value by using at least one of the plurality of scaling factors, according to the binary value of the current symbol. The probability update process performed by the context modeler 2710 may be the same as the probability update process performed in the above-described encoding process, and thus, a detailed description thereof will be omitted.

The symbol decoder 2740 may again map bin strings reconstructed by the regular decoding engine 2720 or the bypass decoding engine 2730 to syntax elements, and reconstruct the bin strings.

Figure 28:
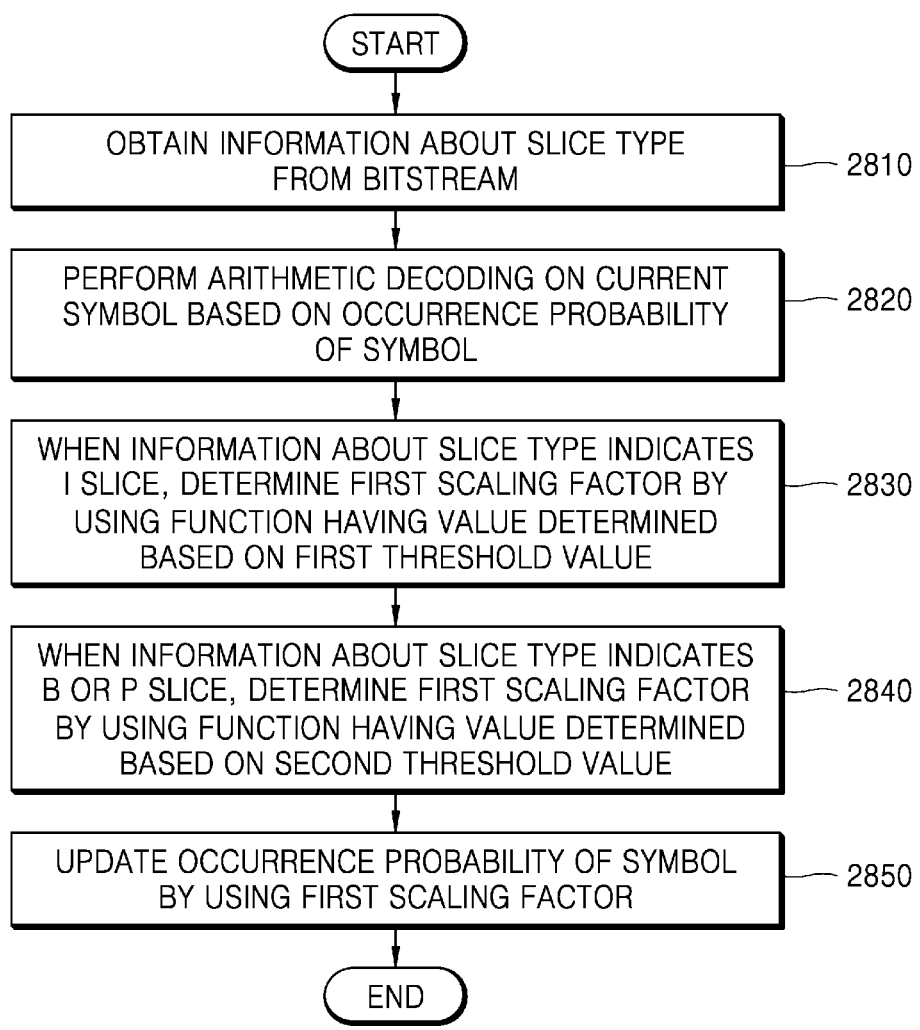
FIG. 28 is a flowchart of a method of updating a probability by using a scaling factor, according to an embodiment of the disclosure.

FIG. 28 is a flowchart of a method of updating a probability by using a scaling factor, according to an embodiment of the disclosure.

Referring to FIG. 28, in operation 2810, the context modeler 2710 may obtain information about a slice type from a bitstream. The slice type may include an I slice, a B slice, or a P slice. The information about the slice type may be included in a slice header. The context modeler 2710 may obtain the information about the slice header in the form of a bitstream.

In operation 2820, the context modeler 2710 may perform arithmetic decoding on a current symbol, based on an occurrence probability of a symbol. The current symbol may be determined to correspond to a syntax element by the symbol representation unit 1710. According to an embodiment of the disclosure, the occurrence probability of the symbol may be a cumulative occurrence probability. For example, an occurrence probability of symbol k may be a sum of probabilities of occurrence of individual symbols 0 to k. According to an embodiment of the disclosure, the occurrence probability of the symbol may be an occurrence probability of an individual symbol, which is a probability that the symbol may occur.

According to an embodiment of the disclosure, the occurrence probability of the symbol may be independently determined for each of a plurality of context models corresponding to the syntax element. For example, the context modeler 2710 may obtain a plurality of scaling factor indexes shiftIdx designated for each context model, and determine a value corresponding to each scaling factor index to be a scaling factor.

According to an embodiment of the disclosure, only some context models may be set to use scaling factors designated for the context models. For example, only context models for coefficient coding may have designated scaling factors. Also, according to another example, only other context models except for context models for coefficient coding may have designated scaling factors. When a context model has no designated value of a scaling factor, the context modeler 2710 may determine the plurality of scaling factors to be a predetermined reference value.

According to an embodiment of the disclosure, at least one of the plurality of scaling factors may be determined to be a predetermined value being irrelevant to a context model. For example, the context modeler 2710 may determine a first scaling factor $Shift_1$ corresponding to a short window among two scaling factors to be a fixed value M for all context models, and determine a second scaling factor $Shift_2$ corresponding to a long window to be a value designated according to a context model. Alternatively, on the contrary, the context modeler 2710 may determine the second scaling factor $Shift_2$ to be a fixed value, and determine the first scaling factor $Shift_1$ to be a value designated according to a context model.

When a probability $C_i$ is represented as an integer between 0 and $2_k$, as in Equation 4, a memory of k bits may be required to represent a probability. Accordingly, when two scaling factors are used for each context model, two probabilities may need to be updated, and accordingly, a memory of k*2*[the number of context models] bits may be required. For example, when $C_i$ is represented by an integer that is smaller than or equal to 215 and 400 context models are provided, RAM of 12000 bits (15*2*400=12000) may need to be secured to update probabilities.

Accordingly, to reduce a memory required for representing a probability, the context modeler 2710 according to an embodiment of the disclosure may determine whether to update a probability by using all of a plurality of scaling factors, or whether to update a probability by using only some of the plurality of scaling factors, instead of using all of the plurality of scaling factors, based on a context model. In an embodiment of the disclosure, when the context modeler 2710 determines to update a probability by using some of the plurality of scaling factors, the context modeler 2710 may update a probability by using only one of the plurality of scaling factors. In this case, because a probability, e.g., a value of Pi, needs to be updated, a memory required for representing the probability may be reduced.

In an embodiment of the disclosure, some context models may be set to update a probability by using a plurality of scaling factors. For example, only context models for coefficient coding may be set to update a probability by using a plurality of scaling factors, and the other context models may be set to update a probability by using only one scaling factor. Alternatively, on the contrary, only other context models except for context models for coefficient coding may be set to update a probability by using a plurality of scaling factors, and context models for coefficient coding may be set to update a probability by using only one scaling factor.

In operation 2830, when the information about the slice type indicates an I slice, the context modeler 2710 may determine a first scaling factor by using a function having a value determined based on a first threshold value. For example, when the first threshold value is th1, a value of a first scaling factor shift may be determined as $shift_i=b1+I(count>th1)$. b1 may be a predetermined constant, and the function $I(count>th1)$ may indicate a value greater than 0 when count is greater than th1, and 0 when count is less than or equal to th1. For example, the function $I(count>th1)$ may be 1 when count is greater than th1, and 0 when count is less than or equal to th1.

According to an embodiment of the disclosure, count may be the number of times a symbol is arithmetic-encoded. According to an embodiment of the disclosure, when a plurality of context models are provided, count may be the number of times a symbol is arithmetic-encoded based on each context model. According to an embodiment of the disclosure, b1 may be a value of 2 to 7. For convenience of description, an example in which the value of the first scaling factor shift is determined by one threshold value has been described, but the disclosure is not limited thereto. The value of shift may be determined based on a plurality of threshold values. Also, the value of the first scaling factor shift may be determined in further consideration of other variables. For example, the value of the first scaling factor shift may be determined based on the number of symbols.

In operation 2840, the context modeler 2710 may determine, when the information about the slice type indicates a B or P slice, the first scaling factor by using a function having a value determined based on a second threshold value. For example, when the second threshold value is th2, the value of the first scaling factor shift may be determined as $shift_i=b2+I(count>th2)$. b2 may be a predetermined constant, and the function $I(count>th2)$ may indicate a value greater than 0 when count is greater than th2, and 0 when count is less than or equal to th2. According to an embodiment of the disclosure, b2 may be a value of 2 to 7. The first threshold value may be greater than or equal to the second threshold value. Also, b2 may be greater than or equal to b1. When the first threshold value is greater than or equal to the second threshold value, a value of a scaling factor determined based on the first threshold value may be less than a value of a scaling factor determined based on the second threshold value. In the above-described example, a value of a scaling factor when the slice type is an I slice may be less than a value of a scaling factor when the slice type is a B or P slice. Because an inter-slice has a relatively less amount of data to be encoded than an intra-slice, the value of the scaling factor in the I slice may be less than the value of the scaling factor in the B or P slice so that an occurrence probability of a symbol in the I slice converges relatively quickly. A bitrate may be saved by determining the scaling factor based on the slice type.

In operation 2850, the context modeler 2710 may update the occurrence probability of the symbol by using the first scaling factor. According to an embodiment of the disclosure, the context modeler 2710 may perform arithmetic encoding and updating based on an occurrence probability of one symbol. As described above, the context modeler 2710 may perform arithmetic encoding and updating based on a plurality of probabilities of occurrence of a symbol. As in Equations 3 and 4, the context modeler 2710 may update each of the plurality of probabilities of occurrence of the symbol, weighted-sum the plurality of updated probabilities of occurrence of the symbol, and finally update an occurrence probability of a symbol. According to an embodiment of the disclosure, the context modeler 2710 may finally update the occurrence probability of the symbol by averaging the plurality of updated probabilities of occurrence of the symbol.

According to an embodiment of the disclosure, the context modeler 2710 may determine a function using the first threshold value as a first scaling factor, and determine a value of the first scaling factor according to a predetermined condition. According to an embodiment of the disclosure, the context modeler 2710 may determine a function using the second threshold value as a first scaling factor, and determine a value of the first scaling factor according to a predetermined condition. According to an embodiment of the disclosure, the context modeler 2710 may determine a function using at least one of the first threshold value or the second threshold value as a first scaling factor, and determine a value of the first scaling factor according to a predetermined condition.

According to an embodiment of the disclosure, an entropy decoding method is provided. The entropy decoding method may include obtaining information about a slice type from a bitstream. The entropy decoding method may include, based on an occurrence probability of a symbol, performing arithmetic decoding on a current symbol corresponding to a syntax element. The entropy decoding method may include when the information about the slice type indicates an I slice, determining a first scaling factor for updating the occurrence probability of the symbol by using a first function, wherein a value of the first function is determined based on a first threshold value. The entropy decoding method may include, when the information about the slice type indicates a B or P slice, determining the first scaling factor by using a second function, wherein a value of the second function is determined based on a second threshold value. The entropy decoding method may include, by using the first scaling factor, updating the occurrence probability of the symbol. The first threshold value may be greater than or equal to the second threshold value.

According to an embodiment of the disclosure, the entropy decoding method may include, when the information about the slice type indicates the I slice, determining a second scaling factor for updating the occurrence probability of the symbol by using a third function, wherein a value of the third function is determined based on a third threshold value. The entropy decoding method may include, when the information about the slice type indicates a B or P slice, determining the second scaling factor by using a fourth function, wherein a value of the fourth function is determined based on a fourth threshold value. The entropy decoding method may include, by using the first scaling factor and the second scaling factor, updating the occurrence probability of the symbol. The third threshold value may be greater than or equal to the fourth threshold value.

According to an embodiment of the disclosure, the entropy decoding method may include, by using the first scaling factor, updating a first probability of the symbol. The entropy decoding method may include, by using the second scaling factor, updating a second probability of the symbol. The entropy decoding method may include, by using an average of the first probability and the second probability, updating the occurrence probability of the symbol.

According to an embodiment of the disclosure, the entropy decoding method may include, by using the first scaling factor, updating a first probability of the symbol. The entropy decoding method may include, by using the second scaling factor, updating a second probability of the symbol. The entropy decoding method may include, by using a weighted sum of the first probability and the second probability, updating the occurrence probability of the symbol.

According to an embodiment of the disclosure, when the information about the slice type indicates the I slice, a value of the first scaling factor may be greater than or equal to a value of the second scaling factor. When the information about the slice type indicates the I slice, a weight for the first probability may be greater than or equal to a weight for the second probability.

According to an embodiment of the disclosure, in the entropy decoding method, when the information about the slice type indicates the B or P slice, a value of the first scaling factor may be greater than or equal to a value of the second scaling factor. When the information about the slice type indicates the B or P slice, a weight for the first probability may be less than or equal to a weight for the second probability.

According to an embodiment of the disclosure, the first scaling factor may be determined based on a number of times a symbol corresponding to the syntax element has been previously arithmetic-decoded.

According to an embodiment of the disclosure, a value of the first function determined when the number of times of arithmetic decoding is greater than or equal to the first threshold value may be greater than a value of the first function determined when the number of times of arithmetic decoding is less than the first threshold value.

According to an embodiment of the disclosure, a value of the first function determined when the number of times of arithmetic decoding is greater than or equal to the first threshold value may be greater by 1 than a value of the first function determined when the number of times of arithmetic decoding is less than the first threshold value.

According to an embodiment of the disclosure, the entropy decoding method may include obtaining a request for the syntax element. The entropy decoding method may include, based on a type of the syntax element, determining a number of symbols.

According to an embodiment of the disclosure, a value of the first scaling factor may be determined by using the number of symbols.

According to an embodiment of the disclosure, when the number of symbols is greater than or equal to a predetermined value, the value of the first scaling factor may be determined based on the predetermined value. When the number of symbols is less than the predetermined value, the value of the first scaling factor may be determined based on the number of symbols.

According to an embodiment of the disclosure, when the number of symbols is M (M is an integer), the current symbol may correspond to one integer of 0 to M−1. The M may have a value of 2 to 16.

According to an embodiment of the disclosure, the entropy decoding method may include obtaining a request for the syntax element. The entropy decoding method may include, among a plurality of context models corresponding to the syntax element, determining a context model corresponding to a predetermined condition. The entropy decoding method may include obtaining the occurrence probability of the symbol from the determined context model.

According to an embodiment of the disclosure, the occurrence probability of the symbol may be a cumulative distribution probability.

According to an embodiment of the disclosure, the entropy decoding method may include determining the first scaling factor by using a function having a value determined based on the first threshold value and a fifth threshold value. The entropy decoding method may include determining the second scaling factor by using a function having a value determined based on the second threshold value and a sixth threshold value.

According to an embodiment of the disclosure, an entropy decoding apparatus is provided. The entropy decoding apparatus may include at least one processor. The at least one processor may be configured to obtain, from a bitstream, information about a slice type. The at least one processor may be configured to, based on an occurrence probability of a symbol, perform arithmetic decoding on a current symbol corresponding to a syntax element. The at least one processor may be configured to, when the information about the slice type indicates an I slice, determine a first scaling factor for updating the occurrence probability of the symbol by using a first function, wherein a value of the first function is determined based on a first threshold value. The at least one processor may be configured to, when the information about the slice type indicates a B or P slice, determine the first scaling factor by using a second function, wherein a value of the second function is determined based on a second threshold value. The at least one processor may be configured to, by using the first scaling factor, update the occurrence probability of the symbol. The first threshold value may be greater than or equal to the second threshold value.

According to an embodiment of the disclosure, an entropy encoding method is provided. The entropy encoding method may include obtaining, from a bitstream, information about a slice type. The entropy encoding method may include, based on an occurrence probability of a symbol, performing arithmetic encoding on a current symbol corresponding to a syntax element. The entropy encoding method may include when the information about the slice type indicates an I slice, determining a first scaling factor for updating the occurrence probability of the symbol by using a first function, wherein a value of the first function is determined based on a first threshold value. The entropy encoding method may include, when the information about the slice type indicates a B or P slice, determining the first scaling factor by using a second function, wherein a value of the second function is determined based on a second threshold value. The entropy encoding method may include, by using the first scaling factor, updating the occurrence probability of the symbol. The first threshold value may be greater than or equal to the second threshold value.

According to an embodiment of the disclosure, an entropy encoding apparatus is provided. The entropy encoding apparatus may include at least one processor. The at least one processor may be configured to obtain, from a bitstream, information about a slice type. The at least one processor may be configured to, based on an occurrence probability of a symbol, perform arithmetic encoding on a current symbol corresponding to a syntax element. The at least one processor may be configured to, when the information about the slice type indicates an I slice, determine a first scaling factor for updating the occurrence probability of the symbol by using a first function, wherein a value of the first function is determined based on a first threshold value. The at least one processor may be configured to, when the information about the slice type indicates a B or P slice, determine the first scaling factor by using a second function, wherein a value of the second function is determined based on a second threshold value. The at least one processor may be configured to, by using the first scaling factor, update the occurrence probability of the symbol. The first threshold value may be greater than or equal to the second threshold value.

Embodiments of the disclosure have been described above. It will be understood by one of ordinary skill in the art to which the disclosure belongs that modifications can be made within a range not deviating from the intrinsic properties of the disclosure. Therefore, the embodiment of the disclosure should be considered from a descriptive standpoint rather than a restrictive standpoint. The scope of the disclosure is defined in the accompanying claims rather than the above detailed description, and it should be noted that all differences falling within the claims and equivalents thereof are included in the scope of the disclosure.

Moreover, the embodiment of the disclosure may be written as a program that is executable on a computer, and implemented on a general-purpose digital computer that operates a program using a computer-readable recording medium. The computer-readable recording medium may include a storage medium, such as a magnetic storage medium (e.g., ROM, a floppy disk, a hard disk, etc.) and an optical reading medium (e.g., compact disc ROM (CD-ROM), digital versatile disc (DVD), etc.).

What is claimed is:

1. An entropy decoding method comprising:
   obtaining, from a bitstream, information about a slice type;
   based on an occurrence probability of a symbol, performing arithmetic decoding on a current symbol corresponding to a syntax element;
   based on the slice type indicating an I slice, determining a first scaling factor for updating the occurrence probability of the symbol by using a first function, wherein a value of the first function is determined based on a count value and a first threshold value;
   based on the slice type indicating a B or P slice, determining the first scaling factor by using a second function, wherein a value of the second function is determined based on the count value and a second threshold value; and
   by using the first scaling factor, updating the occurrence probability of the symbol,
   wherein the first threshold value is greater than or equal to the second threshold value,
   wherein the count value indicates a number of times a symbol corresponding to the syntax element has been previously arithmetic-decoded.

2. The entropy decoding method of claim 1, further comprising:
   based on the slice type indicating the I slice, determining a second scaling factor for updating the occurrence probability of the symbol by using a third function, wherein a value of the third function is determined based on a third threshold value; and
   based on the slice type indicating a B or P slice, determining the second scaling factor by using a fourth function, wherein a value of the fourth function is determined based on a fourth threshold value,
   wherein the updating of the occurrence probability of the symbol by using the first scaling factor comprises,
   by using the first scaling factor and the second scaling factor, updating the occurrence probability of the symbol, and
   the third threshold value is greater than or equal to the fourth threshold value.

3. The entropy decoding method of claim 2, wherein the updating of the occurrence probability of the symbol by using the first scaling factor and the second scaling factor comprises:
   by using the first scaling factor, updating a first probability of the symbol;
   by using the second scaling factor, updating a second probability of the symbol; and
   by using an average of the first probability and the second probability, updating the occurrence probability of the symbol.

4. The entropy decoding method of claim 2, wherein the updating of the occurrence probability of the symbol by using the first scaling factor and the second scaling factor comprises:
   by using the first scaling factor, updating a first probability of the symbol;
   by using the second scaling factor, updating a second probability of the symbol; and by using a weighted sum of the first probability and the second probability, updating the occurrence probability of the symbol.

5. The entropy decoding method of claim 4, wherein, based on the slice type indicating the I slice, a value of the first scaling factor is greater than or equal to a value of the second scaling factor, and a weight for the first probability is greater than or equal to a weight for the second probability.

6. The entropy decoding method of claim 4, wherein, when the information about the slice type indicates the B or P slice, a value of the first scaling factor is greater than or equal to a value of the second scaling factor, and a weight for the first probability is less than or equal to a weight for the second probability.

7. The entropy decoding method of claim 1, wherein a value of the first function that is determined when the number of times of arithmetic decoding is greater than or equal to the first threshold value, is greater than a value of the first function determined when the number of times of arithmetic decoding is less than the first threshold value.

8. The entropy decoding method of claim 1, wherein a value of the first function that is determined when the number of times of arithmetic decoding is greater than or equal to the first threshold value, is greater by 1 than a value of the first function determined when the number of times of arithmetic decoding is less than the first threshold value.

9. The entropy decoding method of claim 1, further comprising:
obtaining a request for the syntax element; and
based on a type of the syntax element, determining a number of symbols.

10. The entropy decoding method of claim 9, wherein a value of the first scaling factor is determined by using the number of symbols.

11. The entropy decoding method of claim 10, wherein, based on the number of symbols being greater than or equal to a predetermined value, the value of the first scaling factor is determined based on the predetermined value, and
based on the number of symbols being less than the predetermined value, the value of the first scaling factor is determined based on the number of symbols.

12. The entropy decoding method of claim 1, wherein, when a number of symbols is M which is an integer, the current symbol corresponds to one integer of 0 to M−1.

13. An entropy decoding apparatus comprising at least one processor configured to:
obtain, from a bitstream, information about a slice type;
based on an occurrence probability of a symbol, perform arithmetic decoding on a current symbol corresponding to a syntax element;
based on the slice type indicating an I slice, determine a first scaling factor for updating the occurrence probability of the symbol by using a first function, wherein a value of the first function is determined based on a count value and a first threshold value;
when the information about the slice type indicates a B or P slice, determine the first scaling factor by using a second function, wherein a value of the second function is determined based on the count value and a second threshold value; and
by using the first scaling factor, update the occurrence probability of the symbol,
wherein the first threshold value is greater than or equal to the second threshold value,
wherein the count value indicates a number of times a symbol corresponding to the syntax element has been previously arithmetic-decoded.

14. An entropy encoding method comprising:
obtaining information about a slice type;
based on an occurrence probability of a symbol, performing arithmetic encoding on a current symbol corresponding to a syntax element;
based on the slice type indicating an I slice, determining a first scaling factor for updating the occurrence probability of the symbol by using a first function, wherein a value of the first function is determined based on a count value and a first threshold value;
based on the slice type indicating a B or P slice, determining the first scaling factor by using a second function, wherein a value of the second function is determined based on the count value and a second threshold value; and
by using the first scaling factor, updating the occurrence probability of the symbol,
wherein the first threshold value is greater than or equal to the second threshold value,
wherein the count value indicates a number of times a symbol corresponding to the syntax element has been previously arithmetic-decoded.

15. A method for transmitting a bitstream comprising:
obtaining information about a slice type;
based on an occurrence probability of a symbol, performing arithmetic encoding on a current symbol corresponding to a syntax element;
based on the slice type indicating an I slice, determining a first scaling factor for updating the occurrence probability of the symbol by using a first function, wherein a value of the first function is determined based on a count value and a first threshold value;
based on the slice type indicating a B or P slice, determining the first scaling factor by using a second function, wherein a value of the second function is determined based on the count value and a second threshold value;
by using the first scaling factor, updating the occurrence probability of the symbol;
generating the bitstream including the arithmetic encoded syntax element; and
transmitting the bitstream from an encoding apparatus to a decoding apparatus,
wherein the first threshold value is greater than or equal to the second threshold value,
wherein the count value indicates a number of times a symbol corresponding to the syntax element has been previously arithmetic-decoded.

* * * * *